United States Patent [19]

Pratt et al.

[11] 4,218,744
[45] Aug. 19, 1980

[54] FUEL FLOW CONSUMPTION MONITORING SYSTEM

[75] Inventors: Wayne L. Pratt, Dallas; Paul E. King, Richardson, both of Tex.

[73] Assignee: Avicon Development Group, Dallas, Tex.

[21] Appl. No.: 931,875

[22] Filed: Aug. 8, 1978

[51] Int. Cl.² .............................................. G01F 9/00
[52] U.S. Cl. .................................... 364/442; 364/431; 73/113; 73/114
[58] Field of Search ....................... 364/442, 431, 424; 73/113, 114; 235/92 FL

[56] References Cited

U.S. PATENT DOCUMENTS

| | | | |
|---|---|---|---|
| 3,549,868 | 12/1970 | Watson et al. | 73/114 X |
| 3,612,837 | 10/1971 | Brandau | 364/424 |
| 3,614,617 | 10/1971 | Blake, Jr. | 73/113 X |
| 3,836,690 | 9/1974 | Purtle, Jr. | 364/444 X |
| 3,859,176 | 6/1971 | Wellons | 73/113 |
| 3,908,451 | 9/1975 | Walker et al. | 73/114 |
| 3,983,372 | 9/1976 | Klaver | 73/114 X |
| 4,031,363 | 6/1977 | Freeman et al. | 364/424 |
| 4,050,295 | 9/1977 | Harvey | 73/114 |
| 4,092,850 | 6/1978 | Erwin, Jr. | 73/113 |
| 4,112,492 | 9/1978 | Summers | 73/114 X |

*Primary Examiner*—Edward J. Wise
*Attorney, Agent, or Firm*—Richards, Harris & Medlock

[57] ABSTRACT

A monitoring system (10) for measuring fuel consumption of an engine having a supply tank and an input fuel line extending between the supply tank and the engine is provided. Structure (12, 14) is disposed within the input fuel line for measuring the fuel flow rate of fuel flowing from the supply tank to the engine and for generating an output digital pulse stream proportional to the fuel flow rate. Circuitry (56, 58) is provided for generating a signal representing an initial amount of fuel stored in the supply tank. An electronic processor (18) is responsive to the digital pulse stream and the signal representing the initial amount of fuel for generating an output signal representing the fuel consumption rate of the engine. A display (50) is interconnected to the electronic processor (18) for displaying the electronic processor output signal representing the fuel consumption rate of the engine, fuel status and other measured parameters.

25 Claims, 6 Drawing Figures

4,218,744

FUEL FLOW CONSUMPTION MONITORING SYSTEM

TECHNICAL FIELD

This invention relates to monitoring systems, and more particularly to a fuel flow monitoring system for automatically and continuously monitoring the fuel flow consumption of engines.

BACKGROUND ART

Fuel status and consumption rates are of critical importance in the operation of engines, particularly aircraft and marine type engines. A precise indication of fuel supply allows a pilot to make informed decisions relating to flight plans and modifications thereof during the course of aircraft travel. Fuel supply status, however, does not provide the pilot with sufficient performance information in that engine consumption rates are also a necessary piece of information in the operation of an aircraft. Furthermore, the measurement of fuel consumption rate provides an indication of the operating characteristics of an aircraft engine and whether or not an engine has lost power. Fuel flow monitoring devices must therefore monitor and display both fuel status and rate of fuel consumption to provide a total operating picture of the aircraft or marine engine.

Previously developed aircraft and marine fuel flow consumption monitoring devices have not provided a precise and continuing picture of fuel status and consumption rates. Such prior devices have not been compatible with diesel engines in which fuel flows from a fuel supply tank to the engine and also returns via a return line to the fuel supply tank. Such prior art fuel flow consumption devices have not accurately monitored fuel remaining and rates of fuel consumption in diesel pressurized carbureted engines.

A need has thus arisen for a fuel flow consumption monitoring system for use with aircraft and marine type engines which will automatically and continuously monitor fuel status and rates of fuel consumption during the operation of an engine. Moreover, a need has arisen for a fuel flow consumption monitoring system in which the engine operating time remaining based upon the current consumption rate and the current fuel remaining is monitored for an operating engine. A need has further arisen for a fuel flow consumption monitoring system that provides warning indications for deviations in fuel consumption rates, low fuel and minimum time remaining for continued operation of an engine.

DISCLOSURE OF THE INVENTION

In accordance with the present invention, a fuel flow consumption monitoring system and method are presented which enable the automatic and continuous monitoring of fuel status and fuel consumption rates of engines. When operated, the present fuel flow consumption monitoring system displays the amount of fuel used from an initial start-up of the engine, the amount of fuel remaining at a present time, the rate of consumption of fuel and the time remaining for operating the engine at the current consumption rate with the current fuel remaining.

In accordance with the present invention, a monitoring system for monitoring fuel consumption of an engine having a fuel supply tank and an input fuel line extending between the supply tank and the engine includes structure disposed within the input fuel line for measuring the fuel flow rate of fuel flowing from the supply tank to the engine. This structure further generates an output digital pulse stream proportional to the fuel flow rate. Circuitry is provided for generating a signal representing an initial amount of fuel stored in the supply tank. The system further includes an electronic processor responsive to the digital pulse stream and the signal representing an initial amount of fuel for generating an output signal representing the fuel consumption rate of the engine. Visual displays are also included for displaying the electronic processor output signal representing the fuel consumption rate of the engine.

In accordance with another aspect of the present invention, a monitoring device for measuring fuel consumption of a pressure carbureted engine having a fuel supply tank and fuel input and return lines extending between the supply tank includes a first flow transducer disposed within the fluid input line for measuring the fuel flow rate of fuel flowing from the supply tank to the engine and for generating an output digital pulse stream proportional to the fuel flow rate to the engine. A second flow transducer is disposed within the fuel return line for measuring the fuel flow rate of fuel returning to the supply tank and for generating an output digital pulse stream proportional to the fuel flow rate returning to the supply tank. Circuitry is provided for generating a signal representing an initial amount of fuel stored in the supply tank. The system also includes an electronic processor responsive to the digital pulse streams from the first and second flow transducers and the signal representing the initial amount of fuel for continuously generating an output signal representing the fuel consumption rate of the pressure carbureted engine. Visual displays are also included for displaying the amount of engine operating time remaining based upon the amount of fuel present in the supply tank and the current fuel consumption rate. Additionally, visual displays are provided for displaying the electronic processor output signal representing the fuel flow consumption rate of fuel flowing to the pressure carbureted engine and the fuel flow consumption rate of fuel flowing to the supply tank.

BRIEF DESCRIPTION OF DRAWINGS

For a more complete understanding of the present invention and for further objects and advantages thereof, reference is now made to the following Detailed Description taken in conjunction with the accompanying drawings in which.

DETAILED DESCRIPTION

Figure 1:
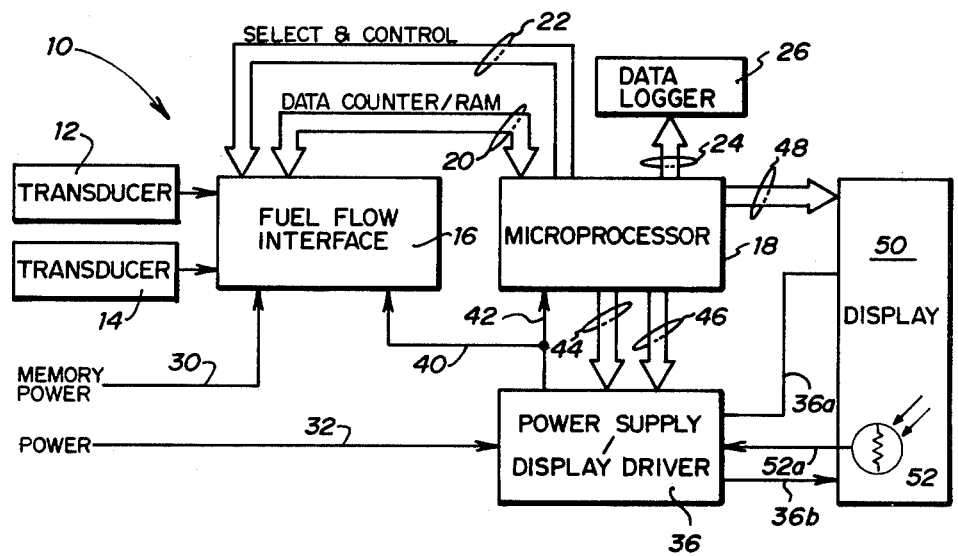
FIG. 1 is a block diagram of the fuel flow consumption monitoring system of the present invention.

Referring to FIG. 1, a block diagram of the present fuel flow consumption monitoring system is illustrated and is generally identified by the numeral 10. The fuel flow consumption system 10 includes flow transducer 12 and 14 for monitoring the flow of fuel flowing from a supply tank to an engine being monitored. The present system 10 is operative to monitor both aircraft and marine type engines including carbureted engines and fuel injection engines. Where carbureted engines are monitored, the flow transducer 12 monitors the forward flow of fuel to the engine and flow transducer 14 measures the return or reverse flow of fuel from the engine to the fuel supply tank. Flow transducers 12 and 14 may comprise, for example, transducers manufactured and sold by Flowscan Model No. Series 201 and 203 for fuel injected engines and Model Nos. 261PB15 and 263PB15 for carbureted applications; Flow Technology, Model No. Ft-8-6N5; and Avtech. Model No. 1177-1.

Flow transducers 12 and 14 generate a digital pulse stream proportional to the volume of fuel flowing to the engine and applies this pulse stream to a fuel flow interface 16 that is interconnected to a microprocessor 18. Fuel flow interface 16 provides a parallel interface to microprocessor 18 parallel input ports via signal lines 20. Fuel flow interface 16 also accepts information from microprocessor 18 via signaling lines 22 in the fashion of a source select bus to provide the capability to select a different device in which to do a parallel read. The parallel read information is taken from the selected device from counters within fuel flow interface 16 to be subsequently described.

Microprocessor 18 computes the various parameters monitored by the present system 10 including the amount of fuel used, the amount of fuel remaining during operation of an engine, rate of fuel consumption and time remaining for the operation of an engine at a current consumption rate and a current fuel status. Microprocessor 18 includes a central processing unit, a read only memory or a variation thereof, such as an erasable read only memory for special applications, a random access memory for temporary data storage and a programmable peripheral interface unit to provide additional versatility including variations in the type of flow transducers utilized with the present system. An output from microprocessor 18 along signaling lines 24 is applied to a data logger 26 for permanent recordation of fuel status and fuel consumption rates.

Power is supplied to fuel flow interface 16 along signal line 30 from an external source such as an aircraft battery to provide a memory power supply. Power is also applied from a power source such as an aircraft or marine power source along signaling line 32 to a power supply and display driver 36. Power supply and display driver 36 provides the required voltages to fuel flow interface 16 via signaling line 40 and to microprocessor 18 via signal line 42. Power supply and display driver 36 further receives input data via signaling lines 44 and 46 from microprocessor 18.

The output of microprocessor 18 is applied via signaling lines 48 to a display 50 for visually displaying fuel status and fuel consumption rates monitored by the present system 10. Power supply and display driver 36 provides power to the digits and digit segments of display 50 via signaling lines 36a and 36b. Display 50 further includes an ambient light sensor 52, which monitors the external light present in the environment in which the present system is utilized to control the intensity of the displays via signaling line 52a and is contained within display 50.

Figure 2:
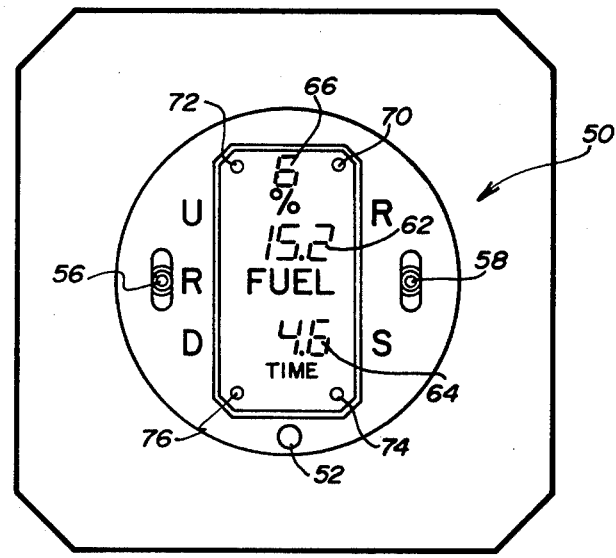
FIG. 2 is an illustration of the front panel display of the present fuel flow consumption monitoring system.

Referring to FIG. 2, display 50 of the fuel flow consumption monitoring system 10 is illustrated. Display 50 includes a mode switch 56 having three positions. The first position identified by "U" relates to a fuel increment in the initialized fuel setting or fuel consumed display. The position "R" indicates the run position of the present system 10. The position "D" indicates a decrement in the initialized fuel setting or remaining fuel indicated by display 50. A second mode switch 58 controls an internal stop watch of the present system 10. Mode switch 58 operates between a position designated by "R" for resetting the internal stop watch and a position "S" for setting the system 10 or starting the internal stop watch.

Display 50 further includes a display 62 for displaying the amount of fuel utilized since startup of an engine and the amount of fuel remaining at a present time in gallons or pounds to the nearest one-tenth unit. Display 62 further alternately displays the rate of consumption in gallons per hour to the nearest one-tenth hour being monitored by the present system 10. FIG. 2 illustrates a fuel consumption rate of 15.2 gallons per hour or 15.2 gallons remaining in the fuel supply tank. Located below display 62 is a display 64 for displaying the operating time remaining of an engine depending upon the current consumption rate and the current fuel remaining within the fuel supply tank of the engine. Display 64 illustrates 4.6 minutes remaining in engine operating time. Display 50 further includes a display 66 that is a single digit representing tenths of fuel remaining since start-up of the engine. For example, if sixty-four gallons of fuel were initially loaded into the fuel supply tank, display 66 would decrement by one for every 6.4 gallons consumed by the engine. Display 50 further includes annunciators 70 and 72 for providing alarms and annunciators 74 and 76 for indicating forward and reverse flow rates in pressure carburetor applications or right and left engines in twin engine aircraft applications.

The operation of the present fuel flow consumption system will now be discussed. Upon initial application of power and engine start-up, the mode switch 56 is placed in the "U" or "D" positions to input into system 10 the initial amount of fuel stored within the fuel supply tank of the engine being monitored. The mode switch 58 is positioned in the "S" position and depending upon the position of mode switch 56, display 62 will be incremented or decremented to reflect the amount of fuel initially stored within the fuel supply tank of the engine being monitored. After initialization, mode switch 56 is returned to the "R" position and the system enters the "RUN" mode. The remaining fuel indicated by display 62 can only be altered by turning the power off and reinitializing system 10 as described above. The display 62 will display the fuel consumption rate of the engine and display 64 now displays the engine operating time remaining computed from the current fuel remaining and the fuel consumption rate to the nearest one-tenth hour.

Placing mode switch 56 to the "U" position will indicate on display 62 the amount of fuel utilized since start-up of the engine. Placing mode switch 56 to the "D" position will indicate on display 62 the amount of fuel remaining since start-up of the engine to the nearest tenth gallon. In this display mode, display 64 displays the remaining operating time of the engine computed from the current fuel consumption rate and fuel remaining displayed by display 62.

Placing the mode switch 58 to the "R" position resets the internal stop watch of the present system 10. The internal stop watch can be used to time the duration of the flight, approaches and other timing parameters. Placing mode switch 58 to the "S" position at any time will allow the stop watch time to be displayed for only as long as mode switch 58 is held in the "S" position. Hours and minutes since reset will be shown on displays 62 and 64.

Placing mode switch 56 to the "U" position and placing mode switch 58 to the "S" position will switch display 62 to display the total rate of fuel consumption such as the sum of the right and left engines in a twin engine aircraft configuration. In a single engine configuration this mode displays the forward fuel flow in display 62 and the reverse fuel flow in display 64 for diesel pressure carbureted applications. In fuel injected single engine aircraft applications, the reverse fuel flow will display a zero in display 64. Returning the mode switch 56 to the "R" position cancels the summed rate display.

The operation of the present system 10 further includes placing mode switch 56 to the "D" position and momentarily setting mode switch 58 to the "S" position to allow alternate forward and reverse consumption rates to be viewed in display 62. Annunciators 74 and 76 indicate which flow, forward or reverse, is being displayed. Display 64 displays the engine operating time remaining. Returning mode switch 56 to the "R" position cancels this alternating display.

When mode switch 56 is in the "R" position, a rate alarm can be set. If the rate alarm is armed, annunciator 70 will be illuminated. Annunciator 70 is illuminated each time the stop watch is viewed when mode switch 56 is in the "R" position. When the rate alarm is armed, a flashing display will be shown on display 62 for the particular engine whose fuel consumption rate exceeds an outside limit of plus or minus 6% of the consumption rate at the time the annunciator 70 was initially illuminated. Toggling the mode switch 58 disarms the rate alarm. Annunciator 72 is illuminated when the engine operating time remaining decreases to 0.8 hours. Annunciator 72 will be illuminated to flash when the engine operating time drops below 0.5 hours.

Figure 3:
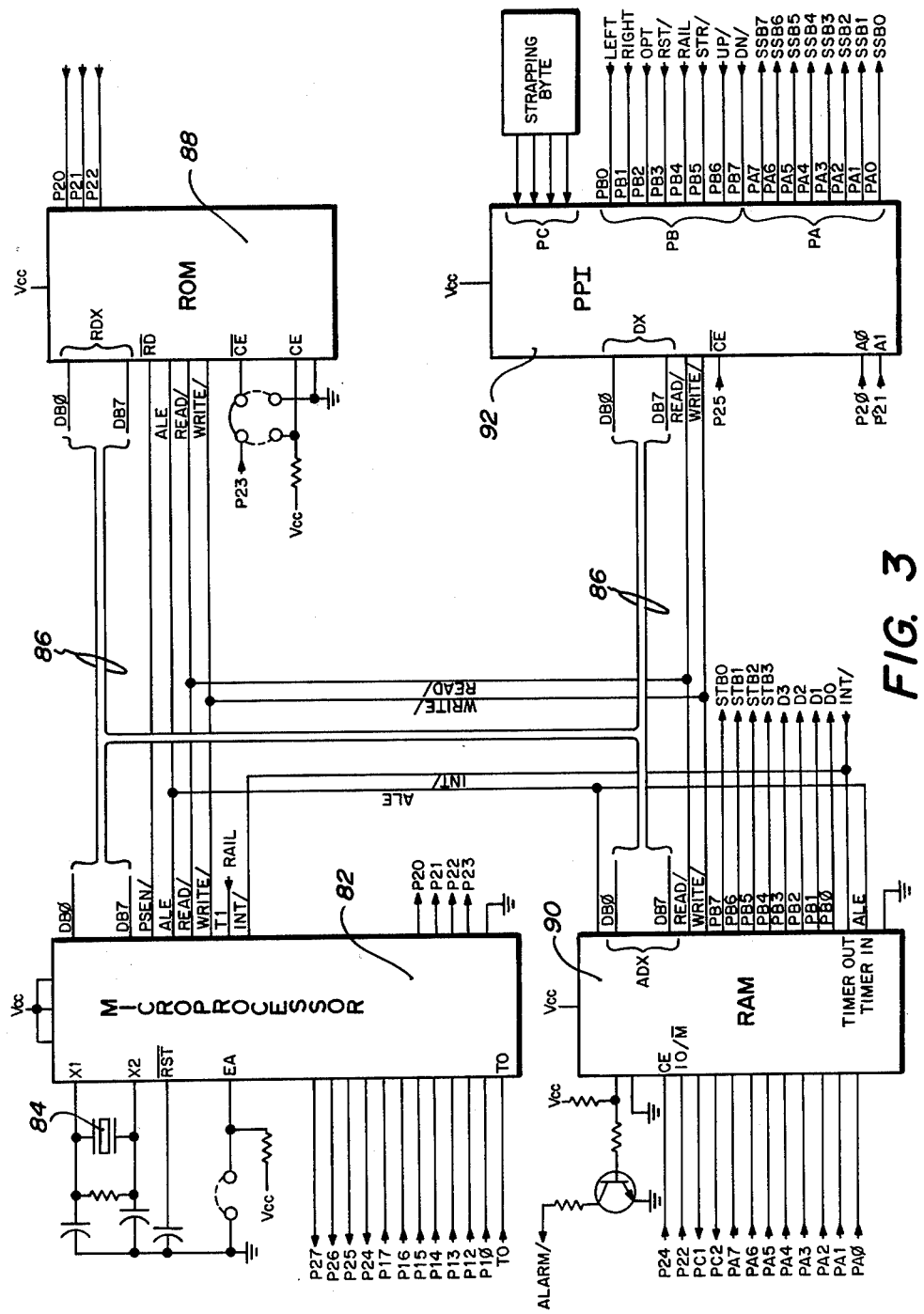
FIG. 3 is a detailed schematic diagram of the microprocessor shown in the block diagram of FIG. 1.

Referring to FIG. 3, the schematic circuitry which corresponds to the block representing the microprocessor 18 (FIG. 1) is illustrated. A microprocessor 82 comprises a standard single component 8-bit microcomputer, such as a 8048 mask programmable read only memory, an 8748 user programmable/erasable EPROM or an 8035 external ROM or EPROM manufactured and sold by Intel Corporation. These microprocessors are fully described in terms of operating characteristics, pin designations and instruction sets in the Intel Corporation publication entitled: *MCS-48 Microcomputer User's Manual*, Copyright 1976, at Pages 6-1-6-5. Microprocessor 82 is driven by a crystal 84 to generate clock pulses. In the preferred embodiment, crystal 84 operates at a frequency of 2.50 MHz. Microprocessor 82 further includes a hardware reset input $\overline{RST}$, program and RAM data memories; T0, a test input; T1, an input from the modulated power supply for display 50; $\overline{PSEN}$, program store enable; $\overline{ALE}$, address latch enable; $\overline{READ}$ and $\overline{WRITE}$.

Microprocessor 82 is interconnected to a read only memory 88 via a main data bus input/output structure 86 designated by signaling lines DB0-DB7. Read only memory 88 may comprise, for example, a read only memory and I/O expander Model 8355 or a EPROM and I/O expander Model 8755 both manufactured and sold to Intel Corporation whose functional description and operating characteristics are described in the Intel Corporation publication entitled: *MCS-48 Microcomputer User's Manual*, Copyright 1976, at Pages 6-7-6-19. Read only memory 88 performs a microprogram readout and includes chip enables to designate one of the microprocessors P2 port bits for selection of this device. The lower order P2 bits from microprocessor 82 are also applied to ROM 88. The output of read only memory 88 is applied to the main data bus 86.

Main data bus 86 also applies data to a random access memory 90 which may comprise, for example, a random access memory and I/O expander Model 8155 manufactured and sold by Intel Corporation. Such a random access memory is a 256×8 static bit RAM and which is described in the Intel Microcomputer User's Manual previously identified at Pages 6-19-6-28. RAM 90 includes two programmable 8-bit input/output ports and one programmable 6-bit input/output port to perform a hand shaking protocol. The ports identified by PA0-PA7 are utilized to collect parallel information from the fuel flow interface board 16 (FIG. 1). The PB0-3 of RAM 90 generates four bits utilized for hexidecimal information for digit selection on display 50 (FIG. 1) and outputs the D0-D3 signals, which are applied to display 50 (FIG. 1) for segment selection. The port PB4-7 of RAM 90 outputs hexidecimal information for the digit selection in a time share multiplex fashion and generates the STB0-3 signals, which are applied to display 50 (FIG. 1). The PC port is an outboard bit to turn on an external device such as a remote indicator or a remote audible alarm including annunciators 70 and 72.

Main data bus 86 along lines DB0-7 is also applied to a general purpose programmable peripheral interface 92. Programmable peripheral interface 92 may comprise, for example, Model 8255 manufactured and sold by Intel Corporation and described at Pages 7-37-7-58 of the Intel publication previously indentified. Programmable peripheral interface 92 (PPI) is supplied with read and write signals; a chip enable; two of the lower order bits of the P2 port; and via the PC port inputing strapping options depending upon the type of flow transducer utilized. The PA port is a source select bus for reading parallel information on the PA bus for generating the SSB0-7 signals for application to the fuel flow interface 16 (FIG. 1). The PB port is employed for reading the position of mode switches 56 and 58 on signal lines $\overline{RST}$, $\overline{STR}$, $\overline{UP}$ and $\overline{DN}$ and in the condition indicated by ambient light source 52 on the RAIL signal line.

Figure 4:
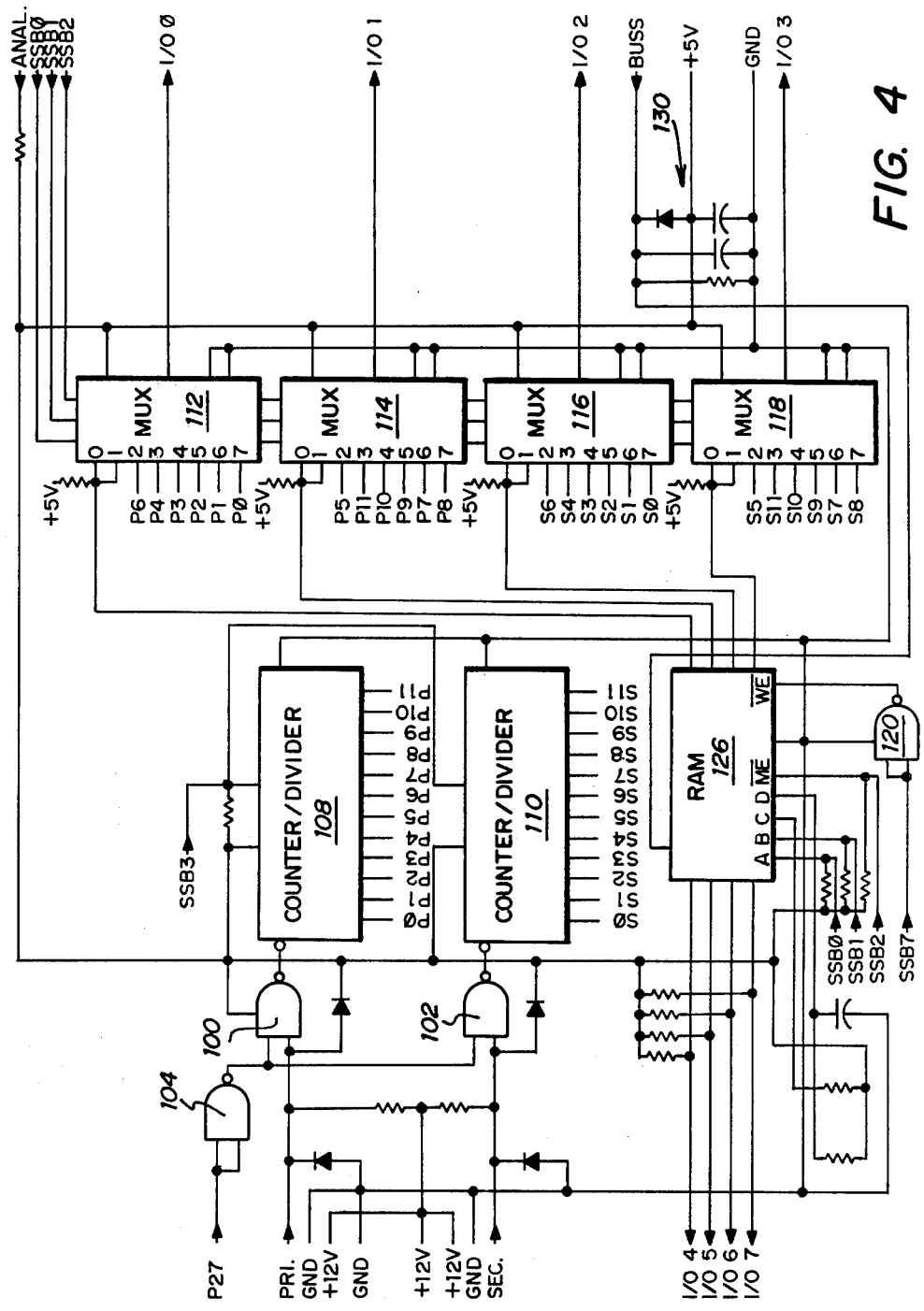
FIG. 4 is a detailed schematic diagram of the fuel flow interface shown in the block diagram of FIG. 1.

Referring to FIG. 4, the schematic circuitry which corresponds to the block representing the fuel flow interface 16 is illustrated. The outputs of flow transducers 12 and 14 are applied along signal lines PRI and SEC to NAND gates 100 and 102. An output from the P2 port of the microprocessor 18 (FIG. 1) is applied to a NAND gate 104 whose output is applied to NAND gates 100 and 102. The outputs of NAND gates 100 and 102 are applied to 12-bit counter dividers 108 and 110. Counter/dividers 108 and 110 may comprise, for example, 4040 I/Cs manufactured and sold by National Semiconductor Corporation. The outputs of counter/dividers 108 and 110 are applied to multiplexers 112, 114, 116 and 118. Multiplexers 112, 114, 116 and 118 may comprise, for example, 74C151 I/Cs manufactured and sold by National Semiconductor Corporation. The fuel flow interface 16 (FIG. 1) accepts information from flow transducers 12 and 14 and accumulates the digital pulses generated by flow transducers 12 and 14 in counter/dividers 108 and 110. Counter/dividers 108 and 110 are gated to start and stop under the control of microprocessor 82 from the P2 port applied to NAND gate 104. The output of multiplexers 112, 114, 116 and 118 provide a parallel output along signal lines I/00-I/03 and are addressed via signal lines SSB0-3 from the programmable peripheral interface 92 (FIG. 3).

The SSB0-2 signals and SSB7 signal applied through a NAND gate 120 are applied to a random access memory 126. Random access memory may comprise, for example, a 74C89 I/C manufactured and sold by National Semiconductor Corporation. Random access memory 126 functions as a "scratch pad" memory for temporary data storage relating to the current condition of the amount of fuel consumed by the engine. Random access memory 26 is accessed for either a read or write with the lower order source select bus SSB0-SSB2. A clamped 5 volts is applied to random access memory 126 via a voltage clamping network 130. The output of random access memory 126 is applied to multiplexers 112, 114, 116 and 118.

Figure 5:
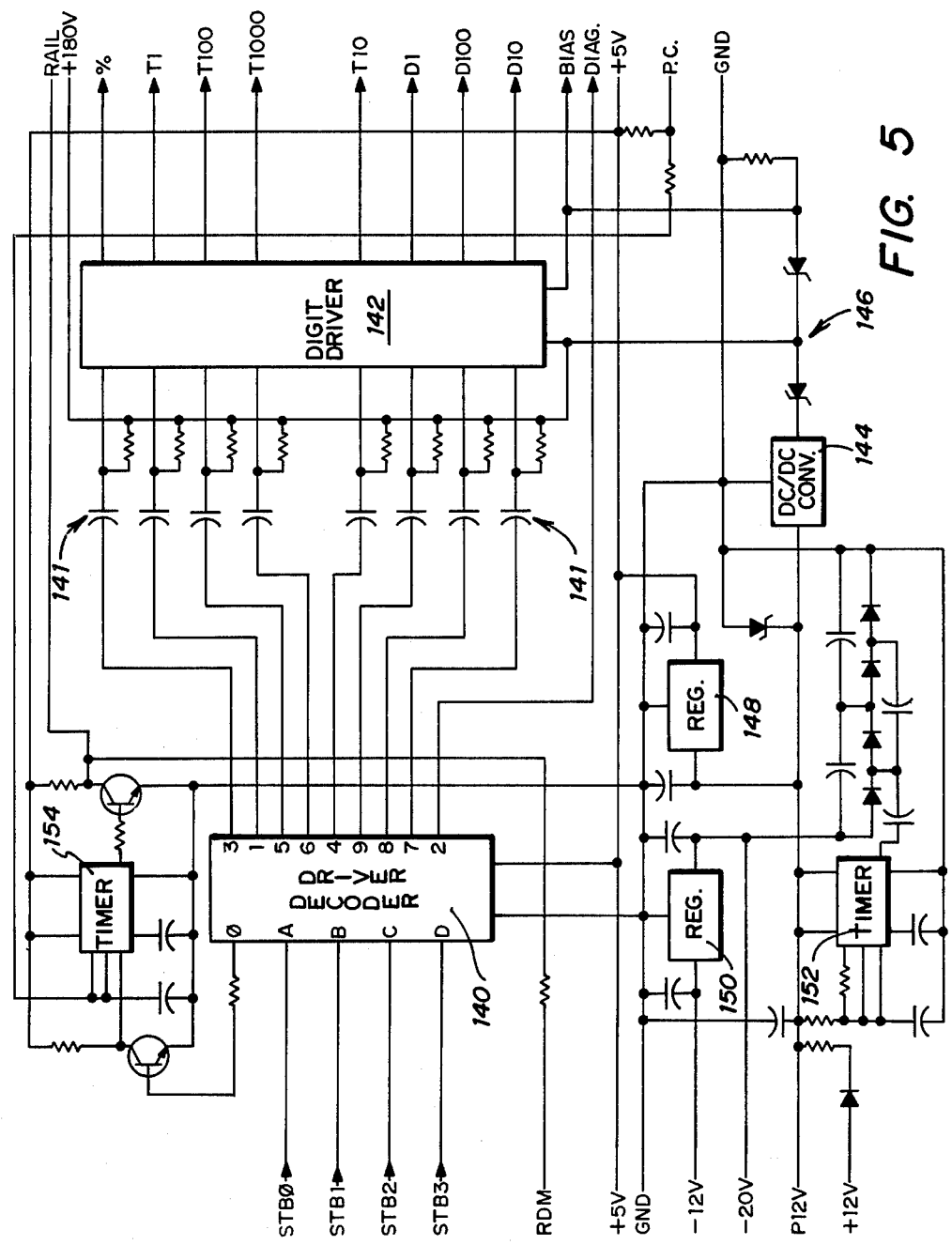
FIG. 5 is a detailed schematic diagram of the power supply and display driver shown in the block diagram of FIG. 1.

Referring to FIG. 5, the schematic circuitry which corresponds to the block representing the power supply and display driver 36 (FIG. 1) is illustrated. The lower order four bits of the strobe bus STB0-3 generated by RAM 90 (FIG. 3) are applied to a four line-to-ten line decoder driver 140. Decoder driver 140 may comprise, for example a MC14028 I/C manufactured and sold by Motorola Semiconductor. The output of decoder driver 140 is applied through a capacitive coupling 141 to a high voltage digit driver 142. Digit driver 142 may comprise, for example, a DM887N I/C manufactured and sold by National Semiconductor Corporation. The output of digit driver 142 is applied to display 50 (FIG. 1).

Digit driver 142 includes a 200 volt DC to DC converter 144. Voltage protection is provided by a Zener diode clamp 146. FIG. 5 also illustrates the power supply of power supply and display driver block 36 (FIG. 1). A twelve volt input supply is regulated by voltage regulators 148 and 150, a timer 152 and voltage doublers and voltage triplers to generate +5, −12 and −20 volts for use throughout the present system 10. The voltage regulators 148 and 150 may comprise, for example, LM323 and LM320 regulators. Timer 152 may comprise, for example, an NE555 I/C. Decoder driver 140 also provides an input to timer 154. Timer 154 may comprise, for example, an NE555 I/C and functions to provide a specific time period between illumination of the gas discharge elements of display 50.

Figure 6:
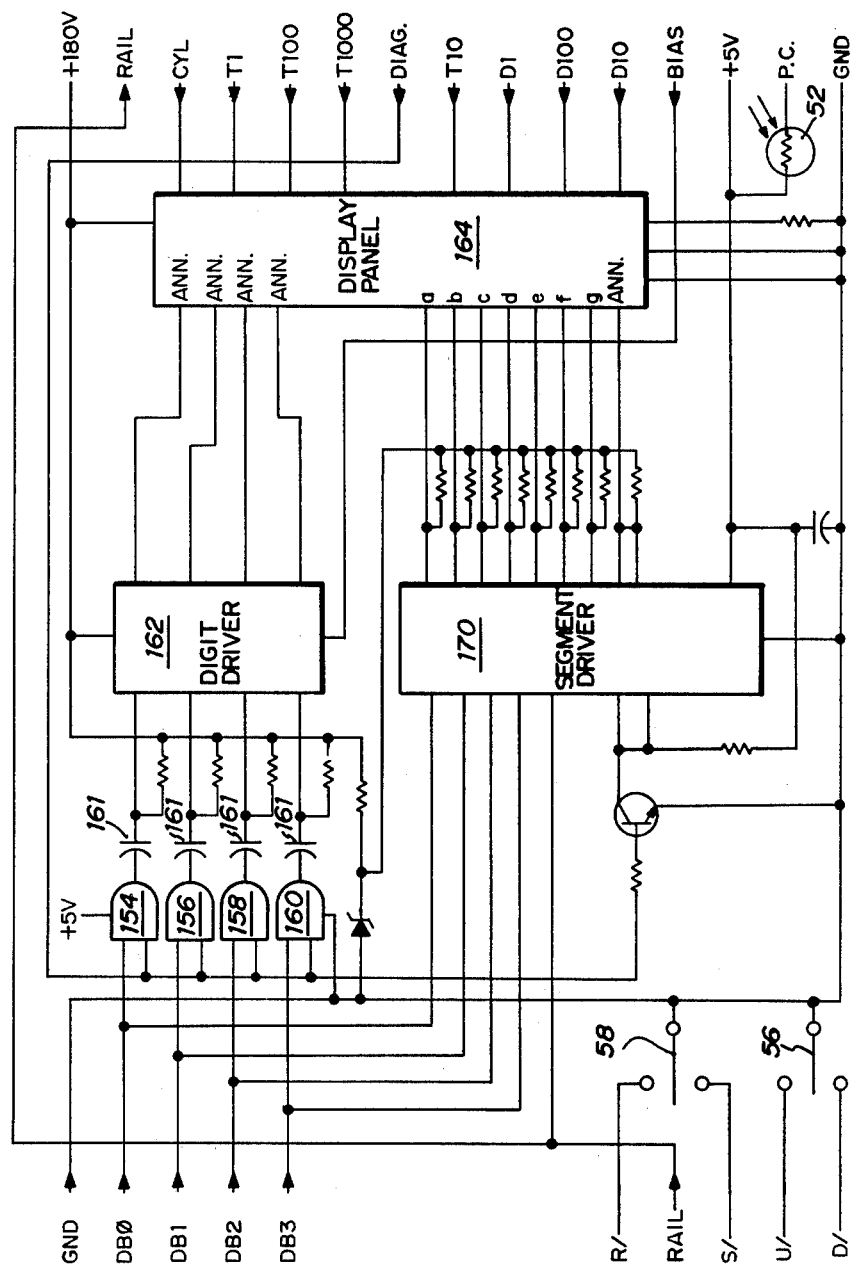
FIG. 6 is a detailed schematic diagram of the display circuitry shown in the block diagram of FIG. 1.

Referring to FIG. 6, the schematic circuitry which corresponds to the block representing the display 50 (FIG. 1) is illustrated. The output signals D0-3 generated by RAM 90 (FIG. 3) are applied to AND gates 154, 156, 158 and 160 which are capacitively coupled using capacitor 161 to a digit driver 162. Digit driver 162 may comprise, for example, an 8887 I/C manufactured and sold by National Semiconductor Corporation. The output of digit driver 162 is applied to a display panel 164 at the ANN. inputs. Display panel 164 may comprise, for example, a gas discharge tube Model AR08200 manufactured and sold by Pantek. The output from digit driver 162 functions to illuminate the annunciators 70, 72, 74 and 76 (FIG. 2).

Signal lines DB0-3 are also applied to a segment driver 170 that converts the four input lines into the basic numerics 0-9 for seven segment information display on display 50. Segment driver 170 may comprise, for example, an 8884 I/C manufactured and sold by National Semiconductor Corporation. The output of segment driver 170 is applied to display panel 164 at the a-g inputs.

The output of ambient light sensor 52 is applied to segment driver 170 to modulate the applied voltage to vary the illumination of the display panel 164. FIG. 6 also illustrates the interconnection of mode switches 56 and 58.

The source statement program assembly for microprocessor 82 (FIG. 3) is reproduced below. The more important programs are subdivided into Tables as follows:

| | |
|---|---|
| Table 1 | Timing Constants |
| Table 2 | Background Loop |
| Table 3 | Display Program |
| Table 4 | Flow Rate Handler |
| Table 5 | Flow Rate Processor |
| Table 6 | Calculation of Fuel Quantities Consumed, Remaining and Percent Remaining |
| Table 7 | Calculation of Time Remaining |
| Table 8 | Generate Command State Word |
| Table 9 | Alarm Detector |
| Table 10 | Decide What to Display |
| Table 11 | Set Up Display Buffer |
| Table 12 | Read Command Switches |
| Table 13 | General Purpose Software |

TABLE 1

```
LOC  OBJ        SEQ      SOURCE STATEMENT

1    $OBJECT(:F1:FUEL.OBJ)
                2    $PRINT(:F1:FUEL.LST)
                3    $PAGEWIDTH(73) PAGELENGTH(66)
                4    $SYMBOLS XREF
                5
                6 ;
                7 ;         THIS PROGRAM IS THE PROPERTY OF
                8 ;
                9 ;              AVICON DEVELOPMENT
               10 ;              701 N. CENTRAL EXPRESSWAY
               11 ;              RICHARDSON, TX 75080
               12 ;
               13
               14 ;
               15 ;         DURING REASSEMBLY, BEWARE OF THE CONDITIO
```

| LOC | OBJ | SEQ | | | SOURCE STATEMENT | |
|---|---|---|---|---|---|---|
| | | 16 | ; | | ASSEMBLY CONTROLS AND THE 16 WORDS LEFT O | |
| | | 17 | ; | | AT 03F0 FOR THE USE OF THE PROMPT 48. CH | |
| | | 18 | ; | | MAY REQUIRE THAT THE "ORG 0400H" BE | |
| | | 19 | ; | | MOVED. | |
| | | 20 | ; | | | |
| | | 21 | ; | | ERRORS, KLUDGES, AND LIKELY CANDIDATES | |
| | | 22 | ; | | FOR CHANGE ARE MARKED WITH ????? OR | |
| | | 23 | ; | | XXXXX IN COMMENTS. | |
| | | 24 | | | | |
| | | 25 | | | | |
| | | 26 | ; | | | |
| | | 27 | ; | | INTERNAL DATA MEMORY | |
| | | 28 | ; | | | |
| 0020 | | 29 | ICONV | EQU | 020H | ; CONVERSION STATE (FLAGS) |
| 0022 | | 30 | ICMDST | EQU | 022H | ; COMMAND STATE FLAGS |
| 0023 | | 31 | ILOGC | EQU | 023H | ; CURRENT LOG COUNT |
| 0025 | | 32 | ICONF | EQU | 025H | ; CONFIGURATION COPY |
| 0026 | | 33 | IOLDCM | EQU | 026H | ; OLD SWITCH COMMAND |
| 0027 | | 34 | ISWIM | EQU | 027H | ; OLD SWITCH IMAGE |
| 0028 | | 35 | ICMD | EQU | 028H | ; DEBOUNCED SW COMMAND |
| 0029 | | 36 | ITECTR | EQU | 029H | ; "1 MS" COUNT FOR SEC (2) |
| 002B | | 37 | IRTC | EQU | 02BH | ; RTC (DEC SEC, MIN, HR) ( |
| 002E | | 38 | IFFTMR | EQU | 02EH | ; FUEL FLOW INTERVAL CTR ( |
| 0030 | | 39 | IFFCTR | EQU | 030H | ; WRAPPING COUNT OF FF INT |
| 0031 | | 40 | IDPYCT | EQU | 031H | ; DISPLAY DIGIT COUNT |
| 0032 | | 41 | IPCT | EQU | 032H | ; C DIGIT SOURCE AND LIGHT |
| 0033 | | 42 | INPTR | EQU | 033H | ; PTR TO 4-DIGIT BINARY SO |
| 0034 | | 43 | IMPTR | EQU | 034H | ; PTR TO 3-DIGIT BINARY SO |
| 0035 | | 44 | IDCTL | EQU | 035H | ; INHIBIT AND FLASH FLAGS |
| 0036 | | 45 | IA | EQU | 036H | ; LIGHTS STROBE & VALUES |
| 0036 | | 46 | IDPY | EQU | IA | ; START OF 9-DIGIT DISPLAY |
| 0037 | | 47 | IC | EQU | 037H | ; SINGLE DIGIT STROBE AND |
| 0038 | | 48 | IDN | EQU | 038H | ; 4-DIGIT STROBES AND VALU |
| 003C | | 49 | IDM | EQU | 03CH | ; 3-DIGIT STROBES AND VALU |
| | | 50 | ; | | | |
| | | 51 | ; | | EXTERNAL DATA MEMORY | |
| | | 52 | ; | | | |
| 0008 | | 53 | Q0 | EQU | 08H | ; TANK CAPACITY (2) |
| 000A | | 54 | Q0T | EQU | 0AH | ; Q0/10 (2) |
| 000C | | 55 | QR | EQU | 0CH | ; REMAINING FUEL (2) |
| 000C | | 56 | LOGSPC | EQU | QR | ; AREA TO BE LOGGED OUT |
| 000E | | 57 | QC | EQU | 0EH | ; FUEL CONSUMED (2) |
| 0010 | | 58 | FR | EQU | 010H | ; RT FLOW RATE (0.1 GAL/HR |
| 0012 | | 59 | FL | EQU | 012H | ; LT FLOW RATE (0.1 GAL/HR |
| 0014 | | 60 | FT | EQU | 014H | ; TOTAL FLOW RATE (FL + FR |
| 0016 | | 61 | TR | EQU | 016H | ; TIME REMAINING (0.1 HR) |
| 0019 | | 62 | Q0TCTR | EQU | 019H | ; 0.1 Q0 CTR (2) |
| 0020 | | 63 | RWRP | EQU | 020H | ; RAW FLOW RT PTR (9) + |
| 0029 | | 64 | RWLP | EQU | 029H | ; RAW FLOW LT PTR (9) - |
| 0032 | | 65 | FLSTND | EQU | 032H | ; FL ALARM STANDARD VALUE |
| 0034 | | 66 | FRSTND | EQU | 034H | ; FR ALARM STANDARD VALUE |
| 004E | | 67 | WCNT | EQU | 04EH | ; 0.1 GAL FRACTION COUNTER |
| 0050 | | 68 | LOGSYN | EQU | 050H | ; LOG HEADER AREA |
| 0058 | | 69 | FFINT | EQU | 058H | ; FUEL FLOW SAMPLING INTER |
| 005E | | 70 | SBGERR | EQU | 05EH | ; SYSBUG CALLER'S ADDRESS |
| 0060 | | 71 | BBUFL | EQU | 060H | ; LEFT BIT BUFFER (12) |
| 006E | | 72 | RTTEMP | EQU | 06EH | ; TEMP FOR RT PULSE*6 (2) |
| 0070 | | 73 | BBUFR | EQU | 070H | ; RIGHT BIT BUFFER (12) |
| | | 74 | | | | ; (MUST BE SOMEWHERE AFTER |
| | | 75 | | | | ; BBUFL) |
| 007E | | 76 | LFTEMP | EQU | 07EH | ; TEMP FOR LF PULSES (2) |
| 0080 | | 77 | LOGBUF | EQU | 080H | ; TRANSMIT BUFFER FOR LOGG |
| | | 78 | | | | ; (LOGLEN) |
| | | 79 | ; | | | |
| | | 80 | ; | | TIMING CONSTANTS | |
| | | 81 | ; | | | |
| | | 82 | ; | | THE VALUES OF SC, LG, AND INTVAL | |
| | | 83 | ; | | DETERMINE THE OTHER TIMING CONSTANTS | |
| | | 84 | ; | | BELOW. THE ASSEMBLER'S ARITHMETIC IS | |
| | | 85 | ; | | UNABLE TO DO THESE CALCULATIONS | |
| | | 86 | ; | | ACCURATELY, HOWEVER, SO THEY MUST BE | |
| | | 87 | ; | | RECALCULATED BY HAND WHEN SC, LG, OR | |
| | | 88 | ; | | INTVAL IS CHANGED. | |
| | | 89 | ; | | | |

```
LOC  OBJ      SEQ         SOURCE STATEMENT

90  ;       (THE CYCLE TIME IS OBTAINED FROM THE
              91  ;        CRYSTAL BY A DIVIDE BY 15.  THEREFORE
              92  ;        CYCLE TIME IN US IS 15 DIVIDED BY
              93  ;        CRYSTAL FREQUENCY IN MHZ.)
              94  ;
              95  ;SC      EQU     85155       ;SENSOR CONSTANT
              96                               ;PULSES/GAL
0006          97  LG       EQU     6           ;LBS/GAL ASSUMED
              98                               ;(MUST ALSO CHANGE
              99                               ;FLOPRO ALGORITHM)
00C0         100  INTVAL   EQU     192         ;INTERVAL TIMER COUNT
             101                               ;(US) = 32*CYCLE TIME
0005         102  MSCNT    EQU     5           ;VALUE WHOSE PRODUCT
             103                               ;WITH INTVAL IS
             104                               ;NEAREST 1000
0412         105  SECCNT   EQU     1042        ;"1 MS" TICKS PER SECOND
             106                               ;10**6/(MSCNT*INTVAL)
2144         107  SCT      EQU     8516        ;SC/10 (PULSES/0.1 GAL)
01B8         108  SCOUNT   EQU     440         ;"1 MS" TICKS PER SAMPLE
             109                               ;INTERVAL SO 0.1 GAL/HR
             110                               ;IS ONE PULSE
             111                               ;36*10**9/(MSCNT*INTVAL)
             112  ;
             113  ;       P2 BIT ASSIGNMENT MASKS
             114  ;
0001         115  M2A0     EQU     1           ;8255 A0
0002         116  M2A1     EQU     2           ;8255 A1
0004         117  M1IO     EQU     4           ;8156 IO/-M
0008         118  M3CEN    EQU     8           ;8355 -CE
0010         119  M1CE     EQU     16          ;8156 CE
0020         120  M2CSN    EQU     32          ;8255 -CS
0040         121  KBST     EQU     64          ;KEYBOARD STROBE
0080         122  FFDIS    EQU     128         ;FUEL FLOW DISABLE
             123  ;
             124  ;       CONDITIONAL ASSEMBLY CONTROLS
             125  ;
0000         126  FAKEIO   EQU     0
             127                               ;1 = NO I/O EXCEPT EXT RA
             128                               ;0 = NORMAL I/O
0001         129  FAKSTB   EQU     1
             130                               ;1 = INCLUDE KBST TOGGLER
             131                               ;0 = NO KBST TOGGLING
0001         132  RAMIO    EQU     1
             133                               ;1 = INCLUDE RAM READ/WRI
             134                               ;0 = NO RAM READ/WRITE DE
0001         135  HIGHCT   EQU     1
             136                               ;1 => CALL SYSBUG IF MSB
             137                               ;OF HW PULSE COUNTER ON
0000         138  NEGFT    EQU     0           ;NO SYSBUG CALL REQ
             139                               ;1 => CALL SYSBUG IF FT
             140                               ;IS NEGATIVE
0000         141  NEGQR    EQU     0
             142                               ;1 => CALL SYSBUG IF QR
             143                               ;IS LESS THAN ZERO
             144                               ;(LOCKS UP INSTRUMENT)
             145  ;
             146  ;       MISCELLANEOUS
             147  ;
000C         148  LOGLEN   EQU     12          ;LENGTH OF AREA LOGGED
0055         149  SYNC     EQU     055H
0001         150  SOH      EQU     01H
0003         151  ETX      EQU     03H
0001         152  FLASHM   EQU     001H        ;MASK FOR FLASHING DISPLA
             153                               ;DISPLAY OFF WHILE ITS "A
             154                               ;IS ZERO
0008         155  ALTM     EQU     008H        ;MASK FOR ALTERNATING LEF
             156                               ;DISPLAY; "ANDED" WITH IF
0004         157  SAFSSB   EQU     004H        ;INNOCENT WRTSTB VALUE
0004         158  RANGCT   EQU     4           ;2**-RANGCT IS THE ALLOWE
             159                               ;RATE DEVIATION FRACTION
             160                               ;4 => +-1/16 = +- 6%
0096         161  STBCNT   EQU     150
             162                               ;COUNT OF KBST PULSES
             163                               ;GENERATED BY STROBE
```

```
LOC   OBJ         SEQ        SOURCE STATEMENT

164 ;
                  165 ;         LOW CORE BRUNCH TABLE
                  166 ;         (ALWAYS JUMP BEFORE BREAKFAST)
                  167 ;
0000              168          ORG    00H
0000  0410        169          JMP    START
                  170 ;
0003              171          ORG    03H
                  172 I00:
0003  F488        173          CALL   SYSBUG  ; SHOULD BE NO INTERRUPT!!
0005  93          174          RETR
                  175 ;
0007              176          ORG    07H
0007  2459        177          JMP    SROHDR
                  178 ;
                  179 ;         STARTUP CODE
                  180 ;
0010              181          ORG    0010H   ; ??????????????????????
                  182 START:
0010  15          183          DIS    I       ; KILL INTERRUPT
0011  35          184          DIS    TCNTI   ; KILL TIMER INTERRUPT
0012  27          185          CLR    A       ; INIT PSW
0013  D7          186          MOV    PSW, A
0014  B808        187          MOV    R0, #08H ; CLEAR REG MEMORY
                  188 CLOOP:
0016  B000        189          MOV    @R0, #00
0018  233F        190          MOV    A, #3FH
001A  D8          191          XRL    A, R0    ; STOP AT 3F
001B  18          192          INC    R0
001C  9616        193          JNZ    CLOOP
                  194
001E  B825        195          MOV    R0, #ICONF ; ASSUME START FROM RE
                  196 I01B:
0074              197 I01V     SET    M2CSN OR M1CE OR M1IO OR KBST
FF8B              198 I01V     SET    NOT I01V
008B              199 I01V     SET    (M3CEN OR M2A0 OR M2A1 OR FFDIS)
0020  238B        200          MOV    A, #I01V ; SET CONFIG ACCESS
0022  3A          201          OUTL   P2, A    ; INIZ 8255 CNTL REG
0023  238B        202          MOV    A, #8BH  ; MOD 0 PA OUT PB/PC IN
0025  90          203          MOVX   @R0, A   ; (R0 DUMMY)
                  204 I01E:
0026  2304        205          MOV    A, #SAFSSB ; SET UP SOURCE SELECT
0028  D4A9        206          CALL   WRTSTB   ; AND CONDITION P2
002A  D4AF        207          CALL   RDPCX    ; READ PC FOR CONFIG
                  208
002C  37          209          CPL    A        ; (NEGATIVE LOGIC HW)
002D  A0          210          MOV    @R0, A   ; THEN LOAD CONFIG CELL
                  211
002E  B800        212          MOV    R0, #00H ; CLEAR RAM MEMORY
                  213 CMLOOP:
0030  27          214          CLR    A
0031  90          215          MOVX   @R0, A
0032  F8          216          MOV    A, R0
0033  D3FF        217          XRL    A, #0FFH
0035  18          218          INC    R0
0036  9630        219          JNZ    CMLOOP
                  220 INZTBS:                  ; INZ THE TIME BASE
0038  B825        221          MOV    R0, #ICONF    ; SET R0->CONFIG B
003A  BC01        222          MOV    R4, #HIGH SCOUNT ; TIMER COUNT
003C  BE88        223          MOV    R3, #LOW SCOUNT
003E  BE00        224          MOV    R6, #00H ; CLR R6
0040  F0          225          MOV    A, @R0   ; GET CONFIG FROM MEM
0041  531C        226          ANL    A, #1CH  ; MASK OUT FLOW DELTA
0043  AD          227          MOV    R5, A    ; PUT @ LOW ADDEND
0044  F0          228          MOV    A, @R0   ; GET IT AGAIN
                  229 ; NOTE:  1=+ SAYS TRANSDUCER PRODUCES TOO
                  230 ;        FEW PULSES; I.E., THIS IS THE SIG
                  231 ;        CORRECTION IN TERMS OF PULSES
0045  324B        232          JB1    INCBSE   ; IS SIGN BIT ON/1=+
                  233
0047  D4D4        234          CALL   BCD24    ; FIND BASS-DELTA
                  235
0049  044D        236          JMP    INZIO
                  237 INCBSE:
```

| LOC | OBJ | SEQ | | SOURCE STATEMENT | | |
|---|---|---|---|---|---|---|
| 004B | D4D3 | 238 | | CALL | ADD34 | ;FIND BASE+DELTA |
| | | 239 | INZIO: | | | |
| 004D | B858 | 240 | | MOV | R0,#FFINT | |
| 004F | D48F | 241 | | CALL | NOR34 | ;SAVE INTERVAL |
| | | 242 | | | | |
| 0051 | B82E | 243 | | MOV | R0,#IFFTMR | |
| 0053 | FB | 244 | | MOV | A,R3 | |
| 0054 | A0 | 245 | | MOV | @R0,A | |
| 0055 | 18 | 246 | | INC | R0 | |
| 0056 | FC | 247 | | MOV | A,R4 | |
| 0057 | A0 | 248 | | MOV | @R0,A | ;INITIALIZE TIMER |
| | | 249 | IO2B: | | | |
| 0058 | 8A04 | 250 | | ORL | P2,#M1IO | ;ENABLE 8155 IO |
| 005A | B900 | 251 | | MOV | R1,#00H | ;SELECT CTL REG |
| 005C | 2387 | 252 | | MOV | A,#87H | ;USE ALT 3 MODE |
| 005E | 91 | 253 | | MOVX | @R1,A | ;TRANSFER IT. |
| 005F | B903 | 254 | | MOV | R1,#03H | ;SELECT 8155 PORT C |
| 0061 | 27 | 255 | | CLR | A | ;SHUT OFF ALARM OUTPUT |
| 0062 | 91 | 256 | | MOVX | @R1,A | |
| 0063 | 9AFB | 257 | | ANL | P2,#NOT M1IO | ;REVERT TO 8155 RAM |
| | | 258 | IO2E: | | | |
| | | 259 | SETREG: | | | |
| 0065 | B832 | 260 | | MOV | R0,#IPCT | ;R0 = START IN REGS |
| 0067 | BA75 | 261 | | MOV | R2,#LOW TEMPLT | ;R2 = START IN PG |
| | | 262 | SETLP: | | | |
| | | | | ;COPY PGM AREA INTO REGS | | |
| 0069 | F8 | 263 | | MOV | A,R0 | ;REACHED END OF REGS ? |
| 006A | D340 | 264 | | XRL | A,#040H | |
| 006C | C683 | 265 | | JZ | SETDON | |
| | | 266 | | | | |
| 006E | FA | 267 | | MOV | A,R2 | ;A = DATA ADR |
| 006F | A3 | 268 | | MOVP | A,@A | ;A = DATA |
| 0070 | A0 | 269 | | MOV | @R0,A | ;STORE DATA |
| 0071 | 1A | 270 | | INC | R2 | ;BUMP SOURCE |
| 0072 | 18 | 271 | | INC | R0 | ;BUMP DESTINATION |
| 0073 | 0469 | 272 | | JMP | SETLP | ;REPEAT |
| | | 273 | TEMPLT: | | | |
| 0075 | F0 | 274 | | DB | 0F0H | ;IPCT |
| 0076 | 08 | 275 | | DB | 08 | ;INPTR |
| 0077 | 00 | 276 | | DB | 0 | ;IMPTR |
| 0078 | 00 | 277 | | DB | 0 | ;IDCTL |
| 0079 | 20 | 278 | | DB | 020H | ;IA |
| 007A | 3F | 279 | | DB | 03FH | ;IC |
| 007B | 1F | 280 | | DB | 01FH,04FH,05FH,06FH | ;IDN |
| 007C | 4F | | | | | |
| 007D | 5F | | | | | |
| 007E | 6F | | | | | |
| 007F | 9F | 281 | | DB | 09FH,07FH,08FH,00FH | ;IDM |
| 0080 | 7F | | | | | |
| 0081 | 8F | | | | | |
| 0082 | 0F | | | | | |
| | | 282 | SETDON: | | | |
| | | 283 | ; | | | |
| | | 284 | | IF | (HIGH SETLP) NE (HIGH SETDON) | |
| | | 285 | | XXX | | ;ASSEMBLE IF PAGE ERROR F |
| | | 286 | | ENDIF | | |
| | | 287 | ; | | | |
| | | 288 | STRTPL: | | | |
| | | 289 | IO3B: | | | |
| | | 290 | | | | ;IT IS ASSUMED THAT THE |
| | | 291 | | | | ;LAST CALL TO WRTSTB |
| | | 292 | | | | ;LEFT 74C9CB ON THE BUS |
| 0083 | 89FF | 293 | | ORL | P1,#0FFH | ;CONDITION P1 FOR INPUT |
| 0085 | 27 | 294 | | CLR | A | ;SELECT 74C89 LOW HEXIT |
| 0086 | D4A9 | 295 | | CALL | WRTSTB | ;AND LATCH ADDRESS |
| | | 296 | | | | |
| 0088 | 09 | 297 | | IN | A,P1 | ;READ LOW HEXIT |
| 0089 | 530F | 298 | | ANL | A,#00FH | ;ISOLATE IT. |
| 008B | AB | 299 | | MOV | R3,A | ;HOLD @R3 |
| 008C | 2305 | 300 | | MOV | A,#05H | ;DESELECT 74C89 AND |
| 008E | D4A9 | 301 | | CALL | WRTSTB | ;SET UP ADDRESS |
| | | 302 | | | | |
| 0090 | 2301 | 303 | | MOV | A,#01H | ;SELECT 74C89 HIGH HEXIT |
| 0092 | D4A9 | 304 | | CALL | WRTSTB | ;AND LATCH ADDRESS. |
| | | 305 | | | | |

```
LOC   OBJ       SEQ           SOURCE STATEMENT 0094  09        306           IN      A,P1        ;READ UPPER HEXIT
0095  530F      307           ANL     A,#00FH     ;ISOLATE IT.
0097  47        308           SWAP    A
0098  4B        309           ORL     A,R3        ;COMBINE WITH LOWER HEXIT
0099  37        310           CPL     A           ;(DATA NEGATIVE ON READ)
                311  IO3E:
009A  AB        312           MOV     R3,A        ;MOVE 1X INTO R3,4
009B  BC00      313           MOV     R4,#00
009D  D4BD      314           CALL    TENX        ;Q0 IS 10 * STORED VALUE
                315
009F  B808      316           MOV     R0,#Q0      ;STORE Q0
00A1  D48F      317           CALL    MOR34
                318
00A3  2304      319           MOV     A,#SAFSSB   ;RESTORE SELECT BUS
00A5  D4A9      320           CALL    WRTSTB
                321  MEMZ:
00A7  B920      322           MOV     R1,#RWRP    ;SET RAW POINTERS
00A9  F9        323           MOV     A,R1
00AA  07        324           DEC     A
00AB  91        325           MOVX    @R1,A
00AC  B929      326           MOV     R1,#RWLP
00AE  F9        327           MOV     A,R1
00AF  07        328           DEC     A
00B0  91        329           MOVX    @R1,A
00B1  B823      330           MOV     R0,#ILOGC
00B3  B0FA      331           MOV     @R0,#-6     ;INIT LOG COUNT
00B5  B950      332           MOV     R1,#LOGSYN  ;LOG FIELD ADDRS
00B7  2355      333           MOV     A,#SYNC
00B9  91        334           MOVX    @R1,A
00BA  19        335           INC     R1
00BB  91        336           MOVX    @R1,A       ;SYNC, SYNC
00BC  19        337           INC     R1
00BD  2301      338           MOV     A,#SOH
00BF  91        339           MOVX    @R1,A       ;SOH
00C0  19        340           INC     R1
00C1  2303      341           MOV     A,#03H      ;FUEL FLOW I. D.
00C3  91        342           MOVX    @R1,A
00C4  19        343           INC     R1
00C5  B825      344           MOV     R0,#ICONF
00C7  F0        345           MOV     A,@R0       ;GET CONFIG
00C8  91        346           MOVX    @R1,A       ;CONFIG
00C9  19        347           INC     R1
00CA  230C      348           MOV     A,#LOGLEN   ;BYTES IN LOG FIELD
00CC  91        349           MOVX    @R1,A
                350  BRGGEN:
00CD  23FB      351           MOV     A,#LOW (-MSCNT) ;COUNT FOR 1 MS
00CF  62        352           MOV     T,A         ;T COUNT = 960 US
                353  IO4B:
00D0  55        354           STRT    T           ;START TIMING AND
00D1  25        355           EN      TCNTI       ;ENB INTERRUPTS
                356  IO4E:
                357  ;
                358  ;       LOOP FOR SETTING Q0
                359  ;       BEFORE STARTING NORMAL OPERATION
                360  ;
                361  SWIZR:
00D2  B4FA      362           CALL    RDSW        ;INIZ LOAD FROM SW
                363
00D4  B828      364           MOV     R0,#ICMD
00D6  F0        365           MOV     A,@R0       ;LOOK AT COMMAND
00D7  32DF      366           JB1     ISSTEP      ;STEP SW ON ?
                367
00D9  B830      368           MOV     R0,#IFFCIR  ;IF NOT, JUST
00DB  B000      369           MOV     @R0,#00     ;RESET IFFCIR
00DD  04F7      370           JMP     SQLOOP      ;AND WAIT WHILE DISPLAY/IN
                371  ISSTEP:                      ;STEP SWITCH ON
00DF  76F7      372           JF1     SQLOOP      ;IF NOT TIME TO BUMP
                373                               ;OR START, WAIT.
00E1  B5        374           CPL     F1          ;SET FLAG UP AGAIN.
00E2  530C      375           ANL     A,#0CH      ;UP OR DOWN ?
00E4  96E8      376           JNZ     UPDN
                377
00E6  2413      378           JMP     RUN         ;IF NOT, START OPERATION.
                379  UPDN:                        ;CHANGING DISPLAY
```

| LOC | OBJ | SEQ | | SOURCE STATEMENT | | |
|---|---|---|---|---|---|---|
| 00E8 | B930 | 380 | | MOV | R1,#IFFCIR | ;IFFCIR INCREASES |
| 00EA | F1 | 381 | | MOV | A,@R1 | ;WHILE STEP ON. |
| 00EB | AD | 382 | | MOV | R5,A | ;USE IT FOR THE INCREMENT |
| 00EC | BE00 | 383 | | MOV | R6,#00 | ;OR DECREMENT |
| 00EE | F0 | 384 | | MOV | A,@R0 | |
| 00EF | 52F5 | 385 | | JB2 | INCQ0 | |
| | | 386 | | | | |
| 00F1 | D4DA | 387 | | CALL | SUB34 | |
| 00F3 | 04F7 | 388 | | JMP | SQLOOP | |
| | | 389 | INCQ0: | | | |
| 00F5 | D4D3 | 390 | | CALL | ADD34 | |
| | | 391 | SQLOOP: | | | ;IS VALUE OK ? |
| 00F7 | FC | 392 | | MOV | A,R4 | ;IS IT NEG ? |
| 00F8 | F2FC | 393 | | JB7 | LL4 | ;????? FIX FOR OUTPAGE JM |
| | | 394 | | | | |
| 00FA | 2401 | 395 | | JMP | SQLOK | ;????? FIX FOR OUTPAGE JM |
| | | 396 | LL4: | | | |
| 00FC | 27 | 397 | | CLR | A | ;YES, SET NEG TO 0. |
| 00FD | AB | 398 | | MOV | R3,A | |
| 00FE | AC | 399 | | MOV | R4,A | |
| 00FF | 2407 | 400 | | JMP | STOQ0 | |
| | | 401 | SQLOK: | | | |
| 0101 | BDF6 | 402 | | MOV | R5,#LOW 2550 | ;LIMIT Q0 |
| 0103 | BE09 | 403 | | MOV | R6,#HIGH 2550 | ;TO 74C89 CAPACIT |
| 0105 | D4E5 | 404 | | CALL | MIN34 | ;XXXXXXXXXXXXXX |
| | | 405 | STOQ0: | | | |
| 0107 | B803 | 406 | | MOV | R0,#Q0 | ;SAVE Q0 |
| 0109 | D48F | 407 | | CALL | M@R34 | |
| | | 408 | | | | |
| 010B | 6481 | 409 | | CALL | DPYXFR | ;PRINT THE DISPLAY |
| | | 410 | | | | |
| 010D | B80A | 411 | | MOV | R0,#Q0 | |
| 010F | D481 | 412 | | CALL | R34M0 | ;R3,4 = BINARY Q0 AGAIN. |
| | | 413 | | | | |
| 0111 | 04D2 | 414 | | JMP | SW12R | ;REPEAT Q0 LOOP AGAIN. |
| | | 415 | RUN: | | | |
| 0113 | F40D | 416 | | CALL | TENTHX | ;R3,4 = Q0/10 |
| | | 417 | | | | |
| 0115 | B89A | 418 | | MOV | R0,#Q0T | |
| 0117 | D48F | 419 | | CALL | M@R34 | ;SET Q0T |
| | | 420 | ZCNTRS: | | | |
| 0119 | B809 | 421 | | MOV | R0,#Q0 | ;COPY Q0 INTO QR |
| 011B | D481 | 422 | | CALL | R34M0 | |
| | | 423 | | | | |
| 011D | B80C | 424 | | MOV | R0,#QR | |
| 011F | D48F | 425 | | CALL | M@R34 | |
| | | 426 | | | | |
| 0121 | B932 | 427 | | MOV | R1,#IPCT | ;SET DIGIT TO 9 AND |
| 0123 | B190 | 428 | | MOV | @R1,#090H | ;LIGHTS OFF |
| 0125 | B826 | 429 | | MOV | R0,#IOLDCM | ;SET STEP IN OLD CMD |
| 0127 | B002 | 430 | | MOV | @R0,#02H | ;SO POS TRANS NOT RECOG |
| | | 431 | NUCYC: | | | |
| 0129 | 230C | 432 | | MOV | A,#0CH | ;CLEAR FF COUNTERS |
| 012B | D4A9 | 433 | | CALL | WRTSTB | |
| 012D | 2304 | 434 | | MOV | A,#SAFSSB | |
| 012F | D4A9 | 435 | | CALL | WRTSTB | |
| | | 436 | IO5B: | | | |
| | | 437 | | | | ;SEL 8155 RAM; TURN ON FF |
| 0131 | 8A30 | 438 | | ORL | P2,#M1CE OR M2CSN | |
| 0133 | 9A7B | 439 | | ANL | P2,#NOT (M1IO OR FFDIS) | |
| | | 440 | IO5E: | | | |
| 0135 | A5 | 441 | | CLR | F1 | ;SET FF TIME FLAG |
| 0136 | B5 | 442 | | CPL | F1 | |
| | | 443 | IO6: | | | |

TABLE 2

| LOC | OBJ | SEQ | SOURCE STATEMENT | | |
|---|---|---|---|---|---|
| 0137 | 00 | 444 | NOP | | ;SPACE FOR DEBUG "EN I" |
| | | 445 ; | | | |
| | | 446 ; | THE PROGRAM PERFORMS THE RTNCYC LOOP | | |

| LOC | OBJ | SEQ | | SOURCE STATEMENT | |
|---|---|---|---|---|---|
| | | 447 ; | | ONCE FOR EACH FUEL FLOW MEASUREMENT | |
| | | 448 ; | | PERIOD. F1 IS USED TO SYNCHRONIZE | |
| | | 449 ; | | THIS BACKGROUND LOOP WITH THE TIMER | |
| | | 450 ; | | INTERRUPT HANDLER. | |
| | | 451 ; | | | |
| | | 452 | RTNCYC: | | ;MASTER PROGRAM LOOP |
| 0138 | 7638 | 453 | JF1 | RTNCYC | ;WAIT FOR FF TIMER |
| | | 454 | | | ;TO RESET F1 |
| 013A | B5 | 455 | CPL | F1 | ;NOTE BACKGROUND WORKING |
| | | 456 ; | | | |
| 013B | 34D7 | 457 | CALL | FLOHDR | ;FLOW RATE HANDLER |
| 013D | 547A | 458 | CALL | FLOPRO | ;FLOW RATE PROCESSOR |
| 013F | 54FD | 459 | CALL | QCALC | ;FUEL QUANTITIES |
| 0141 | 7448 | 460 | CALL | TRCALC | ;TIME REMAINING |
| 0143 | B4FA | 461 | CALL | RDSW | ;READ COMMAND SWITCHES |
| 0145 | 7463 | 462 | CALL | CMDGEN | ;GENERATE CMD STATE BYTE |
| 0147 | 7494 | 463 | CALL | ALMDET | ;ALARM DETECTOR |
| 0149 | 9493 | 464 | CALL | DPYGEN | ;DECIDE WHAT TO DISPLAY |
| 014B | B481 | 465 | CALL | DPYXFR | ;SET IT UP IN THE BUFFER |
| | | 466 ; | | | |
| | | 467 | IF | LOGLEN GT 0 | |
| 014D | D40A | 468 | CALL | LOG | ;LOG FUEL STATE |
| | | 469 | ELSE | | |
| | | 470 | NOP | | |
| | | 471 | NOP | | |
| | | 472 | ENDIF | | |
| | | 473 ; | | | |
| 014F | D44A | 474 | CALL | PWRDN | ;REMEMBER QR FOR POWER DO |
| | | 475 ; | | | |
| | | 476 | IF | FAKSTB | |
| | | 477 ; | | | |
| 0151 | F4AC | 478 | CALL | STROBE | ;GENERATE KBST PULSES |
| | | 479 ; | | | |
| | | 480 | ELSE | | |
| | | 481 ; | | | |
| | | 482 | NOP | | |
| | | 483 | NOP | | |
| | | 484 ; | | | |
| | | 485 | ENDIF | | |
| | | 486 ; | | | |
| 0153 | 7638 | 487 | JF1 | RTNCYC | ;IF STILL SET, OK |
| | | 488 | | | |
| 0155 | F488 | 489 | CALL | SYSBUG | ;OVERRUN: BACKGROUND TOO |
| | | 490 | | | |
| 0157 | 2438 | 491 | JMP | RTNCYC | ;REPEAT THE LOOP |
| | | 492 ; | | | |
| | | 493 ; | | SRQHDR IS THE HANDLER FOR THE "1 MS" | |
| | | 494 ; | | INTERRUPT. | |
| | | 495 ; | | | |
| | | 496 ; | | REGISTER BANK 1 USED | |
| | | 497 ; | | | |

TABLE 3

| LOC | OBJ | SEQ | | SOURCE STATEMENT | |
|---|---|---|---|---|---|
| | | 498 | SRQHDR: | | |
| 0159 | D5 | 499 | SEL | RB1 | ;TIME BASE INTERRUPT |
| 015A | AC | 500 | MOV | R4,A | ;SAVE A |
| 015B | 23FB | 501 | MOV | A,#LOW (-MSCNT) | ;RESET TIMER COUN |
| 015D | 62 | 502 | MOV | T,A | |
| 015E | B829 | 503 | MOV | R0,#1TBCTR | ;BUMP TBCTR |
| 0160 | F0 | 504 | MOV | A,@R0 | |
| 0161 | 17 | 505 | INC | A | |
| 0162 | A0 | 506 | MOV | @R0,A | |
| 0163 | 9669 | 507 | JNZ | TESTCT | ;NOT ZRO TST COUNT |
| | | 508 | | | |
| 0165 | 18 | 509 | INC | R0 | |

```
LOC   OBJ         SEQ              SOURCE STATEMENT

0166  F0          510              MOV    A,@R0
0167  17          511              INC    A          ;INC HI BYTE
0168  A0          512              MOV    @R0,A
                  513  TESTCT:
0169  F0          514              MOV    A,@R0      ;LOOK AT TBCTR
016A  D312        515              XRL    A,#LOW SECCNT  ;IS IT SECCNT ?
016C  9697        516              JNZ    DBETA
                  517
016E  18          518              INC    R0         ;LOW BYTE MATCHES; HIGH?
016F  F0          519              MOV    A,@R0      ;NOW GET HI
0170  D304        520              XRL    A,#HIGH SECCNT
0172  9697        521              JNZ    DBETA      ;NOT ZRO; SEC NOT FOUND
                  522  SECOND:
0174  A0          523              MOV    @R0,A      ;RESET TBCTR
0175  C8          524              DEC    R0
0176  A0          525              MOV    @R0,A
                  526  INCSEC:
0177  B82B        527              MOV    R0,#IRTC   ;POINT TO RTC SEC
0179  F0          528              MOV    A,@R0
017A  0301        529              ADD    A,#01H     ;CLR CYS FOR REST
017C  57          530              DA     A          ;OF DA'S
017D  A0          531              MOV    @R0,A      ;RESTORE
                  532  SECTST:
017E  D360        533              XRL    A,#60H     ;EQU 60H ?
0180  9697        534              JNZ    DBETA
                  535  MINTST:
0182  A0          536              MOV    @R0,A      ;CLR SEC
0183  18          537              INC    R0
0184  F0          538              MOV    A,@R0      ;GET MIN
0185  17          539              INC    A
0186  57          540              DA     A          ;AND DEC ADJ
0187  A0          541              MOV    @R0,A      ;FINALLY RESTORE
                  542  HRTST:
0188  D360        543              XRL    A,#60H     ;EQU 60 ?
018A  9697        544              JNZ    DBETA
                  545
018C  A0          546              MOV    @R0,A      ;CLR MIN
018D  18          547              INC    R0
018E  F0          548              MOV    A,@R0      ;GET HR
018F  17          549              INC    A
0190  57          550              DA     A
0191  A0          551              MOV    @R0,A
                  552  TEST24:
0192  D324        553              XRL    A,#24H     ;HR EQU 24 ?
0194  9697        554              JNZ    DBETA
                  555
0196  A0          556              MOV    @R0,A      ;CLR HRS
                  557  DBETA:                       ;DO DISPLAY.
0197  B831        558              MOV    R0,#IDPYCT ;CHECK DISPLAY COUNT.
0199  F0          559              MOV    A,@R0
019A  D308        560              XRL    A,#8       ;LAST DIGIT
019C  C6A0        561              JZ     XCHDCT     ;IF SO, USE 0 NEXT.
                  562
019E  F0          563              MOV    A,@R0      ;IF NOT, INC FOR NEXT
019F  17          564              INC    A
                  565  XCHDCT:
01A0  20          566              XCH    A,@R0      ;A = DIGIT NUMBER IN TABL
01A1  0336        567              ADD    A,#IDPY
01A3  A8          568              MOV    R0,A       ;R0 -> DISPLAY BYTE
                  569  IO22:
01A4  0A          570              IN     A,P2       ;SAVE P2
01A5  AB          571              MOV    R3,A
                  572  IO7:
01A6  8A34        573              ORL    P2,#M1CE OR M2CSN OR M1IO
01A8  B902        574              MOV    R1,#02H    ;USE 8156 PORT B
01AA  230F        575              MOV    A,#0FH     ;FIRST SEND OUT BLANK
                  576  IO8:
01AC  91          577              MOVX   @R1,A
01AD  F0          578              MOV    A,@R0      ;A = (DIGIT#,BCD)
                  579  IO9:
01AE  91          580              MOVX   @R1,A      ;THEN SEND DATA
                  581  ;
01AF  B82E        582              MOV    R0,#IFFTMR
```

| LOC | OBJ | SEQ | | SOURCE STATEMENT | | |
|---|---|---|---|---|---|---|
| 01B1 | F0 | 583 | | MOV | A,@R0 | ;DECREMENT FF TIMER |
| 01B2 | 07 | 584 | | DEC | A | |
| 01B3 | 20 | 585 | | XCH | A,@R0 | |
| 01B4 | 18 | 586 | | INC | R0 | |
| 01B5 | 96BA | 587 | | JNZ | FFCDCD | |
| | | 588 | | | | |
| 01B7 | F0 | 589 | | MOV | A,@R0 | |
| 01B8 | 07 | 590 | | DEC | A | |
| 01B9 | A0 | 591 | | MOV | @R0,A | |
| | | 592 | FFCDCD: | | | |
| 01BA | F0 | 593 | | MOV | A,@R0 | ;IS IT 0 ? |
| 01BB | C8 | 594 | | DEC | R0 | |
| 01BC | 40 | 595 | | ORL | A,@R0 | |
| 01BD | 96D3 | 596 | | JNZ | SRQEXT | |
| | | 597 | | | | |
| 01BF | 9AFB | 598 | | ANL | P2,#NOT M1IO | ;SELECT RAM |
| 01C1 | B958 | 599 | | MOV | R1,#FINT | ;SET UP FFCNT AGAIN |
| 01C3 | 81 | 600 | | MOVX | A,@R1 | |
| 01C4 | A0 | 601 | | MOV | @R0,A | |
| 01C5 | 18 | 602 | | INC | R0 | |
| 01C6 | 19 | 603 | | INC | R1 | |
| 01C7 | 81 | 604 | | MOVX | A,@R1 | |
| 01C8 | A0 | 605 | | MOV | @R0,A | |
| 01C9 | B830 | 606 | | MOV | R0,#IFFCIR | ;BUMP CIRCULAR COUNTE |
| 01CB | F0 | 607 | | MOV | A,@R0 | |
| 01CC | 17 | 608 | | INC | A | |
| 01CD | A0 | 609 | | MOV | @R0,A | |
| 01CE | A5 | 610 | | CLR | F1 | ;NOTE TIMER EXPIRATION |
| 01CF | FB | 611 | | MOV | A,R3 | ;TURN OFF COUNTERS VIA P2 |
| 01D0 | 4380 | 612 | | ORL | A,#FFDIS | |
| 01D2 | AB | 613 | | MOV | R3,A | |
| | | 614 | SRQEXT: | | | |
| 01D3 | FB | 615 | | MOV | A,R3 | ;RESTORE P2 |
| | | 616 | 1010: | | | |
| 01D4 | 3A | 617 | | OUTL | P2,A | |
| 01D5 | FC | 618 | | MOV | A,R4 | ;RESTORE A |
| 01D6 | 93 | 619 | | RETR | | ;EXIT THE INTERRUPT HANDL |
| | | 620 | ; | | | |
| | | 621 | ; | READ & RE-ENABLE FUEL FLOW COUNTERS | | |
| | | 622 | ; | | | |

TABLE 4

| LOC | OBJ | SEQ | | SOURCE STATEMENT | | |
|---|---|---|---|---|---|---|
| | | 623 | ;XXXXX FLOHDR & READF ARE KLUDGES FOR SCRAMBLED | | | |
| | | 624 | ;XXXXX BITS. | | | |
| | | 625 | FLOHDR: | | | |
| 01D7 | 89FF | 626 | | ORL | P1,#0FFH | ;CONDITION P1 FOR INPUT |
| 01D9 | B860 | 627 | | MOV | R0,#BBUFL+0 | ;1ST BIT POINTER |
| 01DB | B968 | 628 | | MOV | R1,#BBUFL+8 | ;2ND BIT POINTER |
| 01DD | 2307 | 629 | | MOV | A,#07H | ;SEL BYTE 6 |
| 01DF | D4A9 | 630 | | CALL | WRTSTB | |
| | | 631 | | | | |
| 01E1 | 5466 | 632 | | CALL | READF | ;BITS 0,8 |
| | | 633 | | | | |
| 01E3 | B861 | 634 | | MOV | R0,#BBUFL+1 | |
| 01E5 | B967 | 635 | | MOV | R1,#BBUFL+7 | |
| 01E7 | 2306 | 636 | | MOV | A,#06H | |
| 01E9 | D4A9 | 637 | | CALL | WRTSTB | |
| | | 638 | | | | |
| 01EB | 5466 | 639 | | CALL | READF | ;BITS 1,7 |
| | | 640 | | | | |
| 01ED | B862 | 641 | | MOV | R0,#BBUFL+2 | |
| 01EF | B969 | 642 | | MOV | R1,#BBUFL+9 | |
| 01F1 | 2305 | 643 | | MOV | A,#05H | |
| 01F3 | D4A9 | 644 | | CALL | WRTSTB | |
| | | 645 | | | | |
| 01F5 | 5466 | 646 | | CALL | READF | ;BITS 2,9 |
| | | 647 | | | | |
| 01F7 | B863 | 648 | | MOV | R0,#BBUFL+3 | |
| 01F9 | B96A | 649 | | MOV | R1,#BBUFL+10 | |
| 01FB | 2304 | 650 | | MOV | A,#04H | |

| LOC | OBJ | SEQ | | SOURCE STATEMENT | | |
|---|---|---|---|---|---|---|
| 01FD | D4A9 | 651 | | CALL | WRTSTB | |
| | | 652 | | | | |
| 01FF | 5466 | 653 | | CALL | READF | ;BITS 3,10 |
| | | 654 | | | | |
| 0201 | B864 | 655 | | MOV | R0,#BBUFL+4 | |
| 0203 | B96B | 656 | | MOV | R1,#BBUFL+11 | |
| 0205 | 2303 | 657 | | MOV | A,#03H | |
| 0207 | D4A9 | 658 | | CALL | WRTSTB | |
| | | 659 | | | | |
| 0209 | 5466 | 660 | | CALL | READF | ;BITS 4,11 |
| | | 661 | | | | |
| 020B | B866 | 662 | | MOV | R0,#BBUFL+6 | |
| 020D | B965 | 663 | | MOV | R1,#BBUFL+5 | |
| 020F | 2302 | 664 | | MOV | A,#02H | |
| 0211 | D4A9 | 665 | | CALL | WRTSTB | |
| | | 666 | | | | |
| 0213 | 5466 | 667 | | CALL | READF | ;BITS 6,5 |
| | | 668 | IO12B: | | | |
| 0215 | 9A7F | 669 | | ANL | P2,#NOT FFDIS | ;ENABLE COUNTERS |
| | | 670 | IO12E: | | | |
| 0217 | 230C | 671 | | MOV | A,#0CH | ;RESET COUNTERS |
| 0219 | D4A9 | 672 | | CALL | WRTSTB | |
| 021B | 2304 | 673 | | MOV | A,#SAFSSB | ;RELEASE RESET |
| 021D | D4A9 | 674 | | CALL | WRTSTB | |
| | | 675 | | | | ;NOW SHIFT LEFT COUNT |
| | | 676 | | | | ; INTO R3,4 AND RIGHT |
| | | 677 | | | | ; INTO R5,6. |
| 021F | 27 | 678 | | CLR | A | |
| 0220 | AB | 679 | | MOV | R3,A | |
| 0221 | AD | 680 | | MOV | R5,A | |
| 0222 | B86B | 681 | | MOV | R0,#BBUFL+11 | ;POINT TO BIT 11 |
| 0224 | B97B | 682 | | MOV | R1,#BBUFR+11 | ;IN EACH ENGINE |
| 0226 | BA0C | 683 | | MOV | R2,#12 | ;12 BIT COUNTER |
| | | 684 | RAWFLO: | | | |
| 0228 | 81 | 685 | | MOVX | A,@R1 | ;RT. BIT N |
| 0229 | 67 | 686 | | RRC | A | ;BUMP BIT 0 INTO C |
| 022A | FD | 687 | | MOV | A,R5 | |
| 022B | F7 | 688 | | RLC | A | ;ROTATE C INTO A |
| 022C | AD | 689 | | MOV | R5,A | |
| 022D | FE | 690 | | MOV | A,R6 | |
| 022E | F7 | 691 | | RLC | A | |
| 022F | AE | 692 | | MOV | R6,A | |
| 0230 | 80 | 693 | | MOVX | A,@R0 | ;LEFT BIT N |
| 0231 | 67 | 694 | | RRC | A | |
| 0232 | FB | 695 | | MOV | A,R3 | |
| 0233 | F7 | 696 | | RLC | A | |
| 0234 | AB | 697 | | MOV | R3,A | |
| 0235 | FC | 698 | | MOV | A,R4 | |
| 0236 | F7 | 699 | | RLC | A | |
| 0237 | AC | 700 | | MOV | R4,A | |
| 0238 | C8 | 701 | | DEC | R0 | |
| 0239 | C9 | 702 | | DEC | R1 | |
| 023A | EA28 | 703 | | DJNZ | R2,RAWFLO | ;DONE IF ZRO |
| | | 704 | | | | |
| | | 705 | | | | ;STORE COUNTS INTO 4-ENTR |
| | | 706 | | | | ;CIRCULAR BUFFERS. |
| 023C | B829 | 707 | | MOV | R0,#RWLP | ;LFT INDEX |
| 023E | B920 | 708 | | MOV | R1,#RWRP | ;RT INDEX |
| 0240 | 81 | 709 | | MOVX | A,@R1 | ;INC POINTERS |
| 0241 | 0302 | 710 | | ADD | A,#2 | |
| 0243 | 91 | 711 | | MOVX | @R1,A | |
| 0244 | 80 | 712 | | MOVX | A,@R0 | |
| 0245 | 0302 | 713 | | ADD | A,#2 | |
| 0247 | 90 | 714 | | MOVX | @R0,A | |
| 0248 | 81 | 715 | | MOVX | A,@R1 | ;HAS RWRP REACHED END |
| 0249 | D8 | 716 | | XRL | A,R0 | ;OF ITS AREA (RWLP) ? |
| 024A | 9652 | 717 | | JNZ | PTROK | |
| | | 718 | | | | |
| 024C | F8 | 719 | | MOV | A,R0 | ;RESET POINTERS |
| 024D | 17 | 720 | | INC | A | |
| 024E | 90 | 721 | | MOVX | @R0,A | |
| 024F | F9 | 722 | | MOV | A,R1 | |
| 0250 | 17 | 723 | | INC | A | |
| 0251 | 91 | 724 | | MOVX | @R1,A | |

| LOC | OBJ | SEQ | | SOURCE STATEMENT | | |
|---|---|---|---|---|---|---|
| | | 725 | PTROK: | | | |
| 0252 | 81 | 726 | | MOVX | A,@R1 | |
| 0253 | A9 | 727 | | MOV | R1,A | |
| 0254 | D496 | 728 | | CALL | M1R56 | ;STORE RIGHT |
| | | 729 | | | | |
| 0256 | 80 | 730 | | MOVX | A,@R0 | |
| 0257 | A8 | 731 | | MOV | R0,A | |
| 0258 | D43F | 732 | | CALL | M0R34 | ;LFT STORED |
| | | 733 | ; | | | |
| | | 734 | | IF | HIGHCT | |
| 025A | 37 | 735 | | CPL | A | ;CHECK FOR BAD LF FF COUN |
| 025B | 725F | 736 | | JB3 | CHKRTC | |
| | | 737 | | | | |
| 025D | F488 | 738 | | CALL | SYSBUG | ;MSB ON IN LEFT COUNTER |
| | | 739 | CHKRTC: | | | |
| 025F | FE | 740 | | MOV | A,R6 | ;CHECK FOR BAD RT FF COUN |
| 0260 | 37 | 741 | | CPL | A | |
| 0261 | 7265 | 742 | | JB3 | FHRRET | |
| | | 743 | | | | |
| 0263 | F488 | 744 | | CALL | SYSBUG | ;MSB ON IN RIGHT COUNTER |
| | | 745 | | ENDIF | | |
| | | 746 | ; | | | |
| | | 747 | FHRRET: | | | |
| 0265 | 83 | 748 | | RET | | ;EXIT FLOHDR |
| | | 749 | ; | | | |
| | | 750 | ; | | | |
| | | 751 | ; | | | |
| | | 752 | READF: | | | |
| | | 753 | | | | ;READ 2 BITS PER COUNTER |
| | | 754 | | | | ;USED BY FLOHDR |
| | | 755 | IO14B: | | | |
| 0266 | 09 | 756 | | IN | A,P1 | |
| 0267 | 00 | 757 | | NOP | | |
| | | 758 | IO14E: | | | |
| 0268 | 90 | 759 | | MOVX | @R0,A | ;THIS SUBR DISTRIBUTES |
| 0269 | 77 | 760 | | RR | A | ;A FUEL TICK NIBBLE INTO |
| 026A | 91 | 761 | | MOVX | @R1,A | ;MEMORY VIA R0,1 |
| 026B | 77 | 762 | | RR | A | ;SHIFT TO RIGHT ENG |
| 026C | AA | 763 | | MOV | R2,A | ;SAVE A |
| 026D | 2310 | 764 | | MOV | A,#BBUFR-BBUFL | ;INC ADR FOR RT |
| 026F | 68 | 765 | | ADD | A,R0 | |
| 0270 | A8 | 766 | | MOV | R0,A | |
| 0271 | 2310 | 767 | | MOV | A,#BBUFR-BBUFL | |
| 0273 | 69 | 768 | | ADD | A,R1 | |
| 0274 | A9 | 769 | | MOV | R1,A | |
| 0275 | FA | 770 | | MOV | A,R2 | ;STORE RIGHT VALUES |
| 0276 | 90 | 771 | | MOVX | @R0,A | |
| 0277 | 77 | 772 | | RR | A | |
| 0278 | 91 | 773 | | MOVX | @R1,A | |
| 0279 | 83 | 774 | | RET | | ;EXIT READF |
| | | 775 | ; | | | |

TABLE 5

| LOC | OBJ | SEQ | | SOURCE STATEMENT | | |
|---|---|---|---|---|---|---|
| | | 776 | ; | CONVERT PULSE COUNTS TO FLOW RATES. | | |
| | | 777 | ; | SMOOTH FLOW BY OBTAINING 3*CURRENT | | |
| | | 778 | ; | PLUS SUM OF THE THREE PREVIOUS | | |
| | | 779 | ; | READINGS. COMPENSATE FOR LEFT TRANSDUCER | | |
| | | 780 | ; | ERRORS. OBTAIN NET FLOW. | | |
| | | 781 | ; | | | |
| | | 782 | FLOPRO: | | | |
| 027A | 85 | 783 | | CLR | F0 | ;NOTE RIGHT ENGINE |
| 027B | B820 | 784 | | MOV | R0,#FWRP | ;DO RT FIRST |
| 027D | B921 | 785 | | MOV | R1,#FWRP+1 | |
| | | 786 | NXTDO: | | | ;DONE ONCE PER ENGINE |
| 027F | 80 | 787 | | MOVX | A,@R0 | |
| 0280 | A8 | 788 | | MOV | R0,A | ;R0 = ADDRS OF CURRENT |
| 0281 | D481 | 789 | | CALL | R34M0 | ;R3,4 = CURRENT |
| | | 790 | | | | |
| 0283 | D47C | 791 | | CALL | R56R34 | ;COPY CURRENT TO R5,6 |

```
LOC   OBJ         SEQ               SOURCE STATEMENT

0285  D4D3        792               CALL    ADD34      ;2X CURRENT
                  793
0287  BA04        794               MOV     R2,#04H    ;SET R2 FOR CNTR
                  795  DOITST:                         ;BUFFER SUMMING LOOP
0289  D488        796               CALL    R56M1      ;GET BUF DATA
                  797
028B  19          798               INC     R1
028C  19          799               INC     R1
028D  D4D3        800               CALL    ADD34      ;SUM BUFFER
                  801
028F  EA89        802               DJNZ    R2,DOITST
                  803
0291  B69E        804               JF0     COMPEN     ;IF DONE, ADJUST VALUE.
                  805
0293  95          806               CPL     F0         ;NOTE LF ENGINE NEXT.
0294  B86E        807               MOV     R0,#RTTEMP
0296  D48F        808               CALL    M0R34      ;SAVE RT FLOW.
                  809
0298  B829        810               MOV     R0,#RWLP   ;SET FOR LFT ENG
029A  B92A        811               MOV     R1,#RWLP+1
029C  447F        812               JMP     NXTDO      ;NOW DO LFT ENG
                  813  COMPEN:
029E  B925        814               MOV     R1,#ICONF  ;ADJUST LF FLOW
02A0  F1          815               MOV     A,@R1      ;A = CONFIG
02A1  37          816               CPL     A
02A2  D2BB        817               JB6     TSTLBS     ;NEED TO ADJUST ?
                  818
02A4  B87E        819               MOV     R0,#LFTEMP ;YES.
02A6  D48F        820               CALL    M0R34      ;SAVE LF FLOW
                  821
02A8  2306        822               MOV     A,#6
02AA  D4F2        823               CALL    SR34       ;DIVIDE BY 64
                  824
02AC  FB          825               MOV     A,R3
02AD  AD          826               MOV     R5,A
02AE  FC          827               MOV     A,R4
02AF  AE          828               MOV     R6,A       ;R5,6 = LF FLOW/64
02B0  D481        829               CALL    R34M0      ;R3,4 = LF FLOW
                  830
02B2  F1          831               MOV     A,@R1      ;A = CONFIG
02B3  B2B9        832               JB5     DELP       ;ADD OR SUB ?
                  833  ;                   1 => + IS POSITIVE CORRECTION TO
                  834  ;                   PULSE COUNT TO AGREE WITH RIGHT.
                  835  ;                   (I.E., LEFT REGISTERED TOO FEW PULSES.)
02B5  D4DA        836               CALL    SUB34
02B7  44BB        837               JMP     TSTLBS
                  838  DELP:
02B9  D4D3        839               CALL    ADD34
                  840  TSTLBS:
02BB  B825        841               MOV     R0,#ICONF
02BD  F0          842               MOV     A,@R0      ;LBS OR GALS ?
02BE  37          843               CPL     A
02BF  F2CF        844               JB7     GALS
                  845  LBS:
02C1  B812        846               MOV     R0,#FL     ;STORE LEFT FLOW
02C3  D48F        847               CALL    M0R34
                  848
02C5  B96E        849               MOV     R1,#RTTEMP ;PICK UP RT FLOW
02C7  D488        850               CALL    R56M1
                  851
02C9  B910        852               MOV     R1,#FR     ;STORE RT FLOW
02CB  D496        853               CALL    M1R56
                  854
02CD  44E7        855               JMP     FSUM       ;NOW SUM AND STO
                  856  GALS:
02CF  D4FF        857               CALL    DIVLGR     ;DIVIDE FL BY LG
02D1  B812        858               MOV     R0,#FL     ;STORE FL
02D3  D48F        859               CALL    M0R34
                  860
02D5  B86E        861               MOV     R0,#RTTEMP ;GET FR
02D7  D481        862               CALL    R34M0
                  863
02D9  D4FF        864               CALL    DIVLGR     ;DIVIDE FR BY LG
                  865
```

| LOC | OBJ | SEQ | | SOURCE STATEMENT | | |
|---|---|---|---|---|---|---|
| 02DB | B810 | 866 | | MOV | R0,#FR | |
| 02DD | D48F | 867 | | CALL | M0R34 | ;STORE RT |
| | | 868 | | | | |
| 02DF | B812 | 869 | | MOV | R0,#FL | |
| 02E1 | B910 | 870 | | MOV | R1,#FR | |
| 02E3 | D481 | 871 | | CALL | R34M0 | ;R3,4 = FL |
| | | 872 | | | | |
| 02E5 | D488 | 873 | | CALL | R56M1 | ;R5,6 = FR |
| | | 874 | FSUM: | | | |
| 02E7 | B825 | 875 | | MOV | R0,#ICONF | ;ADD OR SUBTRACT FL+-F |
| 02E9 | F0 | 876 | | MOV | A,@R0 | ;SUBTRACT FOR SINGLE ENGI |
| 02EA | 12F0 | 877 | | JB0 | DODIF | ;SINGLE ENGINE ? |
| | | 878 | | | | |
| 02EC | D4D3 | 879 | | CALL | ADD34 | ;FT = FL + FR  FOR SE = 0 |
| | | 880 | | | | |
| 02EE | 44F2 | 881 | | JMP | FSMDON | |
| | | 882 | DODIF: | | | |
| 02F0 | D4DA | 883 | | CALL | SUB34 | ;FT = FL - FR  FOR SE = 1 |
| | | 884 | FSMDON: | | | |
| 02F2 | 37 | 885 | | CPL | A | ;CHECK FOR FT < 0 |
| 02F3 | F2F8 | 886 | | JB7 | FTOK | |
| | | 887 | ; | | | |
| | | 888 | | IF | NEGFT | |
| | | 889 | | CALL | SYSBUG | ;FT < 0 (NET FLOW NEG) |
| | | 890 | | | | ;????? REALLY WANT ERROR |
| | | 891 | | ENDIF | | |
| | | 892 | ; | | | |
| 02F5 | 27 | 893 | | CLR | A | |
| 02F6 | AB | 894 | | MOV | R3,A | ;FT <- 0 |
| 02F7 | AC | 895 | | MOV | R4,A | |
| | | 896 | FTOK: | | | |
| 02F8 | B814 | 897 | | MOV | R0,#FT | ;POINT TO FT |
| 02FA | D48F | 898 | | CALL | M0R34 | ;FT DONE |
| 02FC | 83 | 899 | | RET | | ;EXIT FLOPPO |
| | | 900 | ; | | | |

TABLE 6

| LOC | OBJ | SEQ | | SOURCE STATEMENT | | |
|---|---|---|---|---|---|---|
| | | 901 | ; | CALCULATE FUEL QUANTITIES CONSUMED | | |
| | | 902 | ; | AND REMAINING AND PERCENT REMAINING. | | |
| | | 903 | ; | | | |
| | | 904 | QCALC: | | | |
| 02FD | B814 | 905 | | MOV | R0,#FT | |
| 02FF | D481 | 906 | | CALL | R34M0 | ;R3,4 = FT |
| | | 907 | | | | |
| 0301 | B94E | 908 | | MOV | R1,#WCNT | |
| 0303 | D488 | 909 | | CALL | R56M1 | ;R5,6 = OLD WCNT |
| | | 910 | | | | |
| 0305 | D4D3 | 911 | | CALL | ADD34 | ;R3,4 = OLD WCNT + FT |
| | | 912 | | | | |
| 0307 | ED44 | 913 | | MOV | R5,#LOW SCT | ;NOW DIVIDE R3,4 BY |
| 0309 | BE21 | 914 | | MOV | R6,#HIGH SCT | ;# PULSES PER 0.1 G |
| 030B | F411 | 915 | | CALL | DIVIDE | ;R3,4 = QUOTIENT |
| | | 916 | | | | ;     = 0.1 GALS CONSUMED |
| | | 917 | | | | ;R5,6 = REMAINDER |
| | | 918 | | | | ;     = NEW WCNT |
| 030D | B94E | 919 | | MOV | R1,#WCNT | |
| 030F | D496 | 920 | | CALL | M1R56 | ;STORE NEW WCNT |
| | | 921 | | | | |
| 0311 | B90E | 922 | | MOV | R1,#QC | |
| 0313 | D488 | 923 | | CALL | R56M1 | ;R5,6 = OLD QC |
| | | 924 | | | | |
| 0315 | D4D3 | 925 | | CALL | ADD34 | ;R3,4 = NEW QC |
| | | 926 | | | | |
| 0317 | D47C | 927 | | CALL | R56R34 | ;R5,6 = NEW QC |
| | | 928 | | | | |
| 0319 | D496 | 929 | | CALL | M1R56 | ;STORE NEW QC |
| | | 930 | | | | |
| 031B | B808 | 931 | | MOV | R0,#QQ | |
| 031D | D481 | 932 | | CALL | R34M0 | ;R3,4 = QQ |
| | | 933 | | | | |

| LOC | OBJ | SEQ | | SOURCE STATEMENT | | |
|---|---|---|---|---|---|---|
| 031F | D4DA | 934 | | CALL | SUB34 | ;R3,4 = QR = Q0 - QC |
| | | 935 | | | | |
| 0321 | 37 | 936 | | CPL | A | |
| 0322 | F227 | 937 | | JB7 | NOTNUL | ;QR NEGATIVE ? |
| | | 938 | ; | | | |
| | | 939 | | IF | NEGQR | |
| | | 940 | | CALL | SYSBUG | ;COMPLAIN QR < 0 |
| | | 941 | ;???? | WITH INACCURACY FROM THE SHORTAGE OF | | |
| | | 942 | ;???? | 74C89 BITS. THIS MAY OCCUR FREQUENTLY. | | |
| | | 943 | ;???? | IN GENERAL, WE CAN'T HANDLE NEGATIVE NUMB | | |
| | | 944 | ;???? | OR WE WOULD JUST DISPLAY IT NEGATIVE. XXX | | |
| | | 945 | ;???? | TURN OFF THIS SYSBUG CALL AFTER DEBUG ?? | | |
| | | 946 | | ENDIF | | |
| | | 947 | ; | | | |
| 0324 | 27 | 948 | | CLR | A | ;ZERO IT |
| 0325 | AB | 949 | | MOV | R3,A | |
| 0326 | AC | 950 | | MOV | R4,A | |
| | | 951 | NOTNUL: | | | |
| 0327 | B80C | 952 | | MOV | R0,#QR | ;STORE QR. |
| 0329 | D48F | 953 | | CALL | M0R34 | |
| | | 954 | | | | ;COMPUTE 10*QR/Q0 |
| | | 955 | | | | ;ASSUMING QR <= Q0 |
| 032B | D4BD | 956 | | CALL | TENX | |
| | | 957 | | | | |
| 032D | B908 | 958 | | MOV | R1,#Q0 | |
| 032F | D488 | 959 | | CALL | R56M1 | ;R5,6 = Q0 |
| | | 960 | | | | |
| 0331 | 4D | 961 | | ORL | A,R5 | ;Q0 ZERO ? |
| 0332 | 9638 | 962 | | JNZ | PRDIV | ;IF NOT, DIVIDE. |
| | | 963 | | | | |
| 0334 | BB0F | 964 | | MOV | R3,#0FH | ;BLANK DISPLAY IF Q0 = 0 |
| 0336 | 6441 | 965 | | JMP | VALSTR | |
| | | 966 | PRDIV: | | | |
| 0338 | F411 | 967 | | CALL | DIVIDE | |
| | | 968 | | | | |
| 033A | FB | 969 | | MOV | A,R3 | ;CHECK FOR 100% |
| 033B | D30A | 970 | | XRL | A,#0AH | ;AND FORCE TO 9 |
| 033D | 9641 | 971 | | JNZ | VALSTR | |
| | | 972 | | | | |
| 033F | BB09 | 973 | | MOV | R3,#09H | |
| | | 974 | VALSTR: | | | |
| 0341 | FB | 975 | | MOV | A,R3 | ;A IS IN RANGE 0-9,F |
| 0342 | B832 | 976 | | MOV | R0,#IPCT | ;STORE VALUE |
| 0344 | 47 | 977 | | SWAP | A | ;INTO UPPER IPCT. |
| 0345 | 30 | 978 | | XCHD | A,@R0 | |
| 0346 | A0 | 979 | | MOV | @R0,A | |
| | | 980 | QREX: | | | |
| 0347 | 83 | 981 | | RET | | ;EXIT QREMIN |

TABLE 7

| LOC | OBJ | SEQ | | SOURCE STATEMENT | | |
|---|---|---|---|---|---|---|
| | | 982 | ; | | | |
| | | 983 | ; | CALCULATE TIME REMAINING AT PRESENT FT. | | |
| | | 984 | ; | | | |
| | | 985 | TRCALC: | | | |
| 0348 | B80C | 986 | | MOV | R0,#QR | ;POINT TO QR |
| 034A | D491 | 987 | | CALL | R34M0 | |
| | | 988 | | | | |
| 034C | D4BD | 989 | | CALL | TENX | ;R3,4 <- 10*QR |
| | | 990 | | | | |
| 034E | B914 | 991 | | MOV | R1,#FT | ;CHECK FOR 0 DIVIDE |
| 0350 | D488 | 992 | | CALL | R56M1 | |
| | | 993 | | | | |
| 0352 | 4D | 994 | | ORL | A,R5 | |
| 0353 | C65A | 995 | | JZ | BADTR | |
| | | 996 | | | | |
| 0355 | F411 | 997 | | CALL | DIVIDE | ;R3,4 <- 10*QR/FT |
| | | 998 | | | | |
| 0357 | 37 | 999 | | CPL | A | ;TR NEG OR LARGE ? |
| 0358 | F25E | 1000 | | JB7 | TRSET | |
| | | 1001 | BADTR: | | | |
| 035A | BBFF | 1002 | | MOV | R3,#0FFH | ;USE MAX POSITIVE # |

| LOC | OBJ | SEQ | | SOURCE STATEMENT | | |
|---|---|---|---|---|---|---|
| | | 1003 | | MOV | R4,#07FH | |
| | | 1004 | TRSET: | | | |
| 035E | B816 | 1005 | | MOV | R0,#TR | ;STORE TR |
| 0360 | D48F | 1006 | | CALL | M0R34 | |
| | | 1007 | | | | |
| 0362 | 83 | 1008 | | RET | | ;EXIT TRCALC |
| | | 1009 | ; | | | |

TABLE 8

| LOC | OBJ | SEQ | | SOURCE STATEMENT | | |
|---|---|---|---|---|---|---|
| | | 1010 | ; | GENERATE COMMAND STATE WORD | | |
| | | 1011 | ; | | | |
| | | 1012 | CMDGEN: | | | |
| 0363 | 27 | 1013 | | CLR | A | ;CLEAR IDCTL |
| 0364 | B835 | 1014 | | MOV | R0,#IDCTL | ;AND LIGHTS |
| 0366 | A0 | 1015 | | MOV | @R0,A | |
| 0367 | B832 | 1016 | | MOV | R0,#IPCT | |
| 0369 | 30 | 1017 | | XCHD | A,@R0 | |
| | | 1018 | ; | | | |
| 036A | B828 | 1019 | | MOV | R0,#ICMD | ;LOOK AT NEW(?) CMD |
| 036C | F0 | 1020 | | MOV | A,@R0 | ;A = NEW CMD |
| 036D | B926 | 1021 | | MOV | R1,#IOLDCM | |
| 036F | 21 | 1022 | | XCH | A,@R1 | ;OLD <- NEW |
| 0370 | D1 | 1023 | | XRL | A,@R1 | |
| 0371 | AA | 1024 | | MOV | R2,A | ;R2 = NEW XOR OLD |
| 0372 | F0 | 1025 | | MOV | A,@R0 | |
| 0373 | 5303 | 1026 | | ANL | A,#03H | |
| 0375 | 430C | 1027 | | ORL | A,#00CH | |
| 0377 | 5A | 1028 | | ANL | A,R2 | ;LIMIT STEP & RESET TO |
| 0378 | 47 | 1029 | | SWAP | A | ;POSITIVE TRANSITIONS |
| 0379 | AA | 1030 | | MOV | R2,A | ;MOVE TO UPPER HEXIT. |
| 037A | F0 | 1031 | | MOV | A,@R0 | |
| 037B | 530C | 1032 | | ANL | A,#00CH | |
| 037D | 4A | 1033 | | ORL | A,R2 | |
| 037E | B922 | 1034 | | MOV | R1,#ICMDST | ;BRING IN OLD |
| 0380 | 21 | 1035 | | XCH | A,@R1 | ;STEPPED BIT |
| 0381 | 5302 | 1036 | | ANL | A,#002H | |
| 0383 | 41 | 1037 | | ORL | A,@R1 | |
| 0384 | B28C | 1038 | | JB5 | SETSTP | ;SET IF STEPPED |
| | | 1039 | | | | |
| 0386 | D290 | 1040 | | JB6 | RSTSTP | ;RESET IF UP OR DN |
| | | 1041 | | | | |
| 0388 | F290 | 1042 | | JB7 | RSTSTP | ;TRANSITION MADE |
| | | 1043 | | | | |
| 038A | 6492 | 1044 | | JMP | CMDGND | |
| | | 1045 | SETSTP: | | | |
| 038C | 4302 | 1046 | | ORL | A,#002H | |
| 038E | 6492 | 1047 | | JMP | CMDGND | |
| | | 1048 | RSTSTP: | | | |
| 0390 | 53FD | 1049 | | ANL | A,#0FDH | |
| | | 1050 | CMDGND: | | | |
| 0392 | A1 | 1051 | | MOV | @R1,A | ;STORE ICMDST |
| 0393 | 83 | 1052 | | RET | | ;EXIT CMDGEN |
| | | 1053 | ; | | | |

TABLE 9

| LOC | OBJ | SEQ | | SOURCE STATEMENT | | |
|---|---|---|---|---|---|---|
| | | 1054 | ; | CHECK FOR TR AND RATE ALARMS. | | |
| | | 1055 | ; | | | |
| | | 1056 | ALMDET: | | | |
| 0394 | BA00 | 1057 | | MOV | R2,#00 | ;R2 FOR LIGHTS (IPCT) |
| 0396 | B900 | 1058 | | MOV | R1,#00 | ;R1 FOR FLASH (ICTL) |
| 0398 | BF00 | 1059 | | MOV | R7,#00 | ;F7 FOR L & R ALARMS |
| | | 1060 | | | | ;CHECK TR AND SET LIGHT 2 |
| | | 1061 | | | | ;ACCORDINGLY |
| 039A | B816 | 1062 | | MOV | R0,#TR | ;POINT TO TR |
| 039C | D481 | 1063 | | CALL | R34M0 | |

| LOC | OBJ | SEQ | SOURCE STATEMENT | | |
|---|---|---|---|---|---|
| | | 1064 | | | |
| 039E | BD06 | 1065 | MOV | R5,#06H | ;0.5 HR OR LESS ? |
| 03A0 | BE00 | 1066 | MOV | R6,#00 | ;ALARM LEVEL |
| 03A2 | D4DA | 1067 | CALL | SUB34 | |
| | | 1068 | | | |
| 03A4 | F2AE | 1069 | JB7 | FLASH | |
| | | 1070 | | | |
| 03A6 | BD03 | 1071 | MOV | R5,#9-6 | ;0.8 HR OR LESS ? |
| 03A8 | D4DA | 1072 | CALL | SUB34 | |
| | | 1073 | | | |
| 03AA | F2B0 | 1074 | JB7 | ST | ? |
| | | 1075 | | | |
| 03AC | 64B2 | 1076 | JMP | SETR | ;SO SET A2 OFF |
| | | 1077 FLASH: | | | |
| 03AE | B904 | 1078 | MOV | R1,#04H | |
| | | 1079 STEADY: | | | |
| 03B0 | BA04 | 1080 | MOV | R2,#04H | |
| | | 1081 SETR: | | | ;R1 = FLASH FLAG; R2 = LI |
| 03B2 | B820 | 1082 | MOV | R0,#ICONV | ;SET ALARM IN ICONV |
| 03B4 | F0 | 1083 | MOV | A,@R0 | ;IF FLASHING |
| 03B5 | 53D3 | 1084 | ANL | A,#0D3H | ;(CLEAR RATE ALARMS) |
| 03B7 | A0 | 1085 | MOV | @R0,A | |
| 03B8 | F9 | 1086 | MOV | A,R1 | |
| 03B9 | E7 | 1087 | RL | A | |
| 03BA | E7 | 1088 | RL | A | |
| 03BB | E7 | 1089 | RL | A | |
| 03BC | 40 | 1090 | ORL | A,@R0 | |
| 03BD | A0 | 1091 | MOV | @R0,A | |
| 03BE | F9 | 1092 | MOV | A,R1 | ;SET FLASH IN IDCTL |
| 03BF | B835 | 1093 | MOV | R0,#IDCTL | |
| 03C1 | 40 | 1094 | ORL | A,@R0 | |
| 03C2 | A0 | 1095 | MOV | @R0,A | |
| 03C3 | FA | 1096 | MOV | A,R2 | ;SET LIGHT |
| 03C4 | B832 | 1097 | MOV | R0,#IFCT | |
| 03C6 | 40 | 1098 | ORL | A,@R0 | |
| 03C7 | A0 | 1099 | MOV | @R0,A | |
| 03C8 | B822 | 1100 | MOV | R0,#ICMDST | ;CHANGING RATE ALARM |
| 03CA | B920 | 1101 | MOV | R1,#ICONV | |
| 03CC | F0 | 1102 | MOV | A,@R0 | ;A = ICMDST |
| 03CD | 8400 | 1103 | JMP | LL10 | ;????? FIX FOR PROMPT 48 |
| | | 1104 ;???????????????????????????????????????????????? | | | |
| | | 1105 LIBEL: | | | ;????? |
| | | 1106 | IF | LIBEL GE 03F0H | |
| | | 1107 | XXX | | ;ASSEMBLE ERROR |
| | | 1108 | | | ;PROMPT 48 SPACE MISALIGN |
| | | 1109 | ENDIF | | |
| | | 1110 | | | ;????? RESERVE 16 BYTES |
| 0400 | | 1111 | ORG | 0400H | ;????? AT 03F0H FOR |
| | | 1112 | | | ;????? PROMPT 48 |
| | | 1113 ;???????????????????????????????????????????????? | | | |
| | | 1114 LL10: | | | ;????? FIX FOR PROMPT 48 |
| 0400 | 532C | 1115 | ANL | A,#02CH | |
| 0402 | D320 | 1116 | XRL | A,#020H | |
| 0404 | 961F | 1117 | JNZ | NOCHG | ;IF NOT, DON'T CHANGE |
| | | 1118 | | | |
| 0406 | F1 | 1119 | MOV | A,@R1 | ;CHANGE ARMED BIT IN ICON |
| 0407 | D310 | 1120 | XRL | A,#010H | |
| 0409 | A1 | 1121 | MOV | @R1,A | |
| 040A | 37 | 1122 | CPL | A | |
| 040B | 9254 | 1123 | JB4 | NOLARM | ;IF TURNING OFF, DONE. |
| | | 1124 | | | |
| 040D | B812 | 1125 | MOV | R0,#FL | ;IF TURNING ON, |
| 040F | D481 | 1126 | CALL | R34M0 | ;COPY FL & FR INTO STANDA |
| | | 1127 | | | |
| 0411 | B832 | 1128 | MOV | R0,#FLSTND | |
| 0413 | D48F | 1129 | CALL | M0R34 | |
| | | 1130 | | | |
| 0415 | B810 | 1131 | MOV | R0,#FR | |
| 0417 | D481 | 1132 | CALL | R34M0 | |
| | | 1133 | | | |
| 0419 | B834 | 1134 | MOV | R0,#FRSTND | |
| 041B | D48F | 1135 | CALL | M0R34 | |
| | | 1136 | | | |

```
LOC   OBJ          SEQ               SOURCE STATEMENT 041D  8447         1137             JMP     NEITHR    ;GO NOTE ARMING IN LIGHT.
                   1138  NOACHG:                      ;NO CHANGE IN ARMING
041F  BF00         1139             MOV     R7,#00    ;(INIT ALARM FLAG)
0421  F1           1140             MOV     A,@R1     ;RATE ALARM ARMED ?
0422  37           1141             CPL     A
0423  9254         1142             JB4     NOLARM    ;IF NOT SKIP RATE CHECKIN
                   1143
0425  BA04         1144             MOV     R2,#RANGCT
0427  B832         1145             MOV     R0,#FLSTND
0429  B912         1146             MOV     R1,#FL    ;CHECK FL AGAINST FLSTND
042B  946D         1147             CALL    INRANG
042D  C631         1148             JZ      RLARM
                   1149
042F  BF08         1150             MOV     R7,#008H  ;SET LEFT RATE ALARM
                   1151  RLARM:
0431  BA04         1152             MOV     R2,#RANGCT
0433  B834         1153             MOV     R0,#FRSTND
0435  B910         1154             MOV     R1,#FR    ;CHECK FR AGAINST FRSTND
0437  9463         1155             CALL    INRANG
0439  C63D         1156             JZ      RLARMD
                   1157
043B  2304         1158             MOV     A,#004H   ;SET RIGHT RATE ALARM
                   1159  RLARMD:
043D  4F           1160             ORL     A,R7      ;COMBINE L & R ALARMS
043E  AF           1161             MOV     R7,A
043F  C647         1162             JZ      NEITHR
                   1163
0441  B835         1164             MOV     R0,#IDCTL ;IF RATE ALARMED,
0443  2308         1165             MOV     A,#008H   ;FLASH RATE LIGHT
0445  40           1166             ORL     A,@R0
0446  A0           1167             MOV     @R0,A
                   1168  NEITHR:
0447  B920         1169             MOV     R1,#ICONV ;NOTE L & R ALARMS.
0449  F1           1170             MOV     A,@R1
044A  53F3         1171             ANL     A,#0F3H
044C  4F           1172             ORL     A,R7      ;SET INTO ICONV
044D  A1           1173             MOV     @R1,A
                   1174  SETARM:
044E  B832         1175             MOV     R0,#IPCT  ;SET ON RATE LIGHT
0450  2308         1176             MOV     A,#008H   ;TO INDICATE ARMED
0452  40           1177             ORL     A,@R0
0453  A0           1178             MOV     @R0,A
                   1179  NOLARM:
0454  F1           1180             MOV     A,@R1     ;A = ICONV
0455  532C         1181             ANL     A,#02CH   ;TR OR FLOW ALARM ?
0457  C658         1182             JZ      ALMFND
                   1183
0459  2320         1184             MOV     A,#020H   ;TURN ON PC5 OF 8156
                   1185  ALMFND:
                   1186  IO13B:
045B  8A04         1187             ORL     P2,#M1IO  ;USE 8156 IO
045D  B903         1188             MOV     R1,#03H   ;SELECT PORT C
045F  91           1189             MOVX    @R1,A
0460  9AFB         1190             ANL     P2,#NOT M1IO ;RESELECT RAM
                   1191  IO13E:
0462  83           1192             RET               ;EXIT ALMDET
                   1193  ;
                   1194  ;        DETERMINE IF A 2-BYTE POSITIVE
                   1195  ;        VARIABLE IS WITHIN A CERTAIN
                   1196  ;        PERCENTAGE OF A 2-BYTE POSITIVE
                   1197  ;        STANDARD. THE PERCENTAGE IS
                   1198  ;        DEFINED IN TERMS OF RIGHT SHIFTS
                   1199  ;        OF THE STANDARD TO GET ALLOWABLE
                   1200  ;        DELTA RANGE.
                   1201  ;
                   1202  ;                R0 -> STANDARD
                   1203  ;                R1 -> VARIABLE
                   1204  ;                R2 -> #SHIFTS FOR ALLOWED
                   1205  ;                        DEVIATION
                   1206  ;        CALL    INRANG
                   1207  ;                A = 0 IN RANGE, ELSE OUT
                   1208  ;                R0,1 UNCHANGED
                   1209  ;                R2,4,5,6 = ?
                   1210  ;
```

| LOC | OBJ | SEQ | | SOURCE STATEMENT | | |
|---|---|---|---|---|---|---|
| | | 1211 | INRANG: | | | |
| 0463 | 85 | 1212 | | CLR | F0 | |
| 0464 | D481 | 1213 | | CALL | R34M0 | |
| 0466 | D488 | 1214 | | CALL | R56M1 | |
| 0468 | D4DA | 1215 | | CALL | SUB34 | ;R3,4 = STND - VAR |
| 046A | F26D | 1216 | | JB7 | VARHI | |
| | | 1217 | VARLOE: | | | |
| 046C | 95 | 1218 | | CPL | F0 | ;F0 = 1 => VAR <= STND |
| | | 1219 | VARHI: | | | ;F0 = 0 => VAR > STND |
| 046D | D481 | 1220 | | CALL | R34M0 | |
| 046F | FA | 1221 | | MOV | A,R2 | |
| 0470 | D4F2 | 1222 | | CALL | SR34 | ;R3,4 = DELTA (% OF STND) |
| 0472 | D47C | 1223 | | CALL | R56R34 | ;R5,6 = DELTA |
| 0474 | D481 | 1224 | | CALL | R34M0 | ;R3,4 = STND |
| 0476 | B682 | 1225 | | JF0 | ISUBIT | |
| | | 1226 | | | | |
| 0478 | D4D3 | 1227 | | CALL | ADD34 | ;R3,4 = STND + DELTA |
| 047A | D488 | 1228 | | CALL | R56M1 | |
| 047C | D4DA | 1229 | | CALL | SUB34 | ;R3,4 = (STND+DELTA)-VAR |
| 047E | F28D | 1230 | | JB7 | INRBAD | |
| | | 1231 | | | | |
| 0480 | 8491 | 1232 | | JMP | INROK | |
| | | 1233 | ISUBIT: | | | |
| 0482 | D4DA | 1234 | | CALL | SUB34 | ;R3,4 = STND - DELTA |
| 0484 | D488 | 1235 | | CALL | R56M1 | |
| 0486 | D4DA | 1236 | | CALL | SUB34 | ;R3,4 = (STND-DELTA)-VAR |
| 0488 | F291 | 1237 | | JB7 | INROK | |
| | | 1238 | | | | |
| 048A | 4B | 1239 | | ORL | A,R3 | |
| 048B | C691 | 1240 | | JZ | INROK | |
| | | 1241 | INRBAD: | | | |
| 048D | 2301 | 1242 | | MOV | A,#01 | ;INDICATE OUT OF RANGE |
| 048F | 8492 | 1243 | | JMP | INRRET | |
| | | 1244 | INROK: | | | |
| 0491 | 27 | 1245 | | CLR | A | ;INDICATE IN RANGE |
| | | 1246 | INRRET: | | | |
| 0492 | 83 | 1247 | | RET | | ;EXIT INRANGE |
| | | 1248 | ; | | | |

TABLE 10

| LOC | OBJ | SEQ | | SOURCE STATEMENT | | |
|---|---|---|---|---|---|---|
| | | 1249 | ; | DECIDE WHAT TO DISPLAY. | | |
| | | 1250 | ; | | | |
| | | 1251 | DPYGEN: | | | |
| 0493 | B920 | 1252 | | MOV | R1,#ICONV | |
| 0495 | B822 | 1253 | | MOV | R0,#ICMDST | ;DID WE JUST RESE |
| 0497 | F0 | 1254 | | MOV | A,@R0 | ;IF SO, CLEAR ERROR, CLEA |
| 0498 | 92D3 | 1255 | | JB4 | NEWRST | ;AND DO LIGHT TEST. |
| | | 1256 | | | | |
| 049A | F1 | 1257 | | MOV | A,@R1 | ;PENDING ERROR? |
| 049B | AE | 1258 | | MOV | R6,A | ;R6 = ICONV |
| 049C | F2F9 | 1259 | | JB7 | SBGDPY | ;IF SO, SET UP SYSBUG DIS |
| | | 1260 | | | | |
| 049E | B928 | 1261 | | MOV | R1,#ICMD | ;RESET SWITCH ON? |
| 04A0 | F1 | 1262 | | MOV | A,@R1 | ;IF SO, DO LOOP TEST |
| 04A1 | 12E8 | 1263 | | JB0 | RSTDPY | |
| | | 1264 | | | | |
| 04A3 | 37 | 1265 | | CPL | A | |
| 04A4 | 22A8 | 1266 | | JB1 | LL15 | ;???? FIX FOR OUTPAGE JM |
| | | 1267 | | | | |
| 04A6 | A4BD | 1268 | | JMP | STPDPY | ;IF STEP ON, DO CLOCK. |
| | | 1269 | LL15: | | | |
| 04A8 | F0 | 1270 | | MOV | A,@R0 | ;A = ICMDST |
| 04A9 | B833 | 1271 | | MOV | R0,#INPTR | ;R0 -> INPTR |
| 04AB | BF00 | 1272 | | MOV | R7,#00 | ;L & R LIGHTS IMAGE |
| | | 1273 | | | | ;(IDCTL,IPCT) |
| 04AD | 530E | 1274 | | ANL | A,#00EH | |
| 04AF | 77 | 1275 | | RR | A | |

```
LOC  OBJ        SEQ           SOURCE STATEMENT

04B0 03B3       1276          ADD     A,#LOW DPYBRT
04B2 B3         1277          JMPP    @A
                1278 DPYBRT:                          ;D  U  S/D
04B3 C5         1279          DB      LOW DSE         ;0  0  0
04B4 C5         1280          DB      LOW DSE         ;0  0  1
04B5 BF         1281          DB      LOW JQCTR       ;0  1  0
04B6 C8         1282          DB      LOW DSEN        ;0  1  1
04B7 C1         1283          DB      LOW JQRTR       ;1  0  0
04B8 C3         1284          DB      LOW JLRTR       ;1  0  1
04B9 BB         1285          DB      LOW DPYBRE      ;1  1  0
04BA BB         1286          DB      LOW DPYBRE      ;1  1  1
                1287 DPYBRE:
04BB F488       1288          CALL    SYSBUG    ;UP & DOWN BOTH SET
04BD 84F9       1289          JMP     SEGDPY
                1290 JQCTR:
04BF A429       1291          JMP     QCTR
                1292 JQRTR:
04C1 A42D       1293          JMP     QRTR
                1294 JLRTR:
04C3 A43C       1295          JMP     FLFPTR
                1296 DSE:                         ;CHOOSE DISPLAY DEPENDING
                1297                              ;SINGLE VS MULTIENGINE
                1298                              ;SE => FTTR; ELSE FLFR
04C5 27         1299          CLR     A
04C6 84CA       1300          JMP     DSECOM
                1301 DSEN:                        ;SE => FLFR; ELSE FTTR
04C8 2301       1302          MOV     A,#001H   ;SE FLAG IS BIT 1 OF ICON
                1303 DSECOM:
04CA B925       1304          MOV     R1,#ICONF
04CC D1         1305          XRL     A,@R1
04CD 12D1       1306          JB0     FTTRJ
                1307
04CF A45F       1308          JMP     FLFR
                1309 FTTRJ:
04D1 A431       1310          JMP     FTTR
                1311 ;
                1312          IF      (HIGH DPYBRT) NE (HIGH DSEN)
                1313          XXX     ;ASSEMBLE ERROR IF JMPP PAGE ERRO
                1314          ENDIF
                1315 ;
                1316 NEWRST:                      ;NEWLY RECOGNIZED RESET
04D3 B920       1317          MOV     R1,#ICONV ;CLEAR SYSBUG ERROR FL
04D5 F1         1318          MOV     A,@R1
04D6 537F       1319          ANL     A,#07FH
04D8 21         1320          XCH     A,@R1     ;DON'T ZERO CLOCK IF SYSB
04D9 F2E8       1321          JB7     RSTDPY    ;ERROR IS BEING CLEARED.
                1322
04DB 27         1323          CLR     A         ;CLEAR ELAPSED TIME CLOCK
04DC B929       1324          MOV     R1,#ITBCTR
04DE A1         1325          MOV     @R1,A
04DF 19         1326          INC     R1
04E0 A1         1327          MOV     @R1,A
04E1 B92B       1328          MOV     R1,#IRTC
04E3 A1         1329          MOV     @R1,A
04E4 19         1330          INC     R1
04E5 A1         1331          MOV     @R1,A
04E6 19         1332          INC     R1
04E7 A1         1333          MOV     @R1,A
                1334 RSTDPY:                      ;DISPLAY LAMP TEST
                1335                              ;(EVERYTING ON)
04E8 BA09       1336          MOV     R2,#9     ;SET ALL DIGITS TO 8
04EA B836       1337          MOV     R0,#IDPY  ;IN THE BUFFER
                1338 DSLOOP:
04EC 2308       1339          MOV     A,#008H
04EE 30         1340          XCHD    A,@R0
04EF 18         1341          INC     R0
04F0 EAEC       1342          DJNZ    R2,DSLOOP
                1343
04F2 B836       1344          MOV     R0,#IA    ;SET LIGHTS ON.
04F4 230F       1345          MOV     A,#00FH
04F6 30         1346          XCHD    A,@R0
04F7 A480       1347          JMP     DPGRET    ;ALL DONE
                1348 ;
```

| LOC | OBJ | SEQ | | SOURCE STATEMENT | |
|---|---|---|---|---|---|
| | | 1349 | SBGDPY: | | ;DISPLAY ERROR AND E'S |
| 04F9 | B835 | 1350 | MOV | R0,#IDCTL | |
| 04FB | F0 | 1351 | MOV | A,@R0 | ;FLASH UPPER DISPLAY (ERR |
| 04FC | 4360 | 1352 | ORL | A,#060H | ;AND INHIBIT LOWER (E'S) |
| 04FE | A0 | 1353 | MOV | @R0,A | |
| 04FF | B833 | 1354 | MOV | R0,#INPTR | ;USE SYSBUG'S CALLER |
| 0501 | B05E | 1355 | MOV | @R0,#SBGERR | ;FOR UPPER DISPLAY |
| 0503 | 23DD | 1356 | MOV | A,#0DDH | ;USE "EEE" IN LOWER DISPL |
| 0505 | AB | 1357 | MOV | R3,A | |
| 0506 | AC | 1358 | MOV | R4,A | |
| 0507 | B93C | 1359 | MOV | R1,#IDM | |
| 0509 | D49D | 1360 | CALL | NXLOAD | |
| 050B | A480 | 1361 | JMP | DPGRET | ;DONE |
| | | 1362 ; | | | |
| | | 1363 | STPDPY: | | ;DISPLAY CLOCK WHILE STEP |
| 050D | B835 | 1364 | MOV | R0,#IDCTL | ;INHIBIT UPDATE |
| 050F | F0 | 1365 | MOV | A,@R0 | ;OF BOTH DISPLAYS |
| 0510 | 43C0 | 1366 | ORL | A,#0C0H | |
| 0512 | A0 | 1367 | MOV | @R0,A | |
| 0513 | B82B | 1368 | MOV | R0,#IRTC | ;PUT RTC SECONDS |
| 0515 | F0 | 1369 | MOV | A,@R0 | ;IN LOWER DISPLAY |
| 0516 | AB | 1370 | MOV | R3,A | |
| 0517 | BCFF | 1371 | MOV | R4,#0FFH | |
| 0519 | B93C | 1372 | MOV | R1,#IDM | |
| 051B | D49D | 1373 | CALL | NXLOAD | |
| | | 1374 | | | |
| 051D | 18 | 1375 | INC | R0 | ;PUT RTC HR AND MIN |
| 051E | F0 | 1376 | MOV | A,@R0 | ;IN UPPER DISPLAY |
| 051F | AB | 1377 | MOV | R3,A | ;(LEAVE LIGHTS & DIGIT AL |
| 0520 | 18 | 1378 | INC | R0 | |
| 0521 | F0 | 1379 | MOV | A,@R0 | |
| 0522 | AC | 1380 | MOV | R4,A | |
| 0523 | B939 | 1381 | MOV | R1,#IDN | |
| 0525 | D49D | 1382 | CALL | NXLOAD | |
| | | 1383 | | | |
| 0527 | A480 | 1384 | JMP | DPGRET | |
| | | 1385 ; | | | |
| | | 1386 | QCTR: | | ;QC IN UPPER AND TR IN LO |
| 0529 | B00E | 1387 | MOV | @R0,#QC | |
| 052B | A459 | 1388 | JMP | TRCOM | ;(SHARE TR LOWER CODE) |
| | | 1389 ; | | | |
| | | 1390 | QRTR: | | ;QR IN UPPER AND TR IN LO |
| 052D | B00C | 1391 | MOV | @R0,#QR | |
| 052F | A459 | 1392 | JMP | TRCOM | |
| | | 1393 ; | | | |
| | | 1394 | FTTR: | | ;FT IN UPPER AND TR IN LO |
| 0531 | BF03 | 1395 | MOV | R7,#003H | ;USE BOTH L & R LIGHTS |
| 0533 | B014 | 1396 | MOV | @R0,#FT | ;FT IN UPPER DISPLAY |
| 0535 | FE | 1397 | MOV | A,R6 | ;EITHER RATE ALARMED? |
| 0536 | 520C | 1398 | ANL | A,#00CH | |
| 0538 | 9655 | 1399 | JNZ | FLSHUP | ;IF SO FLASH UPPER DISPLA |
| | | 1400 | | | |
| 053A | A459 | 1401 | JMP | TRCOM | |
| | | 1402 ; | | | |
| | | 1403 | FLFRTR: | | ;ALTERNATE FL & FR IN UPP |
| | | 1404 | | | ;AND DISPLAY TR IN LOWER |
| 053C | B930 | 1405 | MOV | R1,#IFFCTR | |
| 053E | F1 | 1406 | MOV | A,@R1 | |
| 053F | 5308 | 1407 | ANL | A,#ALTM | ;TIME FOR WHICH ? |
| 0541 | C64C | 1408 | JZ | FRTR | |
| | | 1409 ; | | | |
| | | 1410 | FLTR: | | ;FL UPPER AND TR LOWER |
| 0543 | B012 | 1411 | MOV | @R0,#FL | |
| 0545 | BF02 | 1412 | MOV | R7,#002H | |
| 0547 | FE | 1413 | MOV | A,R6 | ;IS FL ALARMED ? |
| 0548 | 7255 | 1414 | JB3 | FLSHUP | ;IF SO, FLASH IT (UPPER) |
| | | 1415 | | | |
| 054A | A459 | 1416 | JMP | TRCOM | |
| | | 1417 ; | | | |
| | | 1418 | FRTR: | | ;FR IN UPPER AND TR IN LO |
| 054C | B010 | 1419 | MOV | @R0,#FR | |
| 054E | BF01 | 1420 | MOV | R7,#001H | |
| 0550 | FE | 1421 | MOV | A,R6 | ;FR ALARMED ? |

| LOC | OBJ | SEQ | | SOURCE STATEMENT | |
|---|---|---|---|---|---|
| 0551 | 5255 | 1422 | | JB2 | FLSHUP ;IF SO, FLASH UPPER |
| | | 1423 | | | |
| 0553 | A459 | 1424 | | JMP | TRCOM |
| | | 1425 | FLSHUP: | | |
| 0555 | FF | 1426 | | MOV | A,R7 ;FLASH UPPER DISPLAY |
| 0556 | 4320 | 1427 | | ORL | A,#020H |
| 0558 | AF | 1428 | | MOV | R7,A |
| | | 1429 | ; | | |
| | | 1430 | TRCOM: | | ;PUT TR IN THE LOWER DISP |
| 0559 | B834 | 1431 | | MOV | R0,#IMPTR |
| 055B | B016 | 1432 | | MOV | @R0,#TR |
| 055D | A46D | 1433 | | JMP | LITSET |
| | | 1434 | ; | | |
| | | 1435 | FLFR: | | ;FL IN UPPER AND FR IN LO |
| 055F | B012 | 1436 | | MOV | @R0,#FL ;FL IN UPPER |
| 0561 | B834 | 1437 | | MOV | R0,#IMPTR |
| 0563 | B010 | 1438 | | MOV | @R0,#FR ;FR IN LOWER |
| 0565 | FE | 1439 | | MOV | A,R6 ;SET UP FLASH BITS TO COR |
| 0566 | E7 | 1440 | | RL | A ;TO ALARM BITS (L & R LIG |
| 0567 | E7 | 1441 | | RL | A |
| 0568 | 5330 | 1442 | | ANL | A,#030H |
| 056A | 4303 | 1443 | | ORL | A,#003H |
| 056C | AF | 1444 | | MOV | R7,A |
| | | 1445 | ; | | |
| | | 1446 | LITSET: | | ;SET L & R LIGHTS FROM R7 |
| | | 1447 | | | ;AND FLASH THEM ACCORDING |
| | | 1448 | | | ;THE L AND R ALARM BITS I |
| 056D | B832 | 1449 | | MOV | R0,#IPCT ;SET IPCT FROM R7 |
| 056F | FF | 1450 | | MOV | A,R7 |
| 0570 | 5303 | 1451 | | ANL | A,#003H |
| 0572 | 40 | 1452 | | ORL | A,@R0 |
| 0573 | A0 | 1453 | | MOV | @R0,A |
| 0574 | B835 | 1454 | | MOV | R0,#IDCTL ;SET FLASH IN IDCTL |
| 0576 | FE | 1455 | | MOV | A,R6 |
| 0577 | 77 | 1456 | | RR | A |
| 0578 | 77 | 1457 | | RR | A |
| 0579 | 5303 | 1458 | | ANL | A,#003H |
| 057B | 4330 | 1459 | | ORL | A,#030H |
| 057D | 5F | 1460 | | ANL | A,R7 |
| 057E | 40 | 1461 | | ORL | A,@R0 |
| 057F | A0 | 1462 | | MOV | @R0,A |
| | | 1463 | DPGRET: | | |
| 0580 | 83 | 1464 | | RET | ;EXIT (AT LONG LAST) DPYG |
| | | 1465 | ; | | |

TABLE 11

| LOC | OBJ | SEQ | | SOURCE STATEMENT | |
|---|---|---|---|---|---|
| | | 1466 | ; | SET UP THE DISPLAY BUFFER. | |
| | | 1467 | ; | | |
| | | 1468 | DPYXFR: | | |
| 0581 | B829 | 1469 | | MOV | R0,#ICMD ;DO NOT TRANSFER IF RES |
| 0583 | F0 | 1470 | | MOV | A,@R0 ;IS ON AND THERE'S NO SYS |
| 0584 | 37 | 1471 | | CPL | A ;(I.E., DON'T MESS LAMP T |
| 0585 | 128D | 1472 | | JB0 | SETFSH ;RESET? |
| | | 1473 | | | |
| 0587 | B820 | 1474 | | MOV | R0,#ICONV |
| 0589 | F0 | 1475 | | MOV | A,@R0 |
| 058A | 37 | 1476 | | CPL | A |
| 058B | F2F9 | 1477 | | JB7 | DPXRET ;SYSBUG ERROR ? |
| | | 1478 | SETFSH: | | ;F0 REFLECTS THE FLASH PE |
| | | 1479 | | | ;IT IS ON IF WE SHOULD BE |
| | | 1480 | | | ;ON PORTION OF THE FLASH |
| | | 1481 | | | ;(I.E., WHILE FLASHM ANDE |
| | | 1482 | | | ;IFFCIR IS NONZERO) |
| 058D | 85 | 1483 | | CLR | F0 |
| 058E | B830 | 1484 | | MOV | R0,#IFFCIR |
| 0590 | F0 | 1485 | | MOV | A,@R0 |
| 0591 | 5301 | 1486 | | ANL | A,#FLASHM |
| 0593 | C696 | 1487 | | JZ | DONXFR |
| | | 1488 | | | |
| 0595 | 95 | 1489 | | CPL | F0 ;SET F0 WHEN FLASH ON |

| LOC  | OBJ  | SEQ  |         | SOURCE STATEMENT |                              |
|------|------|------|---------|------------------|------------------------------|
|      |      | 1490 | ;       |                  |                              |
|      |      | 1491 | DONXFR: |                  | ;DO UPPER DISPLAY TRANSFE    |
| 0596 | B835 | 1492 | MOV     | R0,#IDCTL        | ;IGNORE IF INHIBIT ON        |
| 0598 | F0   | 1493 | MOV     | A,@R0            |                              |
| 0599 | F2BE | 1494 | JB7     | DOMXFR           |                              |
|      |      | 1495 |         |                  |                              |
| 059B | 37   | 1496 | CPL     | A                |                              |
| 059C | B2A2 | 1497 | JB5     | PAINTN           | ;IF NOT FLASHED, DO IT.      |
|      |      | 1498 |         |                  |                              |
| 059E | B6A2 | 1499 | JF0     | PAINTN           | ;IF FLASHED & FLASH ON, D    |
|      |      | 1500 |         |                  |                              |
| 05A0 | A4B6 | 1501 | JMP     | BLANKN           | ;BLANK IF FLASHING OFF       |
|      |      | 1502 | PAINTN: |                  |                              |
| 05A2 | B833 | 1503 | MOV     | R0,#INPTR        | ;DISPLAY RAM POIN            |
| 05A4 | F0   | 1504 | MOV     | A,@R0            | ;TO BY INPTR                 |
| 05A5 | C6B6 | 1505 | JZ      | BLANKN           | ;BLANK IF INPTR = 0          |
|      |      | 1506 |         |                  |                              |
| 05A7 | A8   | 1507 | MOV     | R0,A             |                              |
| 05A8 | D481 | 1508 | CALL    | R34M0            | ;GET DATA                    |
|      |      | 1509 |         |                  |                              |
| 05AA | BD0F | 1510 | MOV     | R5,#LOW 9999     | ;FORCE IN RANGE              |
| 05AC | BE27 | 1511 | MOV     | R6,#HIGH 9999    |                              |
| 05AE | D4E5 | 1512 | CALL    | MIN34            |                              |
|      |      | 1513 |         |                  |                              |
| 05B0 | F459 | 1514 | CALL    | BCD              | ;CONVERT TO DECIMAL          |
|      |      | 1515 |         |                  |                              |
| 05B2 | F46D | 1516 | CALL    | ZBLANK           | ;BLANK LEADING 0'S           |
| 05B4 | A4BA | 1517 | JMP     | NCOM             |                              |
|      |      | 1518 | BLANKN: |                  |                              |
| 05B6 | 23FF | 1519 | MOV     | A,#0FFH          | ;BLANK N FIELD               |
| 05B8 | AB   | 1520 | MOV     | R3,A             |                              |
| 05B9 | AC   | 1521 | MOV     | R4,A             |                              |
|      |      | 1522 | NCOM:   |                  |                              |
| 05BA | B938 | 1523 | MOV     | R1,#IDN          | ;POINT INTO DISPLAY BUFFE    |
| 05BC | D49D | 1524 | CALL    | NXLOAD           | ;COPY INTO BUFFER            |
|      |      | 1525 | ;       |                  |                              |
|      |      | 1526 | DOMXFR: |                  | ;TRANSFER LOWER (3:DIGIT)    |
|      |      | 1527 |         |                  | ;DISPLAY IN THE SAME MANN    |
|      |      | 1528 |         |                  | ;AS THE UPPER.               |
| 05BE | B835 | 1529 | MOV     | R0,#IDCTL        | ;IGNORE IF INHIBITED.        |
| 05C0 | F0   | 1530 | MOV     | A,@R0            |                              |
| 05C1 | D2E6 | 1531 | JB6     | DOMXFR           |                              |
|      |      | 1532 |         |                  |                              |
| 05C3 | 37   | 1533 | CPL     | A                | ;FLASH IT ?                  |
| 05C4 | 92CA | 1534 | JB4     | PAINTM           | ;IF NOT, DO IT.              |
|      |      | 1535 |         |                  |                              |
| 05C6 | B6CA | 1536 | JF0     | PAINTM           | ;IF FLASHING AND FLASH ON    |
|      |      | 1537 |         |                  |                              |
| 05C8 | A4DE | 1538 | JMP     | BLANKM           | ;BLANK IF FLASHING OFF       |
|      |      | 1539 | PAINTM: |                  |                              |
| 05CA | B834 | 1540 | MOV     | R0,#IMPTR        | ;DISPLAY RAM POINTED         |
| 05CC | F0   | 1541 | MOV     | A,@R0            | ;TO BY IMPTR.                |
| 05CD | C6DE | 1542 | JZ      | BLANKM           | ;BLANK IF INPTR 0            |
|      |      | 1543 |         |                  |                              |
| 05CF | A8   | 1544 | MOV     | R0,A             |                              |
| 05D0 | D481 | 1545 | CALL    | R34M0            | ;GET DATA                    |
|      |      | 1546 |         |                  |                              |
| 05D2 | BDE7 | 1547 | MOV     | R5,#LOW 999      | ;LIMIT TO MAX DISPLA         |
| 05D4 | EE03 | 1548 | MOV     | R6,#HIGH 999     |                              |
| 05D6 | D4E5 | 1549 | CALL    | MIN34            |                              |
|      |      | 1550 |         |                  |                              |
| 05D8 | F459 | 1551 | CALL    | BCD              | ;CONVERT TO DECIMAL          |
|      |      | 1552 |         |                  |                              |
| 05DA | F46D | 1553 | CALL    | ZBLANK           | ;REMOVE LEADING ZEROES       |
| 05DC | A4E2 | 1554 | JMP     | MCOM             |                              |
|      |      | 1555 | BLANKM: |                  |                              |
| 05DE | 23FF | 1556 | MOV     | A,#0FFH          | ;BLANK M FIELD               |
| 05E0 | AB   | 1557 | MOV     | R3,A             |                              |
| 05E1 | AC   | 1558 | MOV     | R4,A             |                              |
|      |      | 1559 | MCOM:   |                  |                              |
| 05E2 | B93C | 1560 | MOV     | R1,#IDM          |                              |
| 05E4 | D49D | 1561 | CALL    | NXLOAD           | ;STORE AT IDM IN BUFFER      |
|      |      | 1562 | ;       |                  |                              |

| LOC | OBJ | SEQ | | SOURCE STATEMENT | | |
|---|---|---|---|---|---|---|
| | | 1563 | DPXFR | | | ;COPY LIGHTS FROM LOW IPC |
| | | 1564 | | | | ;FLASHING ACCORDING TO LO |
| 05E6 | B835 | 1565 | | MOV | R0,#IDCTL | |
| 05E8 | B932 | 1566 | | MOV | R1,#IPCT | |
| 05EA | F0 | 1567 | | MOV | A,@R0 | |
| 05EB | 37 | 1568 | | CPL | A | |
| 05EC | AA | 1569 | | MOV | R2,A | ;R2 = FLASH/ |
| 05ED | F1 | 1570 | | MOV | A,@R1 | ;A = LIGHTS |
| 05EE | B6F1 | 1571 | | JF0 | AFLSHO | |
| | | 1572 | | | | |
| 05F0 | 5A | 1573 | | ANL | A,R2 | ;AND WITH FLASH/ DURING 0 |
| | | 1574 | AFLSHO: | | | |
| 05F1 | B835 | 1575 | | MOV | R0,#I9 | ;COPY INTO BUFFER AT I9 |
| 05F3 | 30 | 1576 | | XCHD | A,@R0 | |
| | | 1577 | ; | | | |
| | | 1578 | | | | ;COPY HIGH PCT HEXIT INTO |
| | | 1579 | | | | ;BUFFER AT IC. |
| 05F4 | F1 | 1580 | | MOV | A,@R1 | |
| 05F5 | 47 | 1581 | | SWAP | A | |
| 05F6 | B837 | 1582 | | MOV | R0,#IC | |
| 05F8 | 30 | 1583 | | XCHD | A,@R0 | |
| | | 1584 | ; | | | |
| | | 1585 | DPXRET: | | | |
| 05F9 | 83 | 1586 | | RET | | ;EXIT DPXFR |

TABLE 12

| LOC | OBJ | SEQ | | SOURCE STATEMENT | | |
|---|---|---|---|---|---|---|
| | | 1587 | ; | | | |
| | | 1588 | ; | RDSW READS THE CONTROL SWITCHES | | |
| | | 1589 | ; | RDSW COPIES THE SWITCHES TO | | |
| | | 1590 | ; | ICMD IF THEY ARE THE SAME | | |
| | | 1591 | ; | AS ON THE PREVIOUS CALL. | | |
| | | 1592 | ; | | | |
| | | 1593 | ; | CALL | RDSW | |
| | | 1594 | ; | | | |
| | | 1595 | RDSW: | | | |
| 05FA | D4B5 | 1596 | | CALL | RDPBX | ;A = CURRENT SWITCHES |
| | | 1597 | | | | |
| 05FC | 37 | 1598 | | CPL | A | ;(NEGATIVE LOGIC FROM HW) |
| 05FD | B827 | 1599 | | MOV | R0,#ISWIM | |
| 05FF | 20 | 1600 | | XCH | A,@R0 | ;A = OLD; ISWIM = NEW |
| 0600 | D0 | 1601 | | XRL | A,@R0 | ;NO; OLD AND NEW SAME? |
| 0601 | 00 | 1602 | | NOP | | ;????? FIX FOR OUTPAGE JM |
| 0602 | 00 | 1603 | | NOP | | ;????? FIX FOR OUTPAGE J |
| 0603 | 9609 | 1604 | | JNZ | RDEXT | |
| | | 1605 | | | | |
| 0605 | F0 | 1606 | | MOV | A,@R0 | ;IF SO, COPY |
| 0606 | B828 | 1607 | | MOV | R0,#ICMD | ;TO ICMD |
| 0608 | A0 | 1608 | | MOV | @R0,A | |
| | | 1609 | RDEXT: | | | |
| 0609 | 83 | 1610 | | RET | | ;EXIT RDSW |
| | | 1611 | ; | | | |
| | | 1612 | ; | LOG OUTPUTS ONE BYTE OF LOG DATA EACH | | |
| | | 1613 | ; | TIME IT IS CALLED, REPEATEDLY SENDING | | |
| | | 1614 | ; | DATA FROM THE SAME AREA. IF A BYTE | | |
| | | 1615 | ; | CANNOT BE SENT, IT IS RETRIED | | |
| | | 1616 | ; | UNTIL THE HARDWARE ACCEPTS IT. | | |
| | | 1617 | ; | | | |
| | | 1618 | ; | JUST BEFORE THE FIRST DATA BYTE | | |
| | | 1619 | ; | IS TRANSMITTED, THE AREA TO BE | | |
| | | 1620 | ; | SENT IS COPIED INTO A TRANSMISSION | | |
| | | 1621 | ; | BUFFER TO ASSURE A VALID SNAPSHOT | | |
| | | 1622 | ; | OF THE STATE OF THE VARIABLES. | | |
| | | 1623 | ; | | | |
| | | 1624 | ; | THE MESSAGE FORMAT IS AS FOLLOWS: | | |
| | | 1625 | ; | | | |
| | | 1626 | ; | | SYNC | |
| | | 1627 | ; | | SYNC | |

| LOC OBJ | SEQ | SOURCE STATEMENT | | |
|---|---|---|---|---|
| | 1628 ; | | SOH | |
| | 1629 ; | | SENDER ID CODE | |
| | 1630 ; | | CONFIGURATION BYTE | |
| | 1631 ; | | COUNT OF DATA BYTES | |
| | 1632 ; | | DATA BYTES | |
| | 1633 ; | | (FROM EXTERNAL MEMORY) | |
| | 1634 ; | | ETX | |
| | 1635 ; | | | |
| | 1636 ; | CALLING SEQUENCE: | | |
| | 1637 ; | | | |
| | 1638 ; | CALL | LC | |
| | 1639 ; | | R0,1,2,.. = ? | |
| | 1640 ; | | | |
| | 1641 LOG: | | | |
| 060A B923 | 1642 | MOV | R1,#ILOGC | |
| 060C F1 | 1643 | MOV | A,@R1 | ;A = CURRENT COUNT |
| 060D AA | 1644 | MOV | R2,A | ;R2 = SAVED COUNT |
| 060E F229 | 1645 | JB7 | LOGNEG | ;COUNT < 0 ? |
| | 1646 | | | |
| 0610 961F | 1647 | JNZ | LOGPOS | ;COUNT POSITIVE ? |
| | 1648 | | | |
| 0612 B80C | 1649 | MOV | R0,#LOGSPC | ;IF 0, COPY AREA |
| 0614 B980 | 1650 | MOV | R1,#LOGBUF | ;TO XMIT BUFFER. |
| 0616 BB0C | 1651 | MOV | R3,#LOGLEN | |
| | 1652 LOGCPY: | | | ;LOG COPY LOOP |
| 0618 80 | 1653 | MOVX | A,@R0 | |
| 0619 91 | 1654 | MOVX | @R1,A | |
| 061A 18 | 1655 | INC | R0 | |
| 061B 19 | 1656 | INC | R1 | |
| 061C EB18 | 1657 | DJNZ | R3,LOGCPY | |
| | 1658 | | | |
| 061E FA | 1659 | MOV | A,R2 | ;RESTORE CURRENT COUNT |
| | 1660 LOGPOS: | | | |
| 061F D30C | 1661 | XRL | A,#LOGLEN | ;COMPARE TO SIZE |
| 0621 962D | 1662 | JNZ | LOGDAT | ;COUNT < SIZE ? |
| | 1663 | | | |
| 0623 BAFA | 1664 | MOV | R2,#-6 | ;COUNT >= SIZE; RESTART |
| 0625 2303 | 1665 | MOV | A,#ETX | ;AFTER FINISHING MSG. |
| 0627 C433 | 1666 | JMP | LOG1 | |
| | 1667 LOGNEG: | | | |
| 0629 0356 | 1668 | ADD | A,#LOGSYN+6 | ;COUNT < 0 |
| 062B C430 | 1669 | JMP | LOGCOM | ;A -> HEADER BYTE |
| | 1670 LOGDAT: | | | |
| 062D FA | 1671 | MOV | A,R2 | |
| 062E 030C | 1672 | ADD | A,#LOGSPC | ;A -> HEADER BYTE |
| | 1673 LOGCOM: | | | |
| 0630 1A | 1674 | INC | R2 | ;BUMP COUNT |
| 0631 A8 | 1675 | MOV | R0,A | ;R0 -> OUTPUT BYTE |
| 0632 80 | 1676 | MOVX | A,@R0 | ;A = DATA BYTE |
| | 1677 LOG1: | | | |
| 0633 D43A | 1678 | CALL | LOGONE | ;LOG THE MSG BYTE |
| | 1679 | | | |
| 0635 9629 | 1680 | JNZ | LOGRET | ;RETRY LATER IF FAILED. |
| | 1681 | | | |
| 0637 FA | 1682 | MOV | A,R2 | ;STORE NEW COUNT |
| 0638 A1 | 1683 | MOV | @R1,A | |
| | 1684 LOGRET: | | | |
| 0639 83 | 1685 | RET | | ;EXIT LOG |
| | 1686 ; | | | |
| | 1687 ; | LOGONE WRITES ONE BYTE OF OUTPUT DATA TO | | |
| | 1688 ; | THE DATA LOGGER. | | |
| | 1689 ; | | | |
| | 1690 ; | | A = OUTPUT DATA | |
| | 1691 ; | CALL | LOGONE | |
| | 1692 ; | | A = 0 FOR SUCCESS; NONZERO FOR FA | |
| | 1693 ; | | R0,3 = ? | |
| | 1694 ; | | | |
| | 1695 LOGONE: | | | |
| | 1696 JO16B: | | | |
| 063A AB | 1697 | MOV | R3,A | ;SAVE DATA |
| 063B B803 | 1698 | MOV | R0,#3 | ;CHECK BUFFER EMPTY |
| 063D 80 | 1699 | MOVX | A,@R0 | ;A <- 8156 PORT C |
| 063E B247 | 1700 | JB5 | NOLOG | ;BUFFER FULL? |

| LOC  OBJ | SEQ | SOURCE STATEMENT | | |
|---|---|---|---|---|
| | 1701 | | | |
| 0640 B801 | 1702 | MOV | R0,#1 | ;EMPTY, SO WRITE |
| 0642 FB | 1703 | MOV | A,R3 | ;DATA TO 8156 |
| 0643 90 | 1704 | MOVX | @R0,A | ;PORT A |
| | 1705 IO16E: | | | |
| 0644 27 | 1706 | CLR | A | ;NOTE SUCCESS |
| 0645 C449 | 1707 | JMP | LG1RET | |
| | 1708 NOLOG: | | | |
| 0647 2301 | 1709 | MOV | A,#01H | ;NOTE FAILURE. |
| | 1710 LG1RET: | | | |
| 0649 83 | 1711 | RET | | ;EXIT LOGONE |
| | 1712 ; | | | |

TABLE 13

| LOC  OBJ | SEQ | SOURCE STATEMENT | | |
|---|---|---|---|---|
| | 1713 ; | WRITE QR INTO THE 74C89 | | |
| | 1714 ; | STANDBY MEMORY. | | |
| | 1715 ;XXXXX | PRECISION LIMIT OF HW REQUIRES | | |
| | 1716 ;XXXXX | ROUND TO NEAREST GALLON. | | |
| | 1717 ; | | | |
| | 1718 PWRDN: | | | ;SAVE QR/10 IN 74C89 BYTE |
| 064A B80C | 1719 | MOV | R0,#QR | ;POINT TO QR |
| 064C D481 | 1720 | CALL | R34M0 | |
| | 1721 | | | |
| 064E F40D | 1722 | CALL | TENTHX | ;QR / 10 |
| | 1723 | | | |
| 0650 2304 | 1724 | MOV | A,#04H | ;MAKE SURE 74C89 IS |
| 0652 D4A9 | 1725 | CALL | WRTSTB | ;DESELECTED; SET ADDRESS. |
| | 1726 | | | |
| 0654 27 | 1727 | CLR | A | ;SELECT 74C89 AND LATCH |
| 0655 D4A9 | 1728 | CALL | WRTSTB | ;ADDRESS. |
| | 1729 | | | |
| 0657 FB | 1730 | MOV | A,R3 | |
| 0658 47 | 1731 | SWAP | A | |
| 0659 430F | 1732 | ORL | A,#0FH | ;KEEP UNUSED BITS HIGH. |
| | 1733 IO17: | | | |
| 065B 39 | 1734 | OUTL | P1,A | ;PLACE DATA ON UPPER P1 |
| 065C 2380 | 1735 | MOV | A,#080H | ;TURN WRITE BIT ON |
| 065E D4A9 | 1736 | CALL | WRTSTB | |
| | 1737 | | | |
| 0660 27 | 1738 | CLR | A | ;TURN WRITE BIT OFF AND |
| 0661 D4A9 | 1739 | CALL | WRTSTB | ;AND WRITE. |
| | 1740 | | | |
| 0663 2305 | 1741 | MOV | A,#05H | ;DESELECT 74C89 |
| 0665 D4A9 | 1742 | CALL | WRTSTB | ;AND SET ADDRESS. |
| | 1743 | | | |
| 0667 2301 | 1744 | MOV | A,#01H | ;SELECT 74C89 AND |
| 0669 D4A9 | 1745 | CALL | WRTSTB | ;LATCH ADDRESS. |
| | 1746 | | | |
| 066B FB | 1747 | MOV | A,R3 | |
| 066C 430F | 1748 | ORL | A,#0FH | ;KEEP UNUSED BITS HIGH |
| | 1749 IO18: | | | |
| 066E 39 | 1750 | OUTL | P1,A | ;PLACE DATA ON UPPER P1 |
| 066F 2381 | 1751 | MOV | A,#081H | ;TURN WRITE BIT ON |
| 0671 D4A9 | 1752 | CALL | WRTSTB | |
| | 1753 | | | |
| 0673 2301 | 1754 | MOV | A,#01H | ;TURN WRITE BIT OFF |
| 0675 D4A9 | 1755 | CALL | WRTSTB | ;AND WRITE. |
| | 1756 | | | |
| 0677 2304 | 1757 | MOV | A,#SAFSSB | |
| 0679 D4A9 | 1758 | CALL | WRTSTB | ;DESELECT 74C89 |
| | 1759 | | | |
| 067B 83 | 1760 | RET | | ;EXIT PWRDN |
| | 1761 ; | | | |
| | 1762 ; | R56R34 COPIES R3,4 TO R5,6 | | |
| | 1763 ; | | | |
| | 1764 ; | | R3 = LOW DATA | |
| | 1765 ; | | R4 = HIGH DATA | |
| | 1766 ; | CALL | R56R34 | |
| | 1767 ; | | R5,R3 = LOW DATA | |
| | 1768 ; | | R6,R4,A = HIGH DATA | |
| | 1769 ; | | | |
| | 1770 R56R34: | | | |

```
LOC   OBJ       SEQ            SOURCE STATEMENT

067C  FB        1771           MOV     A,R3
067D  AD        1772           MOV     R5,A
067E  FC        1773           MOV     A,R4
067F  AE        1774           MOV     R6,A
0680  83        1775           RET              ;EXIT R56R34
                1776 ;
                1777 ;         FETCH R3 AND R4 FROM RAM
                1778 ;         POINTED TO BY R0.
                1779 ;
                1780 ;                 R0 -> RAM LOCATION
                1781 ;         CALL    R34M0
                1782 ;                 R3 = DATA AT R0
                1783 ;                 R4,A = DATA AT R0+1
                1784 ;                 R0 UNCHANGED
                1785 ;
                1786 R34M0:
0681  80        1787           MOVX    A,@R0    ;GET 2 BYTES TO R3,4
0682  AB        1788           MOV     R3,A
0683  18        1789           INC     R0
0684  80        1790           MOVX    A,@R0
0685  AC        1791           MOV     R4,A
0686  C8        1792           DEC     R0
0687  83        1793           RET
                1794 ;
                1795 ;         FETCH R5 AND R6 FROM RAM
                1796 ;         POINTED TO BY R1.
                1797 ;
                1798 ;                 R1 -> RAM LOCATION
                1799 ;         CALL    R56M1
                1800 ;                 R5 = DATA AT R1
                1801 ;                 R6,A = DATA AT R1+1
                1802 ;                 R1 UNCHANGED
                1803 ;
                1804 R56M1:
0688  81        1805           MOVX    A,@R1    ;GET 2 BYTES TO R5,6
0689  AD        1806           MOV     R5,A
068A  19        1807           INC     R1
068B  81        1808           MOVX    A,@R1
068C  AE        1809           MOV     R6,A
068D  C9        1810           DEC     R1
068E  83        1811           RET
                1812 ;
                1813 ;         WRITE R3 AND R4 INTO RAM AT
                1814 ;         LOCATION POINTED TO BY R0.
                1815 ;
                1816 ;                 R3 = LOW DATA (FOR R0)
                1817 ;                 R4 = HIGH DATA (FOR R0+1)
                1818 ;                 R0 -> RAM LOCATIONS
                1819 ;         CALL    M0R34
                1820 ;                 A = HIGH DATA
                1821 ;                 R0,3,4 UNCHANGED
                1822 ;
                1823 ;
                1824 M0R34:
068F  FB        1825           MOV     A,R3     ;MOV R3,4 TO MEM
0690  90        1826           MOVX    @R0,A
0691  18        1827           INC     R0
0692  FC        1828           MOV     A,R4
0693  90        1829           MOVX    @R0,A
0694  C8        1830           DEC     R0
0695  83        1831           RET
                1832 ;
                1833 ;         WRITE R5 & R6 TO RAM AT THE
                1834 ;         LOCATION POINTED TO BY R1.
                1835 ;
                1836 ;                 R5 = LOW DATA (FOR R1)
                1837 ;                 R6 = HIGH DATA (FOR R1+1)
                1838 ;                 R1 -> RAM LOCATIONS
                1839 ;         CALL    M1R56
                1840 ;                 A = HIGH DATA
                1841 ;                 R1,5,6 UNCHANGED
                1842 ;
                1843 ;
```

```
LOC  OBJ        SEQ        SOURCE STATEMENT

1844 M1RS6:
0696 FD         1845              MOV     A,R5       ;MOV R5,6 TO MEM
0697 91         1846              MOVX    @R1,A
0698 19         1847              INC     R1
0699 FE         1848              MOV     A,R6
069A 91         1849              MOVX    @R1,A
069B C9         1850              DEC     R1
069C 83         1851              RET
                1852 ;
                1853 ;     NXLOAD STORES THE 4 HEXITS OF R3,4 (0,1,2
                1854 ;     IN THE LOW HEXITS OF SUCCESSIVE BYTES,
                1855 ;     THE FIRST OF WHICH IS POINTED TO BY R1.
                1856 ;
                1857 ;             R3,4 = 4 BCD HEXITS
                1858 ;             R1 -> INTERNAL MEMORY FOR HEXITS
                1859 ;     CALL    NXLOAD
                1860 ;             R1 = ?
                1861 ;             R3,4 UNCHANGED
                1862 ;
                1863 NXLOAD:
069D FB         1864              MOV     A,R3
069E 31         1865              XCHD    A,@R1
069F 19         1866              INC     R1
06A0 47         1867              SWAP    A
06A1 31         1868              XCHD    A,@R1
06A2 19         1869              INC     R1
06A3 FC         1870              MOV     A,R4
06A4 31         1871              XCHD    A,@R1
06A5 19         1872              INC     R1
06A6 47         1873              SWAP    A
06A7 31         1874              XCHD    A,@R1
06A8 83         1875              RET                ;EXIT NXLOAD
                1876 ;
                1877 ;     WRTSTB WRITES THE VALUE IN THE ACCUMULATO
                1878 ;     TO THE SOURCE SELECT BUS (8255 PORT A).
                1879 ;     THE 8155 IS LEFT SELECTED FOR FUTURE MOVX
                1880 ;
                1881 ;             A = SELECT CODE
                1882 ;     CALL    WRTSTB
                1883 ;             A UNCHANGED
                1884 ;
                1885 WRTSTB:
                1886 IO19B:
FFC8            1887 IO19V  SET   NOT (M1CE OR M2CSN OR M2A0 OR M2A
06A9 9AC8       1888              ANL     P2,#IO19V  ;SEL 8255 PORT A
06AB 90         1889              MOVX    @R0,A      ;WRITE CODE (R0 ADR DUMMY
06AC 8A30       1890              ORL     P2,#M1CE OR M2CSN  ;SET UP RAM
                1891 IO19E:
06AE 83         1892              RET                ;EXIT WRTSTB
                1893 ;
                1894 ;     RDPBX AND RDPCX READ THE B AND C PORTS OF
                1895 ;     INTO THE ACCUMULATOR.  THE 8155 IS LEFT S
                1896 ;     FOR MOVX'S.
                1897 ;
                1898 ;     CALL    RDPBX
                1899 ;             A = INPUT DATA
                1900 ;
                1901 RDPCX:
                1902 IO20:
                1903                                 ;SELECT 8255 PORT C
06AF 9ACA       1904              ANL     P2,#NOT (M1CE OR M2CSN OR M1IO OR
06B1 8A02       1905              ORL     P2,#M2A1
06B3 C4B9       1906              JMP     RDPXX
                1907 RDPBX:
                1908 IO21:
                1909                                 ;SELECT 8255 PORT B
06B5 9AC9       1910              ANL     P2,#NOT (M1CE OR M2CSN OR M1IO OR
06B7 8A01       1911              ORL     P2,#M2A0
                1912 RDPXX:
06B9 08         1913              INS     A,BUS      ;READ VIA BUS
                1914                                 ;RESTORE 8155 RAM SELECT
06BA 8A30       1915              ORL     P2,#M1CE OR M2CSN
06BC 83         1916              RET                ;EXIT RDPBX, RDPCX
                1917 ;
```

| LOC | OBJ | SEQ | SOURCE STATEMENT | | |
|---|---|---|---|---|---|
| | | 1918 ; | | TENX MULTIPLIES A 2-BYTE NUMBER BY 10. | |
| | | 1919 ; | | (10X = 2X + 8X) | |
| | | 1920 ; | | | |
| | | 1921 ; | | R3,4 = POSITIVE BINARY NUMBER (<1 | |
| | | 1922 ; | CALL | TENX | |
| | | 1923 ; | | R3,4 = PRODUCT | |
| | | 1924 ; | | A = R4 (HIGH PRODUCT) | |
| | | 1925 ; | | R5,6 = ? | |
| | | 1926 ; | | | |
| | | 1927 TENX: | | | |
| 06BD | FB | 1928 | MOV | A,R3 | |
| 06BE | 97 | 1929 | CLR | C | |
| 06BF | F7 | 1930 | RLC | A | |
| 06C0 | AB | 1931 | MOV | R3,A | |
| 06C1 | FC | 1932 | MOV | A,R4 | |
| 06C2 | F7 | 1933 | RLC | A | |
| 06C3 | AC | 1934 | MOV | R4,A | ;R3,4 = 2X |
| 06C4 | FB | 1935 | MOV | A,R3 | |
| 06C5 | 97 | 1936 | CLR | C | |
| 06C6 | F7 | 1937 | RLC | A | |
| 06C7 | AD | 1938 | MOV | R5,A | ;R5 = 4X:LO |
| 06C8 | FC | 1939 | MOV | A,R4 | |
| 06C9 | F7 | 1940 | RLC | A | |
| 06CA | 2D | 1941 | XCH | A,R5 | ;A = 4X:LO, R5 = 4X:HI |
| 06CB | 97 | 1942 | CLR | C | |
| 06CC | F7 | 1943 | RLC | A | |
| 06CD | 2D | 1944 | XCH | A,R5 | ;A = 4X:HI; R5 = 8X:LO |
| 06CE | F7 | 1945 | RLC | A | |
| 06CF | AE | 1946 | MOV | R6,A | ;R5,6 = 8X |
| 06D0 | D4D3 | 1947 | CALL | ADD34 | ;R3,4 = 10X |
| 06D2 | 83 | 1948 | RET | | ;EXIT TENX |
| | | 1949 ; | | | |
| | | 1950 ; | | ADD34 ADDS TO THE REGISTER PAIR R3,4 | |
| | | 1951 ; | | THE REGISTER PAIR R5,6 | |
| | | 1952 ; | | (R3 AND R5 LOW ORDER BYTES) | |
| | | 1953 ; | | | |
| | | 1954 ; | | R3,4 = FIRST TERM | |
| | | 1955 ; | | R5,6 = SECOND TERM | |
| | | 1956 ; | CALL | ADD34 | |
| | | 1957 ; | | R3,4 = SUM OF FIRST & SECOND TERM | |
| | | 1958 ; | | R5,6 UNCHANGED | |
| | | 1959 ; | | A = HIGH BYTE OF RESULT (= R4) | |
| | | 1960 ; | | | |
| | | 1961 ADD34: | | | |
| 06D3 | FB | 1962 | MOV | A,R3 | |
| 06D4 | 6D | 1963 | ADD | A,R5 | |
| 06D5 | AB | 1964 | MOV | R3,A | |
| 06D6 | FC | 1965 | MOV | A,R4 | |
| 06D7 | 7E | 1966 | ADDC | A,R6 | |
| 06D8 | AC | 1967 | MOV | R4,A | |
| 06D9 | 83 | 1968 | RET | | ;EXIT ADD34 |
| | | 1969 ; | | | |
| | | 1970 ; | | SUB34 SUBTRACTS THE REGISTER PAIR | |
| | | 1971 ; | | R5,6 FROM THE REGISTER PAIR R3,4. | |
| | | 1972 ; | | (R3 AND R5 ARE THE LOW BYTES.) | |
| | | 1973 ; | | | |
| | | 1974 ; | | R3,4 = 1ST TERM | |
| | | 1975 ; | | R5,6 = 2ND TERM | |
| | | 1976 ; | CALL | SUB34 | |
| | | 1977 ; | | R3,4 = 1ST TERM - 2ND TERM | |
| | | 1978 ; | | R5,6 UNCHANGED | |
| | | 1979 ; | | A = HIGH BYTE OF RESULT (= R4) | |
| | | 1980 ; | | | |
| | | 1981 SUB34: | | | |
| 06DA | FB | 1982 | MOV | A,R3 | ;NOTE: |
| 06DB | 37 | 1983 | CPL | A | ; A-B = NOT(NOT(A)+B) |
| 06DC | 6D | 1984 | ADD | A,R5 | |
| 06DD | 37 | 1985 | CPL | A | |
| 06DE | AB | 1986 | MOV | R3,A | |
| 06DF | FC | 1987 | MOV | A,R4 | |
| 06E0 | 37 | 1988 | CPL | A | |
| 06E1 | 7E | 1989 | ADDC | A,R6 | ;CARRY WORKS PROPERLY. |
| 06E2 | 37 | 1990 | CPL | A | |

```
LOC  OBJ        SEQ          SOURCE STATEMENT

06E3 AC         1991         MOV     R4,A
06E4 83         1992         RET             ;EXIT SUB34
                1993 ;
                1994 ;       MIN34 PLACES THE MINIMUM OF R3,4 AND R5,6
                1995 ;       IN R3,4.  BOTH ARGUMENTS MUST BE
                1996 ;       POSITIVE (MSB = 0).
                1997 ;
                1998 ;               R3,4 = ONE ARGUMENT
                1999 ;               R5,6 = OTHER ARGUMENT
                2000 ;       CALL    MIN34
                2001 ;               R3,4 = MINIMUM
                2002 ;               R5,6 UNCHANGED
                2003 ;
                2004 MIN34:
06E5 D4DA       2005         CALL    SUB34
                2006
06E7 F2EF       2007         JB7     RSTR34
                2008
06E9 FD         2009         MOV     A,R5    ;USE R5,6
06EA AB         2010         MOV     R3,A
06EB FE         2011         MOV     A,R6
06EC AC         2012         MOV     R4,A
06ED C4F1       2013         JMP     MINRET
                2014 RSTR34:
06EF D4D3       2015         CALL    ADD34   ;USE R3,4
                2016 MINRET:
06F1 83         2017         RET             ;EXIT MIN34
                2018 ;
                2019 ;       SR34 LOGICALLY SHIFTS R3,4 RIGHT THE
                2020 ;       NUMBER OF BITS SPECIFIED IN A.
                2021 ;
                2022 ;               A = COUNT
                2023 ;               R3,4 = DATA
                2024 ;       CALL    SR34
                2025 ;               R2 = ?
                2026 ;               R3,4 = SHIFTED DATA
                2027 ;
                2028 SR34:
06F2 AA         2029         MOV     R2,A
06F3 C6FE       2030         JZ      SRDON
                2031 SRLP:
06F5 FC         2032         MOV     A,R4
06F6 97         2033         CLR     C
06F7 67         2034         RRC     A
06F8 AC         2035         MOV     R4,A
06F9 FB         2036         MOV     A,R3
06FA 67         2037         RRC     A
06FB AB         2038         MOV     R3,A
06FC EAF5       2039         DJNZ    R2,SRLP
                2040 SRDON:
06FE 83         2041         RET             ;EXIT SR34
                2042 ;
                2043 ;       DIVIDE DIVIDES A 15-BIT POSITIVE NUMBER B
                2044 ;       A 15-BIT POSITIVE NUMBER AND RETURNS THE
                2045 ;       QUOTIENT AND REMAINDER.
                2046 ;
                2047 ;       TENTHX AND DIVLGR ARE ALTERNATE ENTRY POI
                2048 ;       WHICH SET THE DIVISOR TO 10 AND LG.
                2049 ;       (DIVLGR ALSO ADDS LG/2 TO THE DIVIDEND
                2050 ;       BEFORE DIVIDING TO ROUND THE RESULT.)
                2051 ;
                2052 ;               R3,4 = 15-BIT NONNEGATIVE DIVIDEN
                2053 ;                      (I.E., MSB = 0)
                2054 ;               R5,6 = 15-BIT POSITIVE DIVISOR
                2055 ;       CALL    DIVIDE
                2056 ;               R3,4 = QUOTIENT (LOW,HIGH)
                2057 ;               A = R4 (HIGH QUOTIENT)
                2058 ;               R5,6 = REMAINDER
                2059 ;               R0 UNCHANGED
                2060 ;               R1,2,7 = ?
                2061 ;
                2062 DIVLGR:
```

```
LOC   OBJ        SEQ              SOURCE STATEMENT

06FF  DD06       2062             MOV     R5,#LG
0701  BE00       2064             MOV     R6,#00
0703  FB         2065             MOV     A,R3        ;ADD LG/2 FIRST TO ROUND
0704  0303       2066             ADD     A,#LG/2
0706  AB         2067             MOV     R3,A
0707  FC         2068             MOV     A,R4
0708  1306       2069             ADDC    A,#0
070A  AC         2070             MOV     R4,A
070B  E411       2071             JMP     DIVIDE
                 2072  TENTHX:
070D  BD0A       2073             MOV     R5,#10
070F  BE00       2074             MOV     R6,#00
                 2075  DIVIDE:
                 2076  ;
                 2077  ;          CHECK ONLY FOR ZERODIVIDE
                 2078  ;          (NO INFINITE LOOPS, PLEASE)
                 2079  ;
0711  FE         2080             MOV     A,R6        ;QUIT IF DIVISOR
0712  F21B       2081             JB7     DBAD        ;NEGATIVE
                 2082
0714  4D         2083             ORL     A,R5
0715  C61B       2084             JZ      DBAD        ;QUIT IF DIVISOR 0
                 2085
0717  FC         2086             MOV     A,R4        ;CHECK FOR NEG DIVIDEND
0718  37         2087             CPL     A
0719  F21F       2088             JB7     DODIV
                 2089  DBAD:
071B  F488       2090             CALL    SYSBUG      ;BAD INPUT TO DIVIDE
071D  E452       2091             JMP     DFIN
                 2092  DODIV:
071F  27         2093             CLR     A
0720  A9         2094             MOV     R1,A
0721  AA         2095             MOV     R2,A        ;R12 FOR QUOTIENT
0722  AF         2096             MOV     R7,A        ;R7 FOR DIVISOR SHIFT COU
                 2097  ;
                 2098  ;          PRESHIFT DIVISOR LEFT UNTIL IT
                 2099  ;          EXCEEDS THE DIVIDEND.
                 2100  ;
                 2101  DPRESH:
0723  D4DA       2102             CALL    SUB34       ;COMPARE DIVIDEND AND DIV
                 2103
0725  F233       2104             JB7     DPRSD
                 2105
0727  D4D3       2106             CALL    ADD34       ;STILL SMALL; RESTORE R3,
                 2107
0729  FD         2108             MOV     A,R5        ;SHIFT R5,6 LEFT
072A  97         2109             CLR     C
072B  F7         2110             RLC     A
072C  AD         2111             MOV     R5,A
072D  FE         2112             MOV     A,R6
072E  F7         2113             RLC     A
072F  AE         2114             MOV     R6,A
0730  1F         2115             INC     R7          ;COUNT R5,6 SHIFTS IN R7
0731  E423       2116             JMP     DPRESH      ;TRY AGAIN
                 2117  DPRSD:
0733  D4D3       2118             CALL    ADD34       ;RESTORE R3,4
0735  FF         2119             MOV     A,R7        ;IF NO SHIFTS, WE'RE DONE
0736  C652       2120             JZ      DFIN
                 2121  ;
                 2122  ;          NOW DIVIDE BY MAKING TRIAL SUBTRACTIONS
                 2123  ;          WHILE SHIFTING THE DIVISOR BACK DOWN
                 2124  ;
                 2125  DLOOP:
0738  FE         2126             MOV     A,R6        ;SHIFT R5,6 RIGHT
0739  97         2127             CLR     C
073A  67         2128             RRC     A
073B  AE         2129             MOV     R6,A
073C  FD         2130             MOV     A,R5
073D  67         2131             RRC     A
073E  AD         2132             MOV     R5,A
073F  D4DA       2133             CALL    SUB34       ;TRIAL SUBTRACTION
                 2134
0741  F247       2135             JB7     DSFAIL
```

```
LOC  OBJ       SEQ           SOURCE STATEMENT 2136
0743 97       2137          CLR     C           ;SUCCESS; SHIFT 1
0744 A7       2138          CPL     C           ;INTO THE QUOTIENT.
0745 E44A     2139          JMP     DSCOM
              2140 DSFAIL:
0747 D4D3     2141          CALL    ADD34       ;FAILURE; RESTORE R3,4
              2142
0749 97       2143          CLR     C           ;SHIFT 0 INTO QUOTIENT
              2144 DSCOM:
074A F9       2145          MOV     A,R1        ;SHIFT QUOTIENT BIT UP
074B F7       2146          RLC     A           ;INTO R12
074C A9       2147          MOV     R1,A
074D FA       2148          MOV     A,R2
074E F7       2149          RLC     A
074F AA       2150          MOV     R2,A
0750 EF38     2151          DJNZ    R7,DLOOP    ;GO UNTIL R5,6 SHIFTED B
              2152 DFIN:
0752 D47C     2153          CALL    R56R34      ;R5,6 = REMAINDER
              2154
0754 F9       2155          MOV     A,R1
0755 AB       2156          MOV     R3,A
0756 FA       2157          MOV     A,R2
0757 AC       2158          MOV     R4,A        ;R3,4 = QUOTIENT
0758 83       2159          RET                 ;EXIT DIVIDE, DIVDER, TEN
              2160 ;
              2161 ;       BCD CONVERTS THE POSITIVE BINARY
              2162 ;       NUMBER IN R3,4 INTO FOUR BCD HEXITS.
              2163 ;
              2164 ;               R3,4 = POSITIVE BINARY NUMBER <<
              2165 ;                      (NO ERROR CHECKING!)
              2166 ;       CALL    BCD
              2167 ;               R3,4 = 4-DIGIT BCD EQUIVALENT
              2168 ;                      (R3:LO LEAST SIGNIFICANT)
              2169 ;               R0,1,2,5,6 = ?
              2170 ;
              2171 BCD:
0759 F40D     2172          CALL    TENTHX
              2173
075B FD       2174          MOV     A,R5
075C A8       2175          MOV     R0,A
075D F40D     2176          CALL    TENTHX
              2177
075F F8       2178          MOV     A,R0
0760 47       2179          SWAP    A
0761 4D       2180          ORL     A,R5
0762 47       2181          SWAP    A           ;R0 HAS 2 LOW DIGITS
0763 A8       2182          MOV     R0,A
0764 F40D     2183          CALL    TENTHX
              2184
0766 FB       2185          MOV     A,R3
0767 47       2186          SWAP    A
0768 4D       2187          ORL     A,R5        ;A HAS 2 HIGH DIGITS
0769 AC       2188          MOV     R4,A
076A F8       2189          MOV     A,R0
076B AB       2190          MOV     R3,A        ;R3,4 HAS ALL 4 DIGITS
076C 83       2191          RET                 ;EXIT BCD
              2192 ;
              2193 ;       ZBLANK BLANKS LEADING ZEROES IN
              2194 ;       THE FIRST THREE DIGITS OF A BCD
              2195 ;       NUMBER IN R3,4.
              2196 ;
              2197 ;               R3,4 = BCD NUMBER
              2198 ;       CALL    ZBLANK
              2199 ;               R3,4 = BLANKED BCD NUMBER
              2200 ;
              2201 ZBLANK:
076D FC       2202          MOV     A,R4
076E 53F0     2203          ANL     A,#0F0H
0770 9687     2204          JNZ     ZDONE
              2205
0772 23F0     2206          MOV     A,#0F0H
0774 4C       2207          ORL     A,R4
0775 AC       2208          MOV     R4,A
```

| LOC | OBJ | SEQ | | SOURCE STATEMENT | |
|---|---|---|---|---|---|
| 0776 | 530F | 2209 | | ANL | A,#0FH |
| 0778 | 9687 | 2210 | | JNZ | ZDONE |
| | | 2211 | | | |
| 077A | 230F | 2212 | | MOV | A,#0FH |
| 077C | 4C | 2213 | | ORL | A,R4 |
| 077D | AC | 2214 | | MOV | R4,A |
| 077E | FB | 2215 | | MOV | A,R3 |
| 077F | 53F0 | 2216 | | ANL | A,#0F0H |
| 0781 | 9687 | 2217 | | JNZ | ZDONE |
| | | 2218 | | | |
| 0783 | 23F0 | 2219 | | MOV | A,#0F0H |
| 0785 | 4B | 2220 | | ORL | A,R3 |
| 0786 | AB | 2221 | | MOV | R3,A |
| | | 2222 | ZDONE: | | |
| 0787 | 83 | 2223 | | RET | ;EXIT ZBLANK |
| | | 2224 | ; | | |
| | | 2225 | ; | SYSBUG IS A HANDLER FOR NON-FATAL | |
| | | 2226 | ; | (RECOVERABLE) ERRORS. AN ERROR | |
| | | 2227 | ; | FLAG IS SET IN ICONV AND THE | |
| | | 2228 | ; | CALLER'S ADDRESS IS OBTAINED FROM | |
| | | 2229 | ; | THE STACK AND SAVED AT SBGERR | |
| | | 2230 | ; | IN THE RAM. | |
| | | 2231 | ; | | |
| | | 2232 | ; | CALL | SYSBUG ;PLEASE COMMENT THE ERROR |
| | | 2233 | ; | | ;HERE AT THE CALL !!!! |
| | | 2234 | ; | | R0,3,4 = ? |
| | | 2235 | ; | | |
| | | 2236 | SYSBUG: | | |
| 0788 | C7 | 2237 | | MOV | A,PSW ;FIND STACK ENTRY |
| 0789 | 07 | 2238 | | DEC | A |
| 078A | 5307 | 2239 | | ANL | A,#07H |
| 078C | E7 | 2240 | | RL | A |
| 078D | 0308 | 2241 | | ADD | A,#08H |
| 078F | A8 | 2242 | | MOV | R0,A |
| 0790 | F0 | 2243 | | MOV | A,@R0 |
| 0791 | AB | 2244 | | MOV | R3,A |
| 0792 | 18 | 2245 | | INC | R0 |
| 0793 | F0 | 2246 | | MOV | A,@R0 |
| 0794 | 530F | 2247 | | ANL | A,#00FH |
| 0796 | AC | 2248 | | MOV | R4,A ;R3,4 = CALLER'S RETURN A- |
| 0797 | B820 | 2249 | | MOV | R0,#ICONV ;NOTE BUG IN ICONV ERR |
| 0799 | F0 | 2250 | | MOV | A,@R0 |
| 079A | F2A3 | 2251 | | JB7 | SBGRET ;QUIT IF ERROR ALREADY PE |
| | | 2252 | | | |
| 079C | 4380 | 2253 | | ORL | A,#080H ;SET ERROR BIT IN ICONV |
| 079E | A0 | 2254 | | MOV | @R0,A |
| 079F | B85E | 2255 | | MOV | R0,#SBGERR ;STORE USER PC |
| 07A1 | D48F | 2256 | | CALL | M0R34 |
| | | 2257 | SBGRET: | | |
| 07A3 | 83 | 2258 | | RET | ;EXIT SYSBUG |
| | | 2259 | ;;;;; | | |
| | | 2260 | ;;;;; | CONDITIONAL ASSEMBLY FOR DEBUGGING FOLLOW | |
| | | 2261 | ;;;;; | | |
| | | 2262 | | IF | RAMIO |
| | | 2263 | ; | | |
| | | 2264 | ; | RAMRD AND RAMWR ARE ROUTINES USED FOR | |
| | | 2265 | ; | MANUAL READING AND WRITING OF THE 8156 | |
| | | 2266 | ; | DURING DEBUG. | |
| | | 2267 | ; | | |
| | | 2268 | RAMRD: | | |
| 07A4 | 80 | 2269 | | MOVX | A,@R0 |
| 07A5 | 18 | 2270 | | INC | R0 |
| | | 2271 | RDBRK: | | |
| 07A6 | E4A4 | 2272 | | JMP | RAMRD |
| | | 2273 | ; | | |
| | | 2274 | RAMWR: | | |
| 07A8 | 90 | 2275 | | MOVX | @R0,A |
| 07A9 | 18 | 2276 | | INC | R0 |
| | | 2277 | WRBRK: | | |
| 07AA | E4A8 | 2278 | | JMP | RAMWR |
| | | 2279 | ; | | |
| | | 2280 | | ENDIF | |
| | | 2281 | ; | | |

```
LOC  OBJ        SEQ           SOURCE STATEMENT

2282          IF      FAKSTB
                2283    ;
                2284    ;     STROBE TOGGLES KBST IN P2 FOR
                2285    ;     "STBCNT" CYCLES.
                2286    ;
                2287    ;     CALL    STROBE
                2288    ;     R3,4,5,6 = ?
                2289    ;
                2290 STROBE:
07AC BB96       2291          MOV     R3,#LOW STBCNT
07AE BC00       2292          MOV     R4,#HIGH STBCNT
07B0 BE00       2293          MOV     R6,#0
07B2 BD01       2294          MOV     R5,#1
                2295 SLOOP:
07B4 D4DA       2296          CALL    SUB34
                2297
07B6 F2BE       2298          JB7     SQUIT
                2299
07B8 8A40       2300          ORL     P2,#KBST
07BA 9ABF       2301          ANL     P2,#NOT KBST
07BC E4B4       2302          JMP     SLOOP
                2303 SQUIT:
07BE 83         2304          RET             ;EXIT STROBE
                2305    ;
                2306          ENDIF
                2307    ;
                2308          IF      FAKEIO
                2309    ;
                2310          ORG     IO0     ;EXT INT VECTOR
                2311          JMP     SROHDR
                2312    ;
                2313          ORG     IO1B    ;8255 SET UP
                2314          MOV     A,#M3CEN OR M1CE
                2315          OUTL    P2,A
                2316          JMP     IO1E
                2317    ;
                2318          ORG     IO2B    ;SET 8156 TIMER MODE
                2319          JMP     IO2E    ;AND CLEAR PORT C
                2320    ;
                2321          ORG     IO3B    ;A <- 74C89 BYTE
                2322          MOV     A,#132
                2323          JMP     IO3E
                2324    ;
                2325          ORG     IO4B    ;START CLOCK & ENABLE INT
                2326          JMP     IO4E
                2327    ;
                2328          ORG     IO5B    ;SET UP P2 FOR RUN
                2329          JMP     IO5E
                2330    ;
                2331          ORG     IO6     ;ENABLE EXT INT
                2332          EN      I       ;ONLY FOR DEBUG
                2333    ;
                2334          ORG     IO7     ;SEL 8155 IO FOR DISPLAY
                2335          NOP
                2336    ;
                2337          ORG     IO8     ;MOVX @R1,A FOR BLANKING
                2338          NOP
                2339    ;
                2340          ORG     IO9     ;MOVX @R1,A FOR DPY
                2341          NOP
                2342    ;
                2343          ORG     IO10    ;RESTORE P2 AFTER DPY
                2344          NOP
                2345    ;
                2346          ORG     IO12B   ;FLOHDR COUNTER ENABLE
                2347          JMP     IO12E
                2348    ;
                2349          ORG     IO13B   ;OUTPUT ALARM CONTROL
                2350          JMP     IO13E
                2351    ;
                2352          ORG     IO14B   ;FUEL COUNTER READ
                2353          MOV     A,#0F0H
                2354    ;
```

```
LOC  OBJ           SEQ         SOURCE STATEMENT
                   2355        ORG    IO16B     ;R3 TO LOGGER
                   2356        JMP    IO16E
                   2357 ;
                   2358        ORG    IO17      ;PWRDN: LOW HEXIT ON HIGH
                   2359        NOP
                   2360 ;
                   2361        ORG    IO18      ;PWRDN: HIGH HEXIT ON HIG
                   2362        NOP
                   2363 ;
                   2364        ORG    IO19B     ;WRTSTB: SSB <- A
                   2365        JMP    IO1?
                   2366 ;
                   2367        ORG    IO20      ;RDPCX: A <- CONFIG
                   2368        MOV    A,#000H
                   2369        NOP
                   2370        RET
                   2371 ;
                   2372        ORG    IO21      ;RDPBX: A <- SWITCHES
                   2373        MOV    A,#000H
                   2374        NOP
                   2375        RET
                   2376 ;
                   2377        ORG    IO22      ;SAVE P2 FOR DPY
                   2378        NOP
                   2379 ;
                   2380 ;
                   2381 ;
                   2382        ENDIF
                   2383 ;
                   2384 ;
                   2385 ;
                   2386        END
```

USER SYMBOLS

```
ADD34  06D3    AFLSHD 05F1    ALMDET 0394    ALMFND 045B
ALTM   0008    BADTR  035A    BBUFL  0060    BSUFR  0070
BCD    0759    BLANKM 05DE    BLANKN 0586    CHKRTC 025F
CLOOP  0016    CMDGEN 0363    CNDGND 0392    CMLOOP 0030
COMPEN 029E    DBLOOP 04EC    DBAD   071B    DBETA  0197
DELP   02B9    DFIN   0752    DIVIDE 0711    DIVLGR 06FF
DLOOP  0739    DOAXFR 05E6    DODIF  02F0    DODIV  071F
DOITST 0289    DOMXFR 05BE    DONXFR 0596    DPGRET 0580
DPRESH 0723    DPRSD  0733    DPXRET 05F9    DPYBRE 046B
DPYBRT 04B3    DPYGEN 0493    DPYXFR 0581    DSCOM  074A
DSE    04C5    DSECOM 04CA    DSEN   04C8    DSFAIL 0747
ETX    0003    FAKEIO 0000    FAKSTB 0001    FFCDCD 01BA
FFDIS  0080    FFINT  0058    FHRRET 0265    FL     0012
FLASH  03AE    FLASHM 0001    FLFR   055F    FLFRTR 053C
FLOHDR 01D7    FLOFRD 027A    FLSHUP 0555    FLSTND 0032
FLTR   0543    FR     0010    FRSTND 0034    FRTR   054C
FSMDON 02F2    FSUM   02E7    FT     0014    FTOK   02F8
FTTR   0531    FTTRJ  04D1    GALS   02CF    HIGHCT 0001
HRTST  0188    IA     0036    IC     0037    ICMD   0028
ICMDST 0022    ICONF  0025    ICONV  0020    IDCTL  0035
IDM    003C    IDN    0038    IDPY   0036    IDPYCT 0031
IFFCIR 0030    IFFTMR 002E    ILOGC  0023    IMPTR  0034
INCBSE 004B    INC00  00F5    INCSEC 0177    INPTR  0033
INRANG 0463    INRBAD 048D    INROK  0491    INRRET 0492
INTVAL 00C0    INZIO  004D    INZTBS 0038    IO0    0003
IO10   01D4    IO12B  0215    IO12E  0217    IO13B  045B
IO13E  0462    IO14B  0266    IO14E  0268    IO16B  063A
IO16E  0644    IO17   065B    IO18   066E    IO19B  06A9
IO19E  06AE    IO19V  FFC8    IO1B   0020    IO1E   0026
IO1V   008B    IO20   06AF    IO21   06B5    IO22   01A4
IO2B   0058    IO2E   0065    IO3B   0083    IO3E   009A
IO4B   00D0    IO4E   00D2    IO5B   0131    IO5E   0135
IO6    0137    IO7    01A6    IO8    01AC    IO9    01AE
IOLDCM 0026    IPCT   0032    IRTC   002B    ISSTEP 000F
ISUBIT 0482    ISWIM  0027    ITOCTR 0029    JLRTR  04C3
JOCTR  048F    JQRTR  04C1    KBST   0048    LBS    02C1
LFTEMP 007E    LG     0006    LG1RET 0049    LIBEL  02CF
```

USER SYMBOLS

| | | | | | | | | |
|---|---|---|---|---|---|---|---|---|
| LITSET | 0560 | LL10 | 04AA | LL15 | 0488 | LL5 | 006C | |
| LOG | 0604 | LOG1 | 0633 | LOGBUF | 0640 | LOGCOM | 0610 | |
| LOGCPY | 0618 | LOGDAT | 0620 | LOGLEN | 030C | LOGNEG | 0629 | |
| LOGONE | 063A | LOGPOS | 061F | LOGRET | 0629 | LOGSPC | 000C | |
| LOGSYN | 0050 | M0R34 | 068F | M1CE | 0010 | M1IO | 0004 | |
| M1P56 | 0696 | M2A0 | 0001 | M2A1 | 0002 | M2CSN | 0020 | |
| M2CEN | 0008 | MCOM | 0562 | MEM2 | 00A7 | MIN34 | 06E5 | |
| MINRET | 06F1 | MINTST | 0182 | MSCNT | 0005 | NCOM | 058A | |
| NEGFT | 0000 | NEGOR | 0000 | NEITHR | 0447 | NEWRST | 0403 | |
| NOACHG | 041F | NOLARM | 0454 | NOLOG | 0647 | NOTNUL | 0327 | |
| NUCYC | 0129 | NXLOAD | 069D | NXTDO | 027F | PAINTM | 05CA | |
| PAINTN | 05A2 | PRDIV | 0338 | PTROK | 0252 | PWRDN | 064A | |
| Q0 | 0008 | Q0T | 000A | Q0TCTR | 0019 | QC | 000E | |
| QCALC | 02FD | QCTR | 0529 | QR | 000C | QREX | 0347 | |
| QRTR | 052D | R34M0 | 0681 | R56M1 | 0688 | R56R34 | 067C | |
| RAMIO | 0001 | RAMRD | 07A4 | RAMWR | 07A8 | RANGCT | 0004 | |
| RAWFLG | 0228 | RDBRK | 07A6 | RDEXT | 0609 | RDPBX | 06B5 | |
| RDPCX | 06AF | RDPXX | 06B9 | RDSW | 05FA | READF | 0266 | |
| RLARM | 0431 | RLARMD | 043D | RSTDPY | 04E8 | RSTR34 | 06EF | |
| RSTSTP | 0390 | RTNCYC | 0138 | RTTEMP | 006E | RUN | 0113 | |
| RWLP | 0029 | RWRP | 0020 | S0LOK | 0101 | S0LOOP | 00F7 | |
| SAFSSB | 0004 | SBGDPY | 04F9 | SBGERR | 005E | SBGRET | 07A3 | |
| SCOUNT | 01B8 | SCT | 2144 | SECCNT | 0412 | SECOND | 0174 | |
| SECTST | 017E | SETARM | 044E | SETDON | 0083 | SETFSH | 058D | |
| SETLP | 0069 | SETR | 03B2 | SETREG | 0065 | SETSTP | 038C | |
| SLOOP | 07B4 | SOH | 0001 | SQUIT | 07BE | SR34 | 06F2 | |
| SRDON | 06FE | SRLP | 06F5 | SRQEXT | 01D3 | SRQGEN | 00CD | |
| SRQHDR | 0159 | START | 0010 | STBCNT | 0096 | STEADY | 03B0 | |
| STOQ0 | 0107 | STPDPY | 050D | STROBE | 07AC | STRTFL | 0083 | |
| SUB34 | 06DA | SWI2R | 0002 | SYNC | 0055 | SYSBUG | 0788 | |
| TEMPLT | 0075 | TENTHX | 070D | TENX | 06BD | TEST24 | 0192 | |
| TESTCT | 0169 | TR | 0016 | TRCALC | 0348 | TRCOM | 0559 | |
| TRSET | 035E | TSTLBS | 02BB | UPDN | 00E8 | VALSTR | 0341 | |
| VARHI | 046D | VARLOE | 046C | WCNT | 004E | WRBRK | 07AA | |
| WRTSTB | 06A9 | XCHDCT | 01A9 | ZBLANK | 076D | ZCNTRS | 0119 | |
| ZDONE | 0787 | | | | | | | |

ASSEMBLY COMPLETE, 2 ERROR(S) ( 0)

| | | | | | | | | |
|---|---|---|---|---|---|---|---|---|
| ADD34 | 238 | 390 | 792 | 800 | 839 | 879 | 911 | 925 | 1227 |
| | 1947 | 1961# | 2015 | 2106 | 2118 | 2141 | | | |
| AFLSHD | 1571 | 1574# | | | | | | | |
| ALMDET | 463 | 1056# | | | | | | | |
| ALMFND | 1182 | 1185# | | | | | | | |
| ALTM | 155# | 1407 | | | | | | | |
| BADTR | 995 | 1001# | | | | | | | |
| BBUFL | 71# | 627 | 628 | 634 | 635 | 641 | 642 | 648 | 649 |
| | 655 | 656 | 662 | 663 | 681 | 764 | 767 | | |
| BBUFR | 73# | 682 | 764 | 767 | | | | | |
| BCD | 1514 | 1551 | 2171# | | | | | | |
| BLANKM | 1538 | 1542 | 1555# | | | | | | |
| BLANKN | 1501 | 1505 | 1518# | | | | | | |
| CHKRTC | 736 | 739# | | | | | | | |
| CLOOP | 188# | 193 | | | | | | | |
| CMDGEN | 462 | 1012# | | | | | | | |
| CMDGND | 1044 | 1047 | 1050# | | | | | | |
| CMLOOP | 213# | 219 | | | | | | | |
| COMPEN | 804 | 813# | | | | | | | |
| DBLOOP | 1338# | 1342 | | | | | | | |
| DEAD | 2081 | 2084 | 2089# | | | | | | |
| DBETA | 516 | 521 | 534 | 544 | 554 | 557# | | | |
| DELF | 832 | 838# | | | | | | | |
| DFIN | 2091 | 2120 | 2152# | | | | | | |
| DIVIDE | 915 | 967 | 997 | 2071 | 2075# | | | | |
| DIVLGR | 857 | 864 | 2062# | | | | | | |
| DLOOP | 2125# | 2151 | | | | | | | |
| DOAXFR | 1531 | 1563# | | | | | | | |
| DODIF | 877 | 882# | | | | | | | |
| DODIV | 2088 | 2092# | | | | | | | |
| DOITST | 795# | 802 | | | | | | | |
| DOMXFR | 1494 | 1526# | | | | | | | |
| DONXFR | 1497 | 1491# | | | | | | | |
| DPGRET | 1347 | 1361 | 1384 | 1463# | | | | | |
| DPRESH | 2101# | 2116 | | | | | | | |

| | | | | | | | |
|---|---|---|---|---|---|---|---|
| DPRSD | 2104 | 2117# | | | | | |
| DPXRET | 1477 | 1585# | | | | | |
| DPYBRE | 1285 | 1286 | 1287# | | | | |
| DPYBRT | 1276 | 1278# | 1312 | | | | |
| DPYGEN | 464 | 1251# | | | | | |
| DPYXFR | 409 | 465 | 1468# | | | | |
| DSCOM | 2139 | 2144# | | | | | |
| DSE | 1279 | 1280 | 1296# | | | | |
| DSECOM | 1300 | 1303# | | | | | |
| DSEN | 1282 | 1301# | 1312 | | | | |
| DSFAIL | 2135 | 2140# | | | | | |
| ETX | 151# | 1665 | | | | | |
| FAKEIO | 126# | 2308 | | | | | |
| FAKSTB | 129# | 476 | 2282 | | | | |
| FFCDCD | 587 | 592# | | | | | |
| FFDIS | 122# | 199 | 439 | 612 | 669 | | |
| FFINT | 69# | 240 | 599 | | | | |
| FHRRET | 742 | 747# | | | | | |
| FL | 59# | 846 | 858 | 869 | 1125 | 1146 | 1411 | 1436 |
| FLASH | 1069 | 1077# | | | | | |
| FLASHM | 1528 | 1425 | | | | | |
| FLPR | 1308 | 1405* | | | | | |
| FLFXTR | 1295 | 1460# | | | | | |
| FLOHDR | 457 | 625# | | | | | |
| FLOPRO | 458 | 782# | | | | | |
| FLSHUP | 1399 | 1414 | 1422 | 1425# | | | |
| FLSTND | 65# | 1128 | 1145 | | | | |
| FLTR | 1410# | | | | | | |
| FR | 58# | 852 | 866 | 870 | 1131 | 1154 | 1419 | 1438 |
| FRSTND | 66# | 1134 | 1153 | | | | |
| FRTR | 1408 | 1418# | | | | | |
| FSMDON | 881 | 884# | | | | | |
| FSUM | 855 | 874# | | | | | |
| FT | 60# | 897 | 905 | 991 | 1396 | | |
| FTOK | 886 | 896# | | | | | |
| FTTR | 1310 | 1394# | | | | | |
| FTTRJ | 1306 | 1309# | | | | | |
| GALS | 844 | 856# | | | | | |
| HIGHCT | 135# | 734 | | | | | |
| HRTST | 542# | | | | | | |
| IA | 45# | 46 | 1344 | 1575 | | | |
| IC | 47# | 1582 | | | | | |
| ICMD | 35# | 364 | 1019 | 1261 | 1469 | 1607 | |
| ICMDST | 30# | 1034 | 1100 | 1253 | | | |
| ICONF | 32# | 195 | 221 | 344 | 814 | 841 | 875 | 1304 |
| ICONV | 29# | 1082 | 1101 | 1169 | 1252 | 1317 | 1474 | 2249 |
| IDCTL | 44# | 1014 | 1093 | 1164 | 1350 | 1364 | 1454 | 1492 | 1529 |
| | 1565 | | | | | | |
| IDM | 49# | 1359 | 1372 | 1560 | | | |
| IDN | 48# | 1381 | 1523 | | | | |
| IDPY | 46# | 567 | 1337 | | | | |
| IDPYCT | 40# | 558 | | | | | |
| IFFCIR | 39# | 368 | 380 | 606 | 1405 | 1484 | |
| IFFTMR | 38# | 243 | 582 | | | | |
| ILOGC | 31# | 330 | 1642 | | | | |
| IMPTR | 43# | 1431 | 1437 | 1540 | | | |
| INCBSE | 232 | 237# | | | | | |
| INCQ0 | 385 | 389# | | | | | |
| INCSEC | 526# | | | | | | |
| INPTR | 42# | 1271 | 1354 | 1503 | | | |
| INRANG | 1147 | 1155 | 1211# | | | | |
| INRBAD | 1230 | 1241# | | | | | |
| INROK | 1232 | 1237 | 1240 | 1244# | | | |
| INRRET | 1243 | 1246# | | | | | |
| INTVAL | 100# | | | | | | |
| INZIO | 236 | 239# | | | | | |
| INZTBS | 220# | | | | | | |
| IO0 | 172# | 2310 | | | | | |
| IO10 | 616# | 2343 | | | | | |
| IO12B | 668# | 2346 | | | | | |
| IO12E | 670# | 2347 | | | | | |
| IO13B | 1186# | 2349 | | | | | |
| IO13E | 1191# | 2350 | | | | | |
| IO14B | 755# | 2352 | | | | | |
| IO14E | 758# | | | | | | |
| IO16B | 1696# | 2355 | | | | | |

| | | | | | | | | |
|---|---|---|---|---|---|---|---|---|
| IO16F | 1705# | 2356 | | | | | | |
| IO17 | 1733# | 2358 | | | | | | |
| IO18 | 1749# | 2361 | | | | | | |
| IO19B | 1896# | 2364 | | | | | | |
| IO19E | 1891# | 2365 | | | | | | |
| IO19V | 1887# | 1883 | | | | | | |
| IO1B | 195# | 2313 | | | | | | |
| IO1E | 204# | 2316 | | | | | | |
| IO1V | 197# | 198# | 198 | 199# | 199 | 200 | | |
| IO20 | 1902# | 2367 | | | | | | |
| IO21 | 1908# | 2372 | | | | | | |
| IO22 | 569# | 2377 | | | | | | |
| IO2B | 249# | 2318 | | | | | | |
| IO2E | 253# | 2319 | | | | | | |
| IO3B | 289# | 2321 | | | | | | |
| IO3E | 311# | 2323 | | | | | | |
| IO4B | 353# | 2325 | | | | | | |
| IO4E | 356# | 2326 | | | | | | |
| IO5B | 436# | 2328 | | | | | | |
| IO5E | 440# | 2329 | | | | | | |
| IO6 | 443# | 2331 | | | | | | |
| IO7 | 572# | 2334 | | | | | | |
| IO8 | 576# | 2337 | | | | | | |
| IO9 | 579# | 2340 | | | | | | |
| IOLDCM | 33# | 429 | 1021 | | | | | |
| IPCT | 41# | 260 | 427 | 976 | 1016 | 1097 | 1175 | 1449 | 1566 |
| IRTC | 37# | 527 | 1328 | 1368 | | | | | |
| ISSTEP | 366 | 371# | | | | | | |
| ISUBIT | 1225 | 1233# | | | | | | |
| ISWIM | 34# | 1599 | | | | | | |
| ITBCTR | 36# | 503 | 1324 | | | | | |
| JLRTR | 1284 | 1294# | | | | | | |
| JQCTR | 1281 | 1290# | | | | | | |
| JQRTR | 1283 | 1292# | | | | | | |
| KBST | 121# | 197 | 2300 | 2301 | | | | |
| LBS | 845# | | | | | | | |
| LFTEMP | 76# | 819 | | | | | | |
| LG | 97# | 2063 | 2066 | | | | | |
| LG1RET | 1707 | 1710# | | | | | | |
| LIBEL | 1105# | 1106 | | | | | | |
| LITSET | 1433 | 1446# | | | | | | |
| LL10 | 1103 | 1114# | | | | | | |
| LL15 | 1266 | 1269# | | | | | | |
| LL4 | 393 | 396# | | | | | | |
| LOG | 468 | 1641# | | | | | | |
| LOG1 | 1666 | 1677# | | | | | | |
| LOGBUF | 77# | 1650 | | | | | | |
| LOGCOM | 1669 | 1673# | | | | | | |
| LOGCPY | 1652# | 1657 | | | | | | |
| LOGDAT | 1662 | 1670# | | | | | | |
| LOGLFN | 148# | 348 | 467 | 1651 | 1661 | | | |
| LOGNEG | 1645 | 1667# | | | | | | |
| LOGONE | 1678 | 1695# | | | | | | |
| LOGPOS | 1647 | 1660# | | | | | | |
| LOGRET | 1680 | 1684# | | | | | | |
| LOGSPC | 56# | 1649 | 1672 | | | | | |
| LOGSYN | 68# | 332 | 1668 | | | | | |
| M0R34 | 241 | 317 | 407 | 419 | 425 | 732 | 808 | 820 | 847 |
| | 859 | 867 | 898 | 953 | 1006 | 1129 | 1135 | 1824# | 2256 |
| M1CE | 119# | 197 | 438 | 573 | 1887 | 1890 | 1904 | 1910 | 1915 |
| | 2314 | | | | | | | | |
| M1IO | 117# | 197 | 250 | 257 | 439 | 573 | 598 | 1187 | 1190 |
| | 1887 | 1904 | 1910 | | | | | | |
| M1R56 | 728 | 853 | 920 | 929 | 1844# | | | | |
| M2A0 | 115# | 199 | 1887 | 1904 | 1911 | | | | |
| M2A1 | 116# | 199 | 1887 | 1905 | 1910 | | | | |
| M2CSN | 120# | 197 | 438 | 573 | 1887 | 1890 | 1904 | 1910 | 1915 |
| M2OSN | 118# | 199 | 2314 | | | | | | |
| MCON | 1354 | 1364# | | | | | | |
| MEA1 | 2218 | | | | | | | |
| MIN34 | 404 | 1512 | 1549 | 2004# | | | | |
| MINKET | 2013 | 2016# | | | | | | |
| MINIST | 535# | | | | | | | |
| NBCNT | 102# | 351 | 501 | | | | | |
| NCOM | 1517 | 1522# | | | | | | |

```
NEGFT   138#    888
NEGOR   141#    939
NEITHR  1137    1162    1168#
NEWRST  1255    1316#
NORCHG  1117    1138#
NOLARM  1123    1142    1179#
NOLOG   1700    1708#
NOTNUL  937     951#
NUCYC   431#
NXLOAD  1360    1373    1382    1524    1561    1863#
NXTDO   796#    812
PAINTM  1534    1536    1539#
PAINTN  1497    1499    1502#
PRDIV   962     966#
PTROK   717     725#
PWRDN   474     1718#
Q0      53#     275     316     406     411     421     931     958
Q0T     54#     418
Q0TCTR  62#
QC      57#     922     1387
QCALC   459     904#
QCTR    1291    1386#
QR      55#     56      424     952     986     1391    1719
QREX    980#
QRTR    1293    1390#
R34MA   412     422     789     829     862     871     906     932     987
        1063    1126    1132    1213    1220    1224    1508    1545    1720
        1786#
R56M1   796     850     873     909     923     959     992     1214    1228
        1235    1804#
R56R34  791     927     1223    1770#   2153
RAMIO   132#    2262
RAMRD   2268#   2272
RAMWR   2274#   2278
RANGCT  158#    1144    1152
RAWFLD  684#    703
RDBRK   2271#
RDEXT   1694    1609#
RDPBX   1596    1907#
RDPCX   207     1901#
RDPXX   1906    1912#
RDSW    362     461     1595#
READF   622     639     646     653     660     667     752#
RLARM   1148    1151#
RLARMD  1156    1159#
RSTDPY  1263    1321    1334#
RSTR34  2007    2014#
RSTSTP  1040    1042    1043#
RTNCYC  452#    453     487     491
RTTEMP  72#     807     849     861
RUN     378     415#
RWLP    64#     326     707     810     811
RWRP    63#     322     708     784     785
S0LOK   395     401#
S0LOOP  370     372     388     391#
SAFSSB  157#    205     319             434     673     1757
SBGDPY  1259    1289    1349#
SBGERR  70#     1355    2255
SBGRST  2251    2257#
SCOUNT  197#    222     322
SCT     197#    913     914
SECCNT  105#    515     520
SECOND  522#
SECTST  532#
SETARM  1174#
SETDON  265     282#    284
SETFSH  1472    1478#
SETLP   262#    272     284
SETR    1076    1081#
SETREG  259#
SETSTP  1038    1045#
SLOOP   2295#   2302
SOH     150#    338
SQUIT   2298    2303#
$R34    823     1222    2028#
SRDON   2030    2040#
```

| | | | | | | | | |
|---|---|---|---|---|---|---|---|---|
| SFLP | 2031# | 2039 | | | | | | |
| SRQEXT | 596 | 614# | | | | | | |
| SRQGEN | 350# | | | | | | | |
| SRQHDR | 177 | 498# | 2311 | | | | | |
| START | 169 | 182# | | | | | | |
| STBCNT | 161# | 2291 | 2292 | | | | | |
| STEADY | 1074 | 1079# | | | | | | |
| STOP0 | 400 | 405# | | | | | | |
| STPDPY | 1269 | 1363# | | | | | | |
| STROKE | 478 | 2290# | | | | | | |
| STRTFL | 288# | | | | | | | |
| SUB34 | 234 | 387 | 836 | 883 | 934 | 1067 | 1072 | 1215 | 1229 |
| | 1234 | 1236 | 1981# | 2005 | 2102 | 2133 | 2296 | | |
| SWIZR | 361# | 414 | | | | | | |
| SYNC | 149# | 333 | | | | | | |
| SYSBUG | 173 | 489 | 738 | 744 | 889 | 940 | 1288 | 2090 | 2236# |
| TEMPLT | 261 | 273# | | | | | | |
| TENTHX | 416 | 1722 | 2072# | 2172 | 2176 | 2183 | | | |
| TENX | 314 | 956 | 989 | 1927# | | | | |
| TEST24 | 552# | | | | | | | |
| TESTCT | 507 | 513# | | | | | | |
| TF | 61# | 1005 | 1062 | 1432 | | | | |
| TRCALC | 460 | 985# | | | | | | |
| TRCOM | 1388 | 1392 | 1401 | 1416 | 1424 | 1430# | | |
| TRSET | 1000 | 1004# | | | | | | |
| TSTLES | 817 | 837 | 840# | | | | | |
| UPON | 376 | 379# | | | | | | |
| VALSTP | 965 | 971 | 974# | | | | | |
| VARHI | 1216 | 1219# | | | | | | |
| VARLOE | 1217# | | | | | | | |
| WCNT | 67# | 908 | 919 | | | | | |
| WPBRK | 2277# | | | | | | | |
| WPTSTB | 206 | 295 | 301 | 304 | 320 | 433 | 435 | 630 | 637 |
| | 644 | 651 | 658 | 665 | 672 | 674 | 1725 | 1728 | 1736 |
| | 1739 | 1742 | 1745 | 1752 | 1755 | 1758 | 1885# | | |
| XCHDCT | 561 | 565# | | | | | | |
| XXX | 285 | 1107 | 1313 | | | | | |
| ZBLANK | 1516 | 1553 | 2201# | | | | | |
| ZCNTRS | 420# | | | | | | | |
| ZONE | 2204 | 2210 | 2217 | 2222# | | | | |

CROSS REFERENCE COMPLETE

Other embodiments of the present fuel flow consumption monitoring system are also possible. For example, additional memory circuits can be included to store fuel consumption rates over long periods of time. An on-line recorder can interface with the microprocessor to produce a permanent record of the fuel status and fuel consumption rates over the duration of an aircraft or marine vehicular engine operation. The permanent record can also include diagnostic code information to determine if the rate of fuel consumption is increasing too rapidly to take-off over several aircraft flights or engine ignitions. The on-line recorder may comprise, for example, a tape cartridge. An over flow alarm can also be included to transfer data from the on-line recorder to an off-line station.

It may thus be seen that the present invention contemplates a fuel flow consumption monitoring system for automatically and continuously monitoring the fuel status and fuel consumption rates of engines including aircraft and marine type vehicular engines. The monitoring system displays the amount of fuel utilized since engine ignition, the amount of fuel remaining at a present time, the rate of consumption and time remaining based upon the current consumption rates and the current fuel remaining. Additionally, the present system includes alarms for automatically indicating low fuel and deviations in consumption rates above a predetermined deviation.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A monitoring device for monitoring fuel consumption of an engine having a fuel supply tank and an input fuel line extending between the fuel supply tank and the engine comprising:

means disposed within the input fuel line for measuring the fuel flow rate of fuel flowing from the supply tank to the engine and for generating an output digital pulse stream proportional to the fuel flow rate;

means for generating a signal representing an initial amount of fuel stored in the supply tank;

an electronic processor responsive to said digital pulse stream and said signal representing an initial amount of fuel for generating an output signal representing the fuel consumption rate of the engine;

first display means interconnected to said electronic processor for displaying said electronic processor output signal representing the fuel consumption rate of the engine; and second display means for continuously displaying the amount of engine operating time remaining based upon the amount of fuel present in the supply tank and the current fuel consumption rate of the engine.

2. The monitoring device of claim 1 and further including:
   display means for continuously displaying the amount of fuel remaining in the supply tank during operation of the engine.

3. The monitoring device of claim 1 and further including display means for continuously displaying the amount of fuel consumed during operation of the engine.

4. The monitoring device of claim 1 and further including:
   display means for displaying the length of time the engine has been operating.

5. The monitoring device of claim 1 and further including:
   means for generating an alarm signal if the rate of fuel consumption exceeds a predetermined rate.

6. The monitoring device of claim 1 and further including:
   means for generating an alarm signal if the amount of fuel present in the supply tank decreases below a predetermined amount.

7. The monitoring device of claim 1 and further including:
   display means for alternately displaying the amount of fuel consumed during operation of the engine and the amount of fuel remaining in the supply tank.

8. The monitoring device of claim 1 wherein said means disposed within the input fuel line for measuring the fuel flow rate comprises a flow transducer.

9. The monitoring device of claim 1 wherein said means for generating a signal representing an initial amount of fuel stored in the supply tank comprises switch means.

10. A monitoring device for measuring fuel consumption of an engine having a fuel supply tank and an input fuel line extending between the supply tank and the engine comprising:
    flow transducer means disposed within the input fuel line for measuring the fuel flow rate of fuel flowing from the supply tank to the engine and for generating an output digital pulse stream proportional to the fuel flow rate to the engine;
    switch means for generating a signal representing an initial amount of fuel stored in the supply tank;
    an electronic processor responsive to said digitial pulse stream and said signal representing the initial amount of fuel for continuously generating an output signal representing the fuel consumption rate of the engine;
    said electronic processor further generating a time signal representing the amount of engine operating time remaining based upon the amount of fuel present in the supply tank and the current fuel consumption rate of the engine;
    first display means interconnected to said electronic processor for displaying said electronic processor output signal representing the fuel consumption rate of the engine; and
    second display means interconnected to said electronic processor for displaying said time signal.

11. The monitoring device of claim 10 and further including:
    third display means for displaying a percentage of the amount of fuel remaining in the supply tank compared to the initial amount of fuel in the supply tank prior to operation of the engine.

12. The monitoring device of claim 10 and further including:
    means for storing said signal representing the initial amount of fuel stored in the supply tank.

13. The monitoring device of claim 10 wherein said first display alternately displays said electronic processor output signal representing the fuel consumption rate of the engine, the amount of fuel consumed during operation of the engine and the amount of fuel remaining in the supply tank.

14. A monitoring device for monitoring fuel consumption of a pressure carbureted engine having a supply tank, a fuel input line and a fuel return line extending between the supply tank and the pressure carbureted engine comprising:
    first flow transducer disposed within the fuel input line for measuring the fuel flow rate of fuel flowing from the supply tank to the engine and for generating an output digital pulse stream proportional to the fuel flow rate to the engine;
    second flow transducer disposed within the fuel return line for measuring the fuel flow rate of fuel for returning to the supply tank and for generating an output digital pulse stream proportional to the fuel flow rate returning to the supply tank;
    means for generating a signal representing an initial amount of fuel stored in the supply tank;
    an electronic processor responsive to said digital pulse streams from said first and second flow transducers and said signal representing the initial amount of fuel for continuously generating an output signal representing the fuel consumption rate of the pressure carbureted engine;
    said electronic processor further generating a time signal representing the amount of pressure carbureted engine operating time remaining based upon the amount of fuel present in the supply tank and the current fuel consumption rate of the pressure carbureted engine;
    display means interconnected to said electronic processor for simultaneously displaying said electronic processor output signal representing the fuel flow consumption rate of fuel flowing to the pressure carbureted engine and the fuel flow consumption rate of fuel flowing to the supply tank.

15. The monitoring device of claim 14 and further including:
    means for displaying the fuel consumption rate of the pressure carbureted engine.

16. The monitoring device of claim 14 and further including:
    display means for alternately displaying the amount of fuel consumed in the operation of the pressure carbureted engine and the amount of fuel remaining in the supply tank.

17. The monitoring device of claim 14 and further including:
    means for displaying said time signal representing the amount of operating time remaining for the pressure carbureted engine.

18. A method of monitoring fuel flow consumption of an engine comprising the steps of:
    measuring the fuel flow rate of fuel flowing from a supply tank to the engine;
    generating an output digital pulse stream proportional to the fuel flow rate;
    generating a signal representing an initial amount of fuel stored in the supply tank;

processing said digital pulse stream and said signal representing an initial amount of fuel;

generating an output signal representing the fuel consumption rate of the engine;

displaying said output signal;

displaying the amount of fuel remaining in the supply tank during operation of the engine; and displaying the amount of engine operating time remaining based on the amount of fuel remaining in the supply tank and the current fuel consumption rate of the engine.

19. The method of claim 18 and further including displaying a percentage of the amount of fuel remaining in the supply tank compared to the initial amount of fuel in the supply tank prior to operation of the engine.

20. A method of monitoring fuel flow consumption of a pressure carbureted engine comprising the steps of:

measuring the fuel flow rate of the fuel flowing from a supply tank through a fuel input line to the engine and the fuel flow rate of fuel returning to the supply tank from a fuel return line;

generating output digital pulse streams proportional to the fuel flow rate flowing in the fuel input line and fuel return line;

generating a signal representing an initial amount of fuel stored in the supply tank;

processing said digital pulse streams and said signal representing the initial amount of fuel;

generating an output signal representing the fuel consumption rate of the engine;

generating a time signal representing the amount of pressure carbureted engine operating time remaining based upon the amount of fuel present in the supply tank and the current fuel consumption rate of the engine; and displaying said output signal.

21. The method of claim 20 and further including displaying the fuel consumption rate of the pressure carbureted engine.

22. The method of claim 20 and further including alternately displaying the amount of fuel consumed in the operation of the the pressure carbureted engine and the amount of fuel remaining in the supply tank.

23. The method of claim 20 and further including displaying said time signal representing the amount of operating time remaining for the pressure carbureted engine.

24. A monitoring device for monitoring fuel consumption of an engine having a fuel supply tank and an input fuel line extending between the fuel supply tank and the engine comprising:

means disposed within the input fuel line for measuring the fuel flow rate of fuel flowing from the supply tank to the engine and for generating an output digital pulse stream proportional to the fuel flow rate;

means for generating a signal representing an initial amount of fuel stored in the supply tank;

an electronic processor responsive to said digital pulse stream and said signal representing an initial amount of fuel for generating an output signal representing the fuel consumption rate of the engine;

first display means interconnected to said electronic processor for displaying said electronic processor output signal representing the fuel consumption rate of the engine; and second display means for simultaneously and continuously displaying the fuel consumption rate of the engine and the amount of engine operating time remaining based upon the amount of fuel present in the supply tank and the current fuel consumption rate of the engine.

25. A monitoring device for monitoring fuel consumption of an engine having a fuel supply tank and an input fuel line extending between the fuel supply tank and the engine comprising:

means disposed within the input fuel line for measuring the fuel flow rate of fuel flowing from the supply tank to the engine and for generating an output digital pulse stream proportional to the fuel flow rate;

means for generating a signal representing an initial amount of fuel stored in the supply tank;

an electronic processor responsive to said digital pulse stream and said signal representing an initial amount of fuel for generating an output signal representing the fuel consumption rate of the engine;

first display means interconnected to said electronic processor for displaying said electronic processor output signal representing the fuel consumption rate of the engine; and second display means for displaying a percentage of the amount of fuel remaining in the supply tank compared to the initial amount of fuel in the supply tank prior to the operation of the engine.

* * * * *

UNITED STATES PATENT AND TRADEMARK OFFICE
CERTIFICATE OF CORRECTION

PATENT NO. : 4,218,744
DATED : August 19, 1980
INVENTOR(S) : Wayne L. Pratt; Paul E. King It is certified that error appears in the above-identified patent and that said Letters Patent are hereby corrected as shown below:

References Cited:
    Wellons "3,859,176" should be --3,589,176--.
Col. 3, line 1; "transducer" should be --transducers--.
Col. 3, line 15; "Ft" should be --FT--.
Col. 4, line 14; "startup" should be --start-up--.
Col. 85, line 50; "to take-off" should be --at take-off--.

Signed and Sealed this

Seventeenth Day of March 1981

[SEAL]

Attest:

RENE D. TEGTMEYER

*Attesting Officer*     *Acting Commissioner of Patents and Trademarks*